United States Patent
Sundararaman et al.

(10) Patent No.: US 10,380,026 B2
(45) Date of Patent: Aug. 13, 2019

(54) GENERALIZED STORAGE VIRTUALIZATION INTERFACE

(71) Applicant: SanDisk Technologies LLC, Plano, TX (US)

(72) Inventors: Swaminathan Sundararaman, San Jose, CA (US); Nisha Talagala, Livermore, CA (US); Robert Wipfel, Draper, UT (US); Sriram Subramanian, San Jose, CA (US); Vladislav Bolkhovitin, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 195 days.

(21) Appl. No.: 14/569,382

(22) Filed: Dec. 12, 2014

(65) Prior Publication Data
US 2016/0070652 A1 Mar. 10, 2016

Related U.S. Application Data

(60) Provisional application No. 62/046,106, filed on Sep. 4, 2014.

(51) Int. Cl.
*G06F 3/06* (2006.01)
*G06F 12/10* (2016.01)
*G06F 12/109* (2016.01)

(52) U.S. Cl.
CPC .......... *G06F 12/10* (2013.01); *G06F 3/065* (2013.01); *G06F 3/067* (2013.01); *G06F 3/0619* (2013.01);
(Continued)

(58) Field of Classification Search
CPC .... G06F 3/0617; G06F 3/0619; G06F 3/0647; G06F 3/065; G06F 3/0665; G06F 3/0667;
(Continued)

(56) References Cited

U.S. PATENT DOCUMENTS

| 2011/0040795 A1* | 2/2011 | Gordon ............. G06F 17/30607 707/792 |
| 2013/0073821 A1* | 3/2013 | Flynn ..................... G06F 3/061 711/162 |

(Continued)

FOREIGN PATENT DOCUMENTS

| WO | 2014110137 | 7/2014 |
| WO | 2014110158 | 7/2014 |

(Continued)

OTHER PUBLICATIONS

International Search Report and Written Opinion dated Dec. 8, 2015 for PCT/US2015/048414.

(Continued)

*Primary Examiner* — Shane D Woolwine
(74) *Attorney, Agent, or Firm* — Kunzler Bean & Adamson, PC

(57) ABSTRACT

A storage system implements a sparse, thinly provisioned logical-to-physical translation layer. The storage system may perform operations to modify logical-to-physical mappings, including creating, removing, and/or modifying any-to-any and/or many-to-one mappings between logical identifiers and stored data (logical manipulation operations). The storage system records persistent metadata to render the logical manipulation (LM) operations persistent and crash-safe. The storage system may provide access to LM functionality through a generalized LM interface. Clients may leverage the LM interface to efficiently implement higher-level functionality and/or offload LM operations to the storage system.

24 Claims, 37 Drawing Sheets

(52) U.S. Cl.
CPC .......... *G06F 3/0647* (2013.01); *G06F 3/0665* (2013.01); *G06F 3/0667* (2013.01); *G06F 3/0617* (2013.01); *G06F 3/0679* (2013.01); *G06F 3/0685* (2013.01); *G06F 12/109* (2013.01); *G06F 2212/1016* (2013.01); *G06F 2212/657* (2013.01)

(58) Field of Classification Search
CPC ...... G06F 3/067; G06F 3/0679; G06F 3/0685; G06F 2212/1016; G06F 2212/657
USPC .................................................. 711/103, 154
See application file for complete search history.

(56) References Cited

U.S. PATENT DOCUMENTS

| | | | | |
|---|---|---|---|---|
| 2013/0117520 | A1* | 5/2013 | Ryu .................. | G06F 12/02 711/165 |
| 2013/0227236 | A1* | 8/2013 | Flynn ................ | G11C 16/26 711/165 |

FOREIGN PATENT DOCUMENTS

| | | |
|---|---|---|
| WO | 2014110311 | 7/2014 |
| WO | 2014110343 | 7/2014 |

\* cited by examiner

101G

GENERALIZED STORAGE VIRTUALIZATION INTERFACE

TECHNICAL FIELD

This disclosure relates to storage systems and, in particular, to systems, methods, apparatuses, and interfaces for a generalized interface for implementing logical manipulation operations and/or leveraging a generalized logical manipulation interface to perform higher-level storage operations.

BRIEF DESCRIPTION OF THE DRAWINGS

FIG. 6F depicts further embodiments of snapshot management operations;

DETAILED DESCRIPTION

Figure 1A:
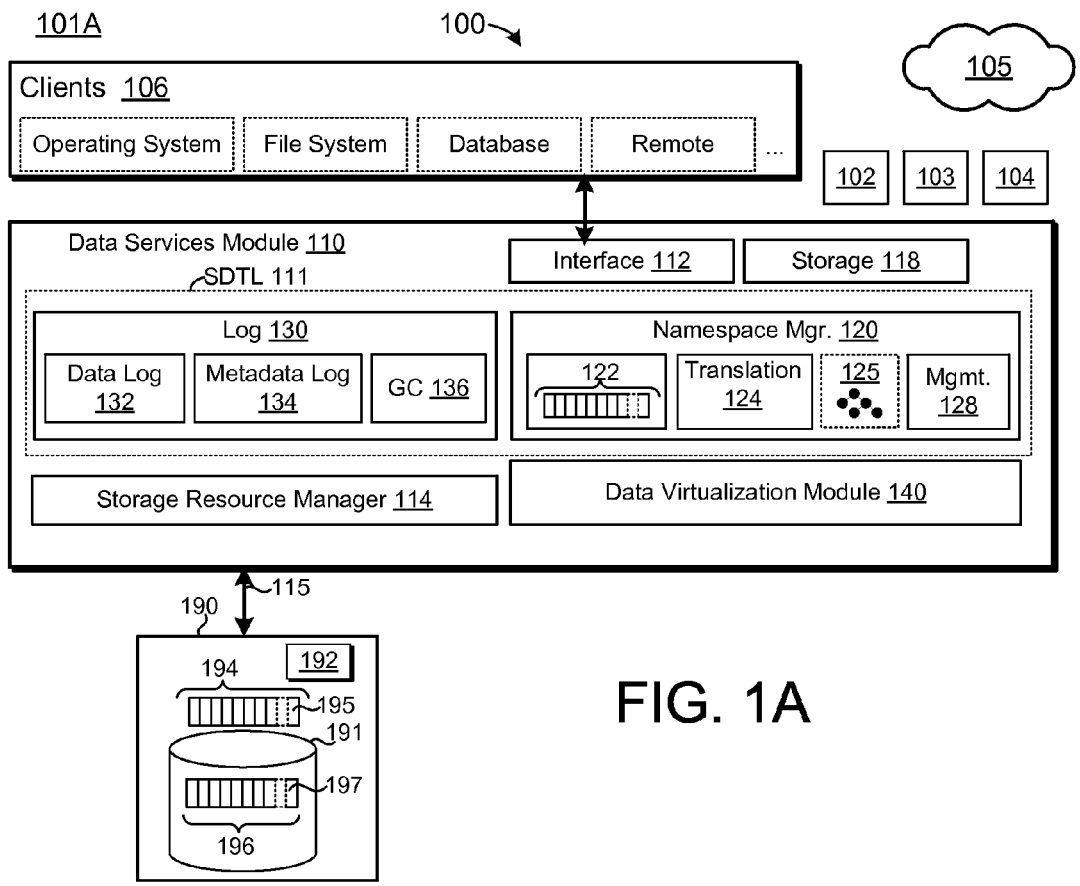
FIG. 1A is a block diagram of one embodiment of a computing system comprising a data services module.

A data services layer and/or module may be configured to provide storage services to one or more clients by use of one or more lower-level storage resources. As used herein, storage resource refers to any device, service, module, and/or layer capable of servicing I/O and/or storage requests. Accordingly, a storage resource may include, but is not limited to: a hard drive (e.g., magnetic storage medium), battery-backed Random Access Memory (RAM), solid-state storage medium, disk array (e.g., a redundant array of inexpensive disks (RAID)), Storage Area Network (SAN), logical unit (e.g., a Small Computer System Interface (SCSI) compliant storage resource), virtual logical unit, software-defined storage resources, and/or the like. A storage resource may comprise a physical storage device comprising physical storage media. A storage resource may further comprise a storage library, API, driver, bus, and/or the like.

The data services module may maintain one or more upper-level I/O namespace(s), which may include, but are not limited to: a set, collection, range, and/or extent of data references and/or identifiers; a set, collection, range, and/or extent of addresses (e.g., sector addresses, block addresses, logical block addresses, and/or the like); a storage namespace; a file system namespace; and/or the like. The data services module may comprise a namespace manager configured to link identifiers of the upper-level I/O namespace(s) to lower-level I/O resources by use of, inter alia, virtualization metadata, including any-to-any mappings between identifiers of upper-level I/O namespaces and identifiers of the lower-level I/O resource(s). In some embodiments, an upper-level I/O namespace may correspond to two or more different storage resources. Therefore, in some embodiments, virtualization metadata is referred to as "translation metadata," "mapping metadata," and/or "logical-to-physical metadata." the data services module may be configured to combine multiple lower-level I/O namespaces into an aggregate upper-level I/O namespace. Alternatively, or in addition, two or more upper-level I/O namespaces may map to the same storage resource.

In some embodiments, the dta services module includes a storage module configured to log I/O operations. The storage module may be configured to log I/O operations in a virtualized data log. As used herein, a virtual data log (VDL) refers to a log corresponding to a front-end, upper-level I/O namespace, such that the VDL comprises segments defined within front-end interfaces of one or more storage resources. The VDL may correspond to a data stream comprising data of I/O requests serviced by the data services module. The VDL may comprise upper-level log segments corresponding to respective sets, collections, ranges, and/or extents within one or more lower-level namespaces. Appending data to the VDL may, therefore, comprise appending data sequentially within the I/O namespace of an I/O resource. In some embodiments, the data services module may comprise a plurality of VDLs, each having a different respective append point. Although specific embodiments of a VDL for storage of data of I/O requests are described herein, the disclosure is not limited in this regard and could be adapted to use any suitable structure to store that data. Exemplary data storage structures include, but are not limited to, logging and/or journaling mechanisms, including, but not limited to: key-value storage systems, write out-of-place storage systems, write-anywhere data layouts, journaling storage systems, object-based storage systems, and/or the like.

The log module may further comprise a garbage collector configured to reclaim segments of the VDL (and/or other logs, such as the metadata log, disclosed in further detail herein). The garbage collector may comprise: a garbage collector (GC) scanner configured to distinguish valid data from data that does not need to be retained within the log (e.g., invalid data), a GC relocation strategy module configured to determine a plan for relocating valid data within one or more log segments being reclaimed to other segments of the log, and a GC implementation module configured to execute the determined relocation plan. The GC implementation module may be configured to implement the relocation plan in accordance with properties and/or characteristics of the underlying storage resources. A storage resource may, for example, support logical move operations (disclosed in further detail herein), and the GC implementation module may relocate data using a supported logical move operation rather than re-writing the data on the storage resource.

The data services module may further comprise a metadata log, which may be maintained separately from the VDL. The metadata log may maintain a persistent, ordered record of mappings between identifiers in upper-level I/O namespace(s) of the data services module and identifiers of corresponding storage resources. The metadata log preserves and maintains a temporal ordering of I/O operations performed by the data services module (e.g., a "log order" of the metadata log). As used herein, "log order" refers to an ordered sequence of information in a log data structure (e.g., the order of data within the log). The log order of the metadata log may correspond to an order in which I/O operations were received at the data services module 110. Since the metadata log maintains temporal ordering of the I/O operations, the corresponding data storage operations performed in the VDL may be free from time-ordering constraints (e.g., may be performed out of order). In some embodiments, the metadata log is maintained separately from the VDL (e.g., in a separate I/O namespace, on a separate storage resource, and/or the like). Although specific embodiments of a metadata log are described herein, the disclosure is not limited in this regard and could be adapted to maintain mapping metadata using any suitable metadata storage technique including, but not limited to: key-value storage mechanisms, journaling storage mechanisms, and/or the like.

The log(s) maintained by the data services module may comprise segments corresponding to respective sets, collections, ranges, and/or extents of identifiers within respective namespace(s) of one or more storage resources. A translation module may be configured to bind (e.g., associate, map, tie, connect, relate, etc.) identifiers of I/O namespace(s) to respective storage resources by use of, inter alia, virtualization metadata. In some embodiments, the virtualization metadata comprises a forward map comprising any-to-any mappings between upper-level identifiers of the virtualization layer, and identifiers of respective storage resources. The virtualization index may comprise any suitable data structure including, but not limited to: a map, a hash map, a tree data structure, a binary tree (B-Tree), an n-ary tree data structure (B+ Tree), a range encoded tree, a radix tree, and/or the like. The virtualization index may be maintained in volatile memory. In some embodiments, the translation module is configured to map LIDs to virtual blocks that correspond to groups of one or more virtual addresses. The virtual blocks may be adapted to provide a desired storage granularity (e.g., block size). The data services module may be configured to persist portions of the virtualization index to ensure that the mappings of the virtualization index are persistent and/or crash-safe. The data services module may comprise a reconstruction module configured to rebuild the virtualization index using the contents of one or more VDLs and/or metadata log. As above, although particular embodiments of a VDL (and metadata log) are described herein, the disclosure is not limited in this regard and could be adapted to use any suitable storage, logging, and/or journaling mechanisms.

The data services module may be configured to maintain mapping metadata in an ordered metadata log. The metadata log may include mapping entries configured to associate LIDs with respective virtual addresses (and/or virtual blocks). The data services module may be further configured to implement efficient logical manipulation operations on data stored within the VDL. The logical manipulation operations may include, but are not limited to: logical move operations, logical copy operations, delete operations, exist queries, merge operations, and the like. Implementing the logical manipulation operations may comprise recording logical manipulation entries to the metadata log 160. Accordingly, logical manipulation operations may be implemented without modifying data in the VDL and/or without appending data to the VDL.

The data services module disclosed herein may provide a sparse, durable translation layer. As used herein, a sparse, durable translation layer (SDTL) refers to a translation layer between logical and physical resources having certain properties and/or characteristics, specifically "sparseness" and "durability." As used herein, "sparseness" refers to separation and/or independence between logical and physical resource(s), such that the logical address space of the SDTL may represent a logical capacity that differs from (e.g., is independent of) the physical storage capacity of the physical storage resource(s) corresponding to the SDTL. A sparse logical address may, therefore, comprise a logical address space that exceeds the available physical storage capacity, which may facilitate, inter alia, many-to-one mappings between logical and physical resources (e.g., a plurality of logical identifiers may map to a single physical storage location and/or address in the SDTL). As used herein, a "durable" translation layer refers to a translation layer that maintains persistent, crash-safe metadata pertaining to logical-to-physical mappings (and/or modifications to logical-to-physical mappings).

As disclosed in further detail herein, an SDTL may be leveraged to implement operations to manipulate the logical-to-physical mappings of the SDTL; such operations may be configured to manipulate the logical interface of data stored on the physical storage resource(s) without rewriting and/or modifying the stored data. As used herein, operations to manipulate logical-to-physical mappings of stored data may be referred to as logical manipulation operations (LM operations), logical interface manipulation operations (LIM operations), data virtualization operations (DV operations), and/or the like. LM operations may include, but are not limited to: logical copy (range clone, zero write copy, and/or the like), logical move (range move, zero write move, and/or the like), merge (range merge, zero write move, and/or the like), delete (or write same), exists, composite LM operations, and/or the like. In some embodiments, an SDTL may be further configured to implement atomic, multi-block operations pertaining to multiple sets, collections, ranges, and/or extents within the logical address space (e.g., LM operations corresponding to LID vectors and/or composite LM operations, as disclosed herein). An SDTL may be further configured to isolate logical manipulation operations to maintain integrity of logical-to-physical mappings.

The LM operations disclosed herein may be implemented and/or presented through an interface. As used herein, an interface for implementing, defining, and/or presenting LM operations is referred to as a generalized LM interface (GLM interface), LM interface, logical interface manipulation interface (LIM interface), data virtualization interface (DV interface), storage virtualization interface (SV interface), and/or the like. A GLM interface may define LM operations implemented by a suitable storage system, storage layer, storage manager, storage driver, storage module, storage device, and/or the like, such that the operations are implemented in a) a sparse logical address space, and b) are durable (e.g., persistent and crash safe). The GLM interface may be further configured to implement LM operations that are atomic and/or isolated (serializable and/or thread safe). The GLM interface may present LM primitives pertaining to data stored by use of a block device interface. Accordingly, the GLM interface may extend the functionality of one or more existing storage interface(s), such as a block storage interface, block storage device, block storage system, block storage driver, block storage layer, object storage interface, direct file interface, database engine (e.g., database management system (DBMS) interface), storage engine, directory interface, and/or the like. Clients may utilize logical manipulation operations of the GLM interface to implement higher-level functionality, such as file management, key-value storage, storage virtualization, snapshotting, atomic operations, and the like. Embodiments of the GLM interface(s) disclosed herein may be implemented and/or presented by use of various components, modules, circuits, and/or the like, including, but not limited to: a kernel-level module, a user-space module, a driver-level module, a driver, an I/O controller, an I/O manager, an I/O layer, an I/O service, a storage controller, a storage manager, a storage layer, a storage service, a small computer system interface (SCSI) module, a library, a shared library, a loadable library, a dynamic-link library (DLL) library, a device driver, a device driver interface (DDI) module, a logical device driver (LDD) module, a physical device driver (PDD) module, a windows driver foundation (WFD) module, a user-mode driver framework (UMDF) module, a kernel-mode driver framework (KMDF) module, an I/O Kit module, a uniform driver interface (UDI) module, storage device interface (SDI) module, a software development kit (SDK), and/or the like.

Disclosed herein are embodiments of an apparatus of providing and/or implementing a generalized interface for logical manipulation operations. The disclosed apparatus may include a storage manager that stores data on a non-transitory storage medium in response to storage requests of a client, a translation layer that maintains a logical address space corresponding to the non-transitory storage medium comprising associations between data stored on the non-transitory storage medium and respective logical addresses in the logical address space, and/or a data virtualization interface having a plurality of functions available to the client, the functions configured to implement storage management operations by changing associations between data stored on the non-transitory storage medium and logical addresses of the logical address space. The storage management operations may change the logical address associated with a data block stored on the non-volatile storage medium without modifying the stored data block. The data may be stored on the non-transitory storage medium in response to requests issued to a block storage interface. The data virtualization interface may comprise one or more of library, an application programming interface, a user-level module, a software development kit, and a kernel-level module.

In some embodiments, the data virtualization interface comprises a range clone function that specifies a destination logical address range and a source logical address range, wherein the source logical address range is mapped to a data segment stored on the non-transitory storage medium, and wherein implementing the range clone function comprises associating the destination logical address range with the data segment stored on the non-transitory storage medium. The data virtualization interface may include a range move function that determines a destination logical address and a source logical address, wherein the source logical address corresponds to particular storage address on the non-transitory storage medium, and wherein the range move function maps the destination logical address to the particular storage address and unmaps the source logical address from the particular storage address.

A client may implement a zero-write file copy operation by issuing a logical copy request to the data virtualization interface configured to associate data of a first file stored on the non-transitory storage medium with a second file, such that logical addresses assigned to the second file reference the same stored file data as logical addresses assigned to the first file. The client may be further configured to identify files corresponding to duplicate data, and wherein the client issues the logical copy request to the data virtualization interface in response to determining that the first file and the second file correspond to duplicate data. In some embodiments, the client is configured to leverage the data virtualization interface to implement a journaled storage transaction pertaining to a plurality of target logical addresses by storing a plurality of data blocks pertaining to the journaled storage transaction, such that the stored data blocks are mapped to logical addresses within a designated region of the logical address space, and/or issuing a range move request to the data virtualization interface configured to associate the plurality of stored data blocks with the target logical addresses of the journaled storage transaction. The client may rollback a failed journaled storage transaction by invalidating stored data associated with addresses within the designated region of the logical address space. The storage manager may implement the range move request by a single atomic write to a persistent storage device.

Disclosed herein are embodiments of a computer-implemented storage system, including a storage interface having a plurality of API functions for storing data blocks on a physical storage resource, such that the stored data blocks are mapped to respective identifiers of a logical address space, and/or a uniform logical manipulation interface available to a client, the uniform logical manipulation interface having a plurality of API functions for modifying logical-to-physical mappings pertaining to the stored data blocks, the uniform logical manipulation interface comprising an API function to map a stored data block mapped to a first identifier of the logical address space to a second identifier of the logical address space. The uniform logical manipulation interface may comprise a library that is accessible to a user-level application operating on a computing device. The computer-implemented storage system may further include a namespace manager that stores persistent metadata indicating that the stored data blocks are mapped to the second, different set of two or more identifiers on a non-volatile storage medium in a single, atomic write operation.

The API function of the uniform logical manipulation interface may be configured to map the first identifier and the second identifier to the same stored data block on the physical storage resource. The API function of the uniform logical manipulation interface may be further configured to remove the mapping between the first identifier and the stored data block. In some embodiments, the API function is defined in terms of identifier vectors comprising two or more identifiers in the logical address space, and the API function may be configured to map stored data blocks mapped to identifiers in a first vector to identifiers in a second, different vector.

Disclosed herein are embodiments of methods for providing and/or leveraging a generalized LM interface. The methods and/or processes disclosed herein may be embodied as executable instructions stored on a non-transitory storage medium. The instructions may comprise computer program code that, when executed by processor and/or computing device, cause the processor and/or computing device to implement processing steps and/or operations disclosed herein. Alternatively, or in addition, steps and/or operations of the disclosed methods and/or processes may be implemented and/or embodied as a driver, a library, an interface, an application programming interface (API), firmware, FPGA configuration data, and/or the like. Accordingly, portions of the methods and/or processes disclosed herein be accessed by and/or included within particular modules, processes, and/or services (e.g., incorporated within a kernel layer of an operating system, within a storage stack, in user-space, and/or the like). In some embodiments, steps and/or operations of the methods and/or processes disclosed herein may be embodied as machine components, such as general and/or application-specific devices, including, but not limited to: circuits, processing components, interface components, hardware controller(s), storage controller(s), programmable hardware, FPGAs, ASICs, and/or the like. Accordingly, certain steps and/or operations of the methods and/or processes disclosed herein may be tied to particular hardware components.

The disclosed method may comprise maintaining metadata in a persistent log to translate logical identifiers of a front-end address space of a storage resource to data segments stored on the storage resource, and/or exposing a generalized interface to change translations between logical identifiers of the front-end address space and the data segments stored on the non-volatile storage device. In some embodiments, the method further includes appending entries to the persistent log in response to a request to change a translation between a data segment stored on the storage resource and the front-end address space.

The generalized interface may be configured to receive one or more of a) requests to clone a stored data segment that translates to a first logical identifier to a second logical identifier, such that the first logical identifier and the second logical identifier translate to the same stored data segment, and/or b) requests to move a stored data segment that translates to a first logical identifier to a second logical identifier, such that the second logical identifier translates to the stored data segment and the first logical identifier is untranslated.

Disclosed here are further embodiments of an apparatus to leveraging a generalized LM interface. The disclosed apparatus may include a client configured to issue requests to a storage layer to stored data associated with respective addresses of a logical address space of a non-volatile storage medium, the logical address space presented to the client, wherein the storage layer makes primitive storage operations for data stored on the non-volatile storage medium available to the client. The primitive storage operations may be configured to modify associations between the logical address space and the data stored on the non-volatile storage medium. The client may be configured to implement storage management operations by use of the primitive storage operations made available by the storage layer. The storage layer may be configured to modify the associations between the logical address space and the data stored on the non-volatile storage medium without changing the data stored on the non-volatile storage medium.

In some embodiments, the client is configured to manage snapshots pertaining to the logical address space by use of a logical copy primitive accessible using the storage layer. Alternatively, or in addition, the client may be configured to issue requests to write data to a block storage interface, and wherein the storage layer exposes the primitive storage operations configured to modify the associations between the logical address space and the data stored on the non-volatile storage medium though an interface that is separate from the block storage interface.

FIG. 1A is a block diagram of one embodiment 101A of a computing system 100 comprising data services module 110. The computing system 100 may comprise one or more computing devices, including, but not limited to, a server, a desktop, a laptop, an embedded system, a mobile device, and/or the like. In some embodiments, the computing system 100 may include multiple computing devices, such as a cluster of server computing devices. The computing system 100 may comprise processing resources 102, volatile memory resources 103 (e.g., RAM), and communication interface 104. The processing resources 102 may include, but are not limited to, general purpose central processing units (CPUs), application-specific integrated circuits (ASICs), and programmable logic elements, such as field programmable gate arrays (FPGAs), programmable logic arrays (PLGs), and the like. The communication interface 104 may be configured to communicatively couple the computing system 100 to a network 105. The network 105 may comprise any suitable communication network, including, but not limited to, a Transmission Control Protocol/Internet Protocol (TCP/IP) network, a Local Area Network (LAN), a Wide Area Network (WAN), a Virtual Private Network (VPN), or a Storage Area Network (SAN).

The data services module 110 (and/or modules, components, and/or features thereof) may be implemented in software, hardware, and/or a combination of software and hardware components. In some embodiments, portions of the data services module 110 are embodied as executable instructions stored on a non-transitory storage medium. The instructions may comprise computer program code that, when executed by processor and/or computing device, cause the processor and/or computing device to implement processing steps and/or operations disclosed herein. The data services module 110, and/or portions thereof, may be implemented and/or embodied as a driver, a library, an interface, an application programming interface (API), firmware, FPGA configuration data, and/or the like. Accordingly, portions of the data services module 110 may be accessed by and/or included within other modules, processes, and/or services (e.g., incorporated within a kernel layer of an operating system of the computing system 100). In some embodiments, portions of the data services module 110 are embodied as machine components, such as general and/or application-specific devices, including, but not limited to: circuits, processing components, interface components, hardware controller(s), storage controller(s), programmable hardware, FPGAs, ASICs, and/or the like. Therefore, modules as disclosed herein, may be referred to as controllers, layers, services, engines, facilities, drivers, circuits, and/or the like. Therefore, in some embodiments, the data services module 110 may be referred to as a data services controller, a data services layer, a data services engine, a data services facility, a data services driver, a data services circuit, and/or the like.

The data services module 110 may be configured to provide I/O and/or storage services to clients 106. The clients 106 may include, but are not limited to, operating systems, file systems, journaling systems, key-value storage systems, database systems, applications, users, remote storage clients, and so on. The clients 106 may further include, but are not limited to: components of a virtualized computing environment, such as hypervisors, virtualization kernels, guest operating systems, virtual machines, and/or the like.

The services provided by the data services module 110 refer to storage and/or I/O services, which are not specific to virtualized computing environments or limited to virtualized computing platforms. As disclosed in further detail herein, the data services module 110 may be configured to service storage requests to write, read, and/or modify data stored on the storage resources 190A-N. The data services module 110 may be further configured to provide higher-level functionality to, inter alia, manipulate the logical interface to data stored on the storage resources 190A-N without requiring the stored data to be re-written and/or otherwise modified. As above, the "logical interface" to data refers to a handle, an identifier, a path, a process, or other mechanism(s) for referencing and/or interfacing with the data. A logical interface to data may, therefore, include bindings, associations, and/or ties between logical identifiers and data stored on one or more of the storage resources 190A-N. A logical interface may be used to reference data through a storage interface and/or an application programming interface (API), such as the interface 112 of the data services module 110.

Manipulating the logical interface to data may include, but is not limited to: move operations configured to associate data with different set(s) of LIDs in the logical address space 122 (and/or in other address space(s)), replication operations configured to provide for referencing persistent data through two or more different sets of LIDs in the logical address space 122 (and/or in other address space(s)), merge operations configured to merge two or more sets of LIDs, and so on. Accordingly, manipulating the logical interface to data may comprise modifying existing bindings, ties, mappings and/or associations between the logical address space 122 and data stored on a storage resource 190A-N. The logical manipulation operations implemented by the data services module 110, in certain embodiments, are persistent and crash-safe, such that the effect of the operations is preserved despite loss and/or corruption of volatile metadata (e.g., virtualization metadata, such as the forward map 125). Moreover, the logical manipulation operations may be implemented without modifying the corresponding stored data (e.g., without modifying and/or appending data to a VDL, as disclosed herein). The data services module 110 may be further configured to leverage the logical manipulation operations disclosed herein to implement higher-level features, including, but not limited to: I/O transactions, atomic storage operations, vectored atomic storage operations, snapshots, data consistency (e.g., close-to-open file consistency), data collision management (e.g., key collision in key-value storage systems), deduplication, data version management, and/or the like.

The data services module 110 may service I/O requests by use of one or more storage resources 190. As used herein, a "storage resource" refers to a storage device, layer, module, service, and/or the like that is capable of servicing I/O and/or storage requests. The storage resource 190 may be capable of storing data persistently on a storage medium 191. The storage resource 190 may comprise one or more storage devices including, but not limited to: solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writeable optical drives (e.g., CD drives, DVD drives, Blu-ray drives, etc.), and/or the like. The storage medium 191 may include, but is not limited to: a magnetic storage medium, an optical storage medium, a solid-state storage medium, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide-based sub-10 nanometer process memory, graphene memory, Silicon-Oxide-Nitride-Oxide-Silicon (SONOS) memory, resistive RAM (RRAM), programmable metallization cell (PMC) memory, conductive-bridging RAM (CBRAM), and/or the like. Although particular embodiments of storage media are disclosed herein, the teachings of this disclosure could be applied to any suitable storage medium, including both non-volatile and volatile forms.

The storage resource 190 may comprise an interface configured to receive storage and/or I/O requests. The interface may comprise and/or correspond to a storage resource address space 194, which may include, but is not limited to: a namespace, a front-end interface, a virtual address space, a block address space, a logical address space, a LUN, a vLUN, and/or the like. The front-end interface of the storage resource 190 (storage resource address space 194) may comprise a set, range, and/or extent of identifiers, which may include, but are not limited to: front-end identifiers, front-end addresses, virtual addresses, block addresses, logical block addresses, and/or the like. As used herein, the identifiers of the front-end storage resource address space 194 are referred to as virtual addresses 195. The storage resource address space 194 may be managed by, inter alia, a storage resource controller 192. The storage resource controller 192 may include, but is not limited to: a driver, an I/O interface, a storage interface (e.g., block device driver, interface, and/or API), a hardware controller, and/or the like.

The storage resource controller 192 may be configured to perform storage operations on respective storage units 197 of the storage medium 191. As used herein, a "storage unit" refers to a storage location capable of persistently storing data. The storage units 197 of the storage resource 190 may correspond to: blocks, sectors, pages, storage divisions (e.g., erase blocks), groups of storage locations (e.g., logical pages and/or offsets within a logical page), storage divisions (e.g., physical erase blocks, logical erase blocks, etc.), physical die, physical die plane(s), locations on a magnetic disk, battery-backed memory locations, and/or the like. The storage units 197 may be addressable within a storage media address space 196 (e.g., physical address space). The storage media address space 196 may include, but is not limited to: a set, range, and/or collection of storage unit addresses, a namespace, a back-end interface, a physical address space, a block address space, address offsets, and/or the like. The storage resource controller 192 may be configured to correlate virtual addresses 195 of the storage resource address space 194 with storage units 197 using, for example, deterministic one-to-one mappings (e.g., cylinder sector head (CHS) addressing), any-to-any mappings, an address translation layer, an index, a flash translation layer, and/or the like.

The data services module 110 may comprise a storage resource manager 114 configured to, inter alia, perform storage on the storage resource 190. The storage resource manager 114 may interface with the storage resource 190 by use of an interconnect 115, which may include, but is not limited to: a peripheral component interconnect (PCI), PCI express (PCI-e), Serial AT Attachment (serial ATA or SATA), parallel ATA (PATA), Small Computer System Interface (SCSI), IEEE 1394 (FireWire), Fiber Channel, universal serial bus (USB), and/or the like. In some embodiments, the storage resource 190 may comprise one or more remote storage devices that are communicatively coupled to the computing system 100 through the network 105 (and/or other communication interface, such as a Storage Area Network (SAN), a Virtual Storage Area Network (VSAN), and/or the like). The interconnect 115 may, therefore, comprise a remote bus, such as a PCI-e bus, a network connection (e.g., Infiniband), a storage network, a Fibre Channel Protocol (FCP) network, a HyperSCSI, and/or the like.

The data services module 110 may comprise an interface 112 through which clients 106 may access the I/O services and/or functionality. The interface 112 may include one or more block device interfaces, object storage interfaces, file storage interfaces, key-value storage interfaces, virtualized storage interfaces, VSUs, LUNs, vLUNs, storage namespaces, logical address spaces, virtual address spaces, database storage interfaces, and/or the like.

The data services module 110 may comprise a sparse, durable translation layer (SDTL) 111 between an upper-level I/O namespace presented to clients 106 (logical address space 122) and physical storage resources, such as the storage resource 190. As disclosed herein, the SDTL 111 may provide a sparse, durable translation layer between the logical address space 122 and storage resource(s) 190 by use of the namespace manager 120 and/or log module 130. As used herein, the logical address space 122, or "upper-level I/O interface," refers to an interface through which clients 106 refer to I/O and/or storage services provided by the data services module 110. The SDTL 111 comprises a namespace manager 120 configured to maintain the logical address space 122, including sparse, durable mappings between the logical address space 122 and physical storage resources. In the FIG. 1A embodiment, the upper-level I/O namespace comprises a logical address space 122 comprising a group, set, collection, range, and/or extent of identifiers. As used herein, an "identifier" or a "logical identifier" (LID) refers to any identifier configured to reference an I/O and/or storage resource. LIDs may include, but are not limited to, identifiers, names (e.g., file names, distinguished names, and/or the like), data identifiers, references, links, front-end identifiers, front-end addresses, logical addresses, LBA, storage unit addresses, VSU addresses, LUN addresses, vLUN addresses, unique identifiers, globally unique identifiers (GUIDs), and/or the like.

The logical capacity of the logical address space 122 may correspond to the number of LIDs in the logical address space 122 and/or the size and/or granularity of the storage resources 190 referenced by the LIDs. As disclosed above, the logical address space 122 maintained by the SDTL 111 may be independent of the underlying storage resources 190.

Accordingly, in some embodiments, the logical address space 122 may be sparse and/or "thinly provisioned." As disclosed above, a thinly provisioned logical address space 122 refers to a logical address space 122 having a logical capacity that is independent of the physical storage capacity and/or granularity of corresponding storage resources 190 (e.g., exceeds the storage capacity of the storage resource 190). In one embodiment, the logical address space 122 comprises 64-bit LIDs (e.g., 2^26 unique LIDs). The data services module 110 may leverage the sparse, thinly provisioned logical address space 122 to efficiently allocate and/or reference contiguous ranges of LIDs and/or manage many-to-one mappings between LIDs and physical storage.

Figure 1B:
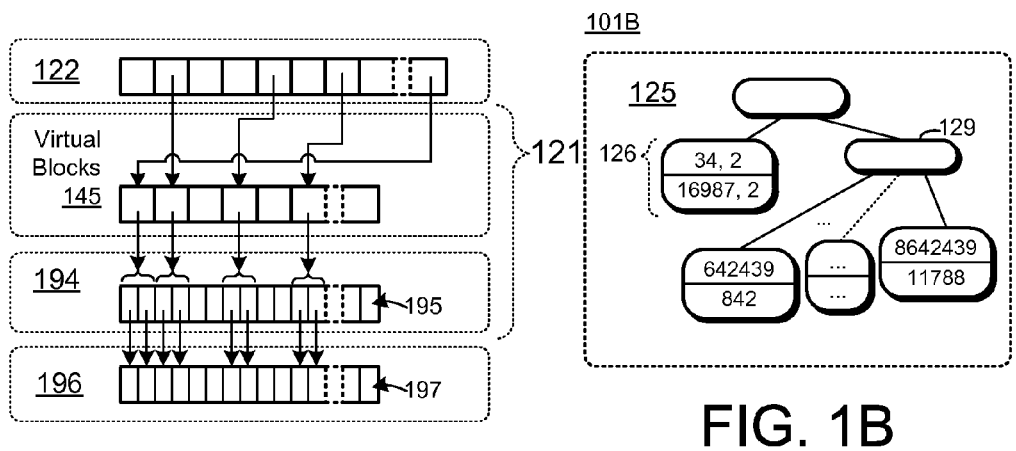
FIG. 1B depicts embodiments of virtualization metadata of a data services module.

The namespace manager 120 of the SDTL 111 may further comprise a translation module 124 configured to associate, bind, map, and/or assign LIDs of the logical address space 122 to front-end identifiers of a storage resource 190 (e.g., physical storage locations and/or storage addresses) by use of virtualization metadata. As used herein, virtualization metadata refers to metadata configured to, inter alia, manage mappings between LIDs of the logical address space 122 and virtual addresses 195 of the storage resource(s) 190. In the FIG. 1A embodiment, the translation module 124 ties LIDs of the logical address space 122 to virtual addresses 195 of the storage resource 190 by use of a forward map 125. The forward map 125 may be configured to map any logical identifier to any virtual address 195 (any-to-any mappings). The forward map 125 may be further configured to implement many-to-one mappings between LIDs and stored data (e.g., many-to-one mappings such that a plurality of LIDs reference the same stored data). The translation module 124 may, therefore, correspond to an intermediate translation layer between LIDs of the logical address space 122 and storage units 197 of the storage resource 190 (e.g., an intermediate translation layer 121 as depicted in FIG. 1B). A LID may map to one or more virtual addresses 195, which may be mapped to respective storage units 197. The translation module 124 may further comprise many-to-one mappings that may assign a plurality of LIDs to a single data segment.

In some embodiments, the forward map 125 is configured to map LIDs of the logical address space 122 to respective virtual addresses 195 (e.g., one-to-one mappings). In such embodiments, LIDs of the logical address space 122 may correspond to respective storage units 197 of the storage resource 190. The LIDs may, therefore, correspond to and/or represent the same physical storage capacity as the underlying storage units 197. The storage resource 190 may, for example, have a block size of 1 kilobyte (kb), such that each storage unit 197 is capable of storing 1 kb of data. The LIDs of the logical address space 122 may, therefore, map to 1 kb blocks (e.g., each LID may correspond to 1 kb of storage capacity).

In some embodiments, the translation module 124 is configured to manage LID-to-storage mappings in order to, inter alia, manage the physical storage capacity represented by the LIDs. As illustrated in FIG. 1B, the translation module 124 may be configured to map LIDs to respective virtual blocks 145, each of which may correspond to one or more virtual addresses 195. Accordingly, as used herein, a virtual block 145 refers to one or more virtual addresses 195. In the FIG. 1B embodiment, the virtual blocks 145 may correspond to two virtual addresses 195, such that the physical storage capacity represented by each virtual block 145 (and corresponding LID) is twice that of the underlying virtual addresses 195 and/or storage units 197. In the FIG. 1B embodiment, each LID may, therefore, correspond to and/or represent 2 kb of physical storage capacity. The translation module 124 may configure the virtual blocks 145 in accordance with a desired block size of the data services module 110. A larger effective block size may, for example, allow the data services module 110 to batch I/O requests, match a block size of one or more clients 106, and/or the like. Alternatively, or in addition, the data services module 110 may configure the virtual blocks 145 to utilize different storage resources 190 having different, respective block sizes, as disclosed in further detail herein. The translation module 124 may be further configured to translate between virtual blocks 145 and virtual addresses 195. In the two-to-one configuration of FIG. 1B, the translation module 124 may translate virtual addresses 195 to virtual blocks 145 by bitwise shifting the virtual address(es) 195 (e.g., removing the least significant address bit). Accordingly, each two virtual addresses 195 map to a respective virtual block 145. The corresponding virtual addresses 195 may be derived from virtual blocks 145 using a similar technique (e.g., appending a 0 and/or 1 to the virtual block address, respectively). The translation module 124 may be configured to perform similar address translations with different virtual block 145 ratios. For example, in a four-to-one mapping between virtual addressees 195 and virtual blocks 145, the translation module 124 may be configured to bitwise shift the virtual addresses 195 to remove the two least significant bits, and so on. Although particular embodiments of mechanisms for translating between virtual blocks 145 and virtual addresses 195 are described herein, the disclosure is not limited in this regard, and could be adapted to implement translations using any suitable mechanism including, but not limited to: an index, a map, a tree, a hashing algorithm, and/or the like. Accordingly, the virtual blocks 145 and/or virtual addresses 195 may comprise intermediate identifiers between the LIDs of the logical address space 122 and storage units 197 of the storage resource(s) 190. The data services module 110 may be configured to select a block size (e.g., configuration for the virtual blocks 145) based on any number of factors including, but not limited to: memory overhead (e.g., larger virtual blocks 145 may result in a fewer number of entries in the forward map 125), garbage collection complexity, sequential storage performance of the storage resource(s) 190, I/O properties of the clients 106 (e.g., preferred client block size), and/or the like.

As illustrated in embodiment 101B of FIG. 1B, the forward map 125 may comprise a tree data structure comprising entries 126 configured to associate LIDs and/or LID ranges with respective virtual blocks 145 and/or corresponding virtual addresses 195. In the FIG. 1B embodiment, the storage resource 190 may implement predetermined one-to-one mappings between virtual addresses 195 and storage units 197.

The forward map 125 may include an entry 126 configured to bind LID range 34, 2 to virtual blocks 16987, 2, an entry 126 configured to tie LID 642439 to virtual block 842, and an entry 126 that associates LID 8642439 with virtual block 11788. The translation module 124 may be configured to map virtual blocks 145 to virtual addresses 195 using a predetermined algorithm based on, inter alia, the ratio between virtual addresses 195 and virtual blocks 145, as disclosed above. In some embodiments, the forward map 125 may be configured to index the entries 126 by LID and may be structured such that the entries 126 are leaf nodes within the B+ Tree data structure. The B+ Tree data structure may comprise intermediate reference nodes 129 to facilitate efficient lookup of the entries 126. The forward map 125 may be maintained in volatile memory resources 103 of the computing system 100. The data services module 110 may be configured to checkpoint the forward map 125 (e.g., store portions of the forward map 125 on non-volatile storage) in order to, inter alia, ensure that the forward map 125 is persistent and crash-safe.

Figure 1C:
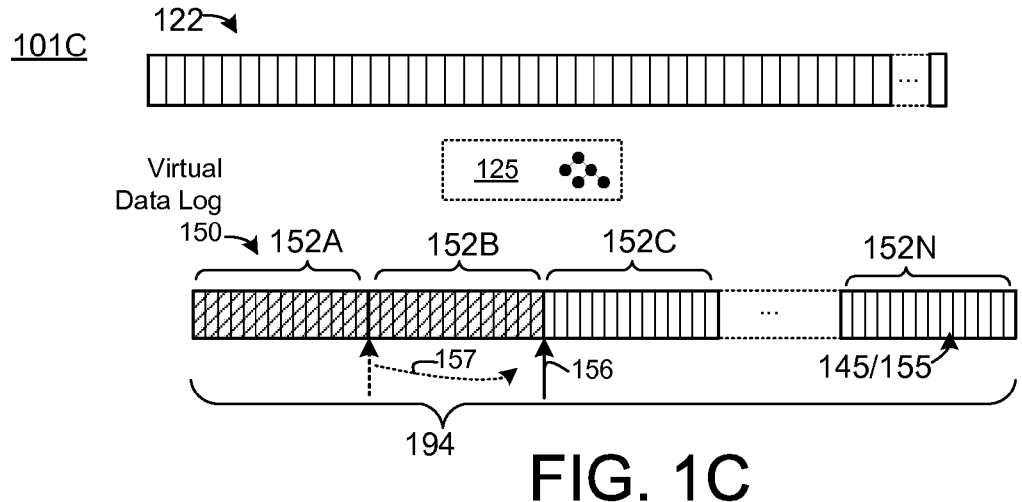
FIG. 1C depicts embodiments of log operations of a data services module.

The data services module 110 may be configured to service I/O requests by use of, inter alia, a storage module 118. The storage module 118 may be configured to store data pertaining to I/O requests received through the interface 112 on one or more storage resources 190. In some embodiments, the storage module 118 is configured to store data within a log on the storage resource 190 by use of a log module 130. The log module 130 may comprise a data log module 132 configured to manage a VDL 150, as illustrated in FIG. 1C. In the embodiment 101C of FIG. 1C, the VDL 150 may comprise a plurality of VDL segments 152A-N, which may comprise sets, ranges, and/or extents of log storage units 155. The log storage units 155 may correspond to respective virtual blocks 145, which, as disclosed above, may correspond to respective virtual addresses 195 of the storage resource address space 194. The translation module 124 may be configured to associate LIDs of the logical address space 122 with respective log storage units 155 (e.g., virtual blocks 145) by use of, inter alia, the forward map 125. The log storage units 155 may correspond to storage units 197 of the storage resource 190, as disclosed above.

The data log module 132 may be configured to append data within the log segments 152A-N according to a particular fill pattern and/or sequence. In some embodiments, the data log module 132 is configured to append data sequentially within the segments 152. The data log module 132 may be configured to maintain an append point 156 for the VDL 150. The append point 156 may correspond to the head of the VDL 150. The data log module 132 may be configured to append data at the log storage unit 155 corresponding to the append point 156, and then advance the append point 156 sequentially within the storage resource address space 194 (e.g., append data to log storage units 155 of a log segment 152 according to a particular order and/or sequence). Upon filling a log segment 152, the data log module 132 may advance the append point 156 to a next available VDL segment 152A-N. As used herein, an "available" VDL segment 152A-N refers to a VDL segment 152A-N that has been initialized and/or is capable of storing log data (e.g., is not currently in use to reference valid data that needs to be retained within the VDL 150). In the FIG. 1C embodiment, the data log module 132 has filled the VDL segment 152A (e.g., has written data to all of the log storage locations 155 in segment 152A). The data log module 132 may, therefore, advance 157 the append point 156 to a next available VDL segment 152B-N. The log segment 152B may be currently in use (is not initialized), and, as such, the data log module 132 may advance 157 the append point 156 to VDL segment 152C, which has been initialized and is ready for new append operations. After filling a last VDL segment 152N, the data log module 132 may wrap around the storage resource address space 194. Accordingly, the data log module 132 may treat the storage resource address space 194 as a circuit and/or cycle.

Figure 1D:
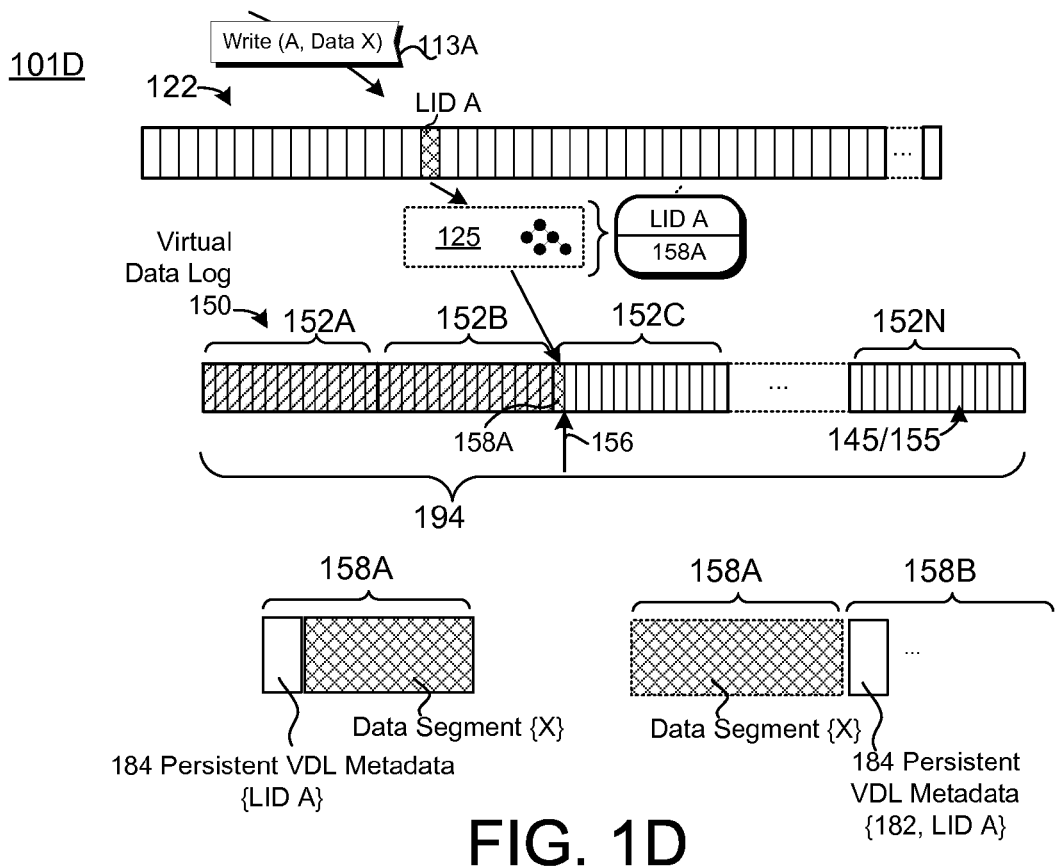
FIG. 1D depicts further embodiments of log operations.

The data log module 132 may be configured to service I/O requests by, inter alia, appending data to the VDL 150. FIG. 1D depicts one embodiment 101D of an operation to append data to the VDL 150. The append operation of FIG. 1D may be performed in response to an I/O request 113A. The I/O request 113A may comprise a request to write data to a LID within the logical address space 122 (e.g., write data X to LID A). The I/O request 113A may be received through the interface 112 of the data services module 110.

Servicing the I/O request 113A may comprise appending data to the VDL 150, which may comprise writing data X at the append point 156 within the VDL 150 (at log storage unit 158A). Servicing the I/O request 113A may further comprise creating an entry in the forward map 125 to bind LID A to the log storage unit 158A comprising the data X. In some embodiments, the data log module 132 may be further configured to store persistent metadata in the VDL 150 to persist the binding between LID A and log storage location 158A. The data log module 132 may be configured to process data segments for storage within the VDL 150, which may comprise encapsulating data segments (data X) into containers, such as packets, that are configured to associate the data segments with persistent VDL metadata 184. As depicted in FIG. 1D, data stored in log storage location 158A may comprise a data segment (data X) with persistent VDL metadata 184 configured to associate the data segment X with LID A. Alternatively, the data log module 132 may be configured to store a mapping note (e.g., persistent VDL metadata 184) separately from data segment(s) and/or in separate data structures within the VDL 150. FIG. 1D depicts another embodiment of persistent VDL metadata 184 stored within a log storage location 158B different from the log storage location 158A comprising the data X. The persistent VDL metadata 184 may be configured to associate the data stored in log storage location 158A with the LID A, as disclosed above. Although particular embodiments of persistent VDL metadata 184 are taught herein, the disclosure is not limited in this regard and could be adapted to maintain persistent VDL metadata 184 and/or associations between persistent VDL metadata 184 and data segments within the VDL 150 using any suitable data structure and/or technique. Alternatively, or in addition, the data services module 110 may be configured to maintain metadata pertaining to the VDL 150 in a separate metadata log managed by the metadata log module 134. In such embodiments, data may be appended to the VDL 150 without persistent VDL metadata 184 and/or without encapsulating the data in a container.

Figure 1E:
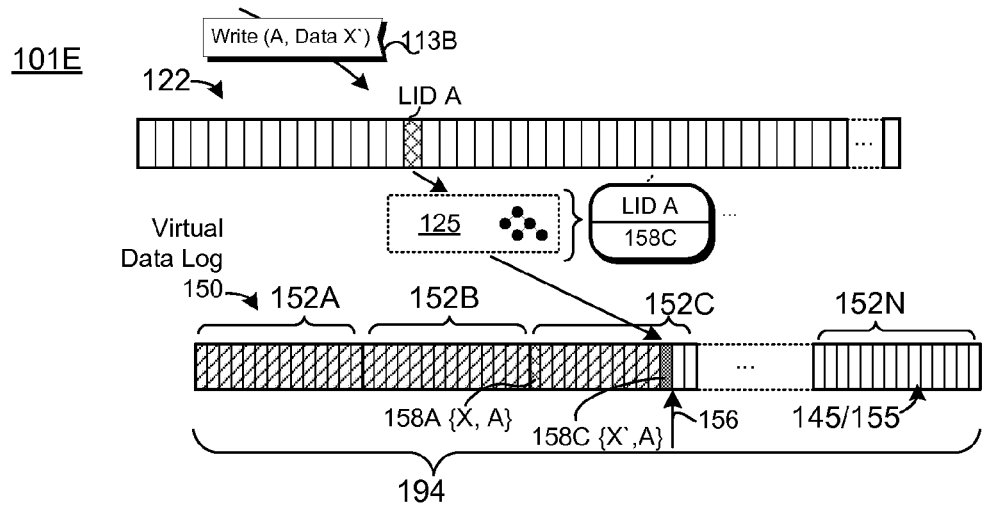
FIG. 1E depicts further embodiments of log operations.

The data services module 110 may be configured to perform storage operations out-of-place within the VDL 150. As used herein, performing storage operations "out-of-place" refers to performing storage operations that pertain to the same front-end identifiers (the same LIDs) at different log storage locations 155 within the VDL 150. Performing storage operations out-of-place may enable the data log module 132 to manage the VDL 150 as an append-only log structure. FIG. 1E depicts one embodiment 101E of an out-of-place storage operation pertaining to LID A. After servicing the I/O request 113A, the data log module 132 may continue servicing other I/O requests, which may comprise appending data to the VDL 150. The data services module 110 may receive a subsequent I/O request 113B pertaining to LID A. The I/O request 113B may correspond to modifying and/or overwriting the data associated with LID A (e.g., overwriting data X with data X'). In response, the data log module 132 may append data X' to the VDL 150 at a new log storage location 158C (at the current append point 156) rather than modifying the data "in-place" (e.g., instead of overwriting data X in log storage location 158A). Servicing the I/O request 113B may further comprise binding LID A to the log storage location 158C comprising data X' using, inter alia, an entry in the forward map 125. The data X' may be stored with persistent VDL metadata 184 configured to bind the data at log storage location 158D to LID A, as disclosed above.

The data log module 132 may be configured to maintain an order of data within the VDL 150. The data services module 110 may be configured to rebuild portions of the forward map 125 based on the data stored in the VDL 150. In some embodiments, the VDL segments 152A-N comprise respective VDL sequence metadata configured to define a relative order of the segments 152A-N in the VDL 150. The VDL sequence metadata may be assigned to VDL segments 152A-N when the segments 152A-N are initialized (by the garbage collector 136, as disclosed below), when the segments 152A-N are first used by the data log module 132, when the segments 152A-N are filled, and/or the like. Accordingly, the order of the VDL segments 152A-N may be independent of the underlying virtual blocks 145 (and/or corresponding virtual addresses 195) of the segments 152A-N. In some embodiments, the VDL sequence metadata is stored within the segments 152A-N themselves (e.g., in a header, footer, and/or the like). Alternatively, or in addition, the VDL sequence metadata may be stored in separate storage location(s), such as the metadata log, disclosed below.

The data log module 132 may be further configured to append data within the VDL segments 152A-N according to a predetermined order and/or pattern. The data log module 132 may, for example, be configured to increment the append point 156 sequentially within a range and/or extent of virtual blocks 145 (e.g., virtual addresses 195) corresponding to a particular VDL segment 152A-N. Accordingly, the relative order of data stored within log storage units 155 of the VDL 150 may be determined by use of: a) VDL sequence metadata of the corresponding VDL segment 152A-N and b) the relative order of the log storage unit 155 within the VDL segment 152A-N. In embodiment 101E of FIG. 1E, the log storage unit 158C comprising data X' is later in the VDL log sequence than the log storage unit 158A comprising data X (based on the relative order of the log storage units 158A and 158C within the segment 152C). The data X' at log storage unit 158C may be distinguished from the invalid data of log storage unit 158A based on, inter alia, the relative order of the log storage units 158C and 158A in the VDL 150.

In some embodiments, the data log module 132 is configured to append data to the VDL 150 according to the order in which the corresponding I/O requests were received. The order of the VDL 150 may, therefore, correspond to a temporal and/or an operational order of I/O requests. In other embodiments, the data log module 132 may not enforce strict temporal ordering in the VDL 150. The data log module 132 may be configured to service I/O requests out of order within the VDL 150 by, inter alia, queuing, buffering, and/or scheduling the I/O requests. I/O requests may be serviced out of order due to differences in storage resource performance and/or availability, quality of service (QoS) policies, and/or the like. The temporal order of I/O requests and/or operations may be maintained in a separate data structure, such as the metadata log, disclosed below.

Referring to FIG. 1E, appending data X' at log storage unit 158C may render the data in log storage unit 158A invalid. As used herein, "invalid data" refers to data that does not need to be retained by the data services module 110 (e.g., data that does not need to be persisted within the VDL 150 and/or on a storage resource 190). In some embodiments, the data log module 132 may be configured to maintain validity metadata, such as a bitmap and/or other data structure(s), configured to indicate the validity of log storage units 155 within respective segments 152A-N of the VDL 150. The data log module 132 may be configured to mark log storage units 155 invalid in response to I/O request(s), such as requests to modify and/or overwrite data out-of-place in the VDL 150, requests to deallocate, erase, delete, and/or TRIM data from the VDL 150, and/or the like. Servicing the I/O request 113B to write data X' to LID A may, therefore, comprise marking the log storage unit 158A invalid. Alternatively, or in addition, log segments 152 comprising invalid data may be identified by use of the forward map 125 (and/or other metadata). The data services module 110 may determine that log storage units 155, which are mapped to one or more LIDs in the forward map 125, correspond to valid data, and that log storage units 155 that do not exist in the forward map 125 are invalid. In the FIG. 1E embodiment, the forward map 125 binds LID A to log storage unit 158C; the log storage unit 158A is not referenced in the forward map 125 and, as such, may be identified as invalid.

Referring back to FIG. 1A, the log module 130 may comprise a garbage collector 136 configured to reclaim storage resources 190 by, inter alia, removing invalid data from the VDL 150. The garbage collector 136 may be configured to reclaim VDL segments 152 by a) scanning the VDL 150 to identify VDL segments 152 to reclaim; and b) relocating valid data within the identified VDL segments 152 (if any). The garbage collector 136 may be further configured to re-initialize reclaimed VDL segments 152, which may comprise preparing the log segments 152 for use by the data log module 132.

The garbage collector 136 may be configured to distinguish valid data from invalid data by use of dedicated validity metadata pertaining to the VDL 150. Alternatively, or in addition, the garbage collector 136 may be configured to identify invalid data by use of the forward map 125 (and/or other mapping data structure(s)). As disclosed above, log storage units 155 that are bound to LIDs in the forward map 125 correspond to valid data, and log storage units 155 that are unbound (do not correspond to a valid entry 126 in the forward map 125) correspond to invalid data. As disclosed in further detail herein, the garbage collector 136 may identify invalid data using a mark-and-sweep approach and/or other suitable technique (e.g., reference count).

The garbage collector 136 may be configured to relocate data from a VDL segment 152 that is being reclaimed by a) determining a relocation plan, and b) implementing the determined relocation plan. Determining a relocation plan may comprise identifying other log storage unit(s) 155 available to store the valid data. The identified storage unit(s) 155 may correspond to the current VDL append point 156. Alternatively, and as disclosed in further detail herein, data may be relocated to a different log, different storage resource 190, and/or the like. Implementing the determined relocation plan may comprise copying the data to the identified log storage units 155 (e.g., appending the valid data to the head of the VDL 150), moving the data to the identified log storage units 155, and/or the like.

Figure 1F:
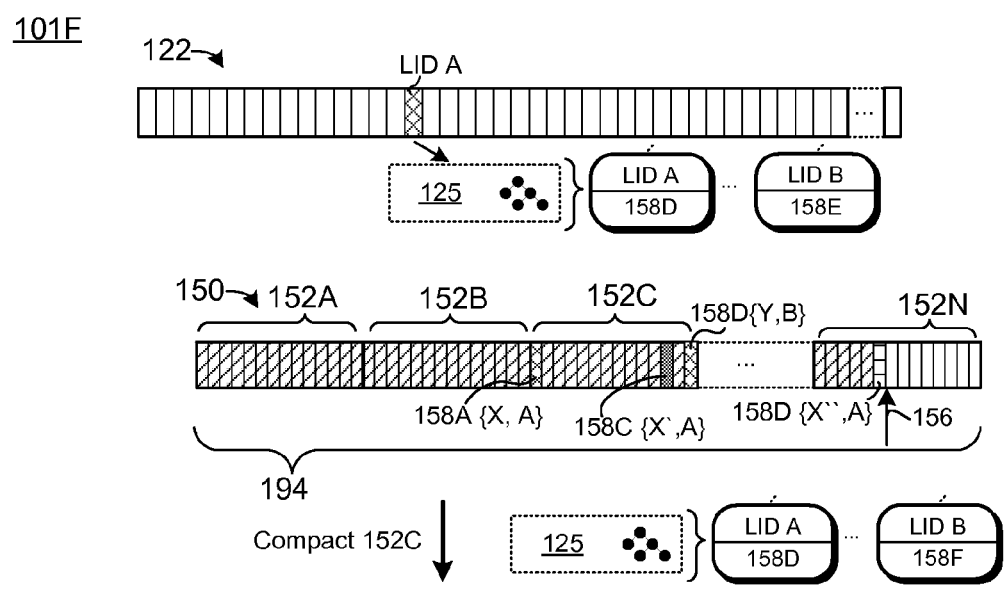
FIG. 1F depicts further embodiments of log operations.
Figure 1F:
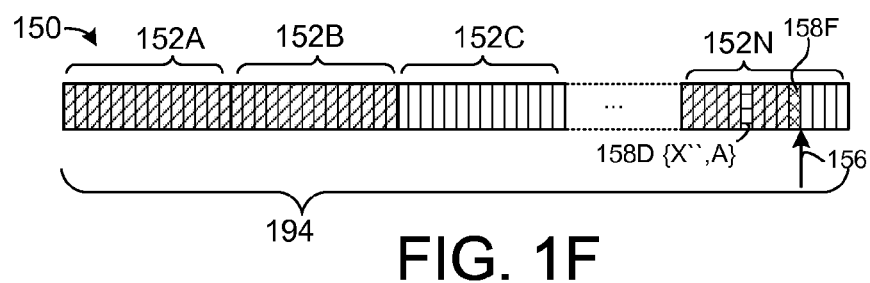

FIG. 1F depicts one embodiment 101F of an operation to recover a segment 152 of the VDL 150. As illustrated in FIG. 1F, the data log module 132 may have written data X" to LID A at log storage unit 158D, rendering the data at log storage units 158A and 158C invalid. In addition, data of LID B was written to log storage location 158F of segment 152C. As used herein, compaction, garbage collection, recovery, and/or reclamation refers to an operation to prepare a segment 152 of the VDL 150 for reuse. As disclosed above, the garbage collector 136 may be configured to perform compaction operations by a) scanning the VDL 150 to identify segments 152 suitable for recovery, b) relocating valid data in the identified segments 152, and c) preparing the segments 152 for reuse.

The compaction operation of FIG. 1F may be configured to reclaim segment 152C. The segment 152C may comprise invalid data (e.g., data in log storage locations 158A and 158C) as well as valid data, including data of LID B stored in log storage unit 158D. Valid data may be identified by use of the mapping entries in the forward map 125, as disclosed herein. The compaction operation may comprise relocating valid data in the segment 152C. Relocating the valid data may comprise appending the valid data to the VDL 150 at the current append point 156. As illustrated in FIG. 1F, the data of LID B may be relocated to log storage unit 158F in segment 152N. Relocating the valid data may further comprise updating the forward map 125 to bind the relocated data to new log storage location(s) 155 (e.g., bind LID B to log storage location 158F).

The compaction operation may further comprise preparing the segment 152C for reuse (re-initializing the segment 152). Preparing the segment 152C may comprise marking the segment 152C as available to store new data, placing the segment 152C into a write queue, and/or the like. Preparing the segment 152C may further comprise erasing and/or deallocating storage resources 190 associated with the segment 152C by, inter alia, informing the underlying storage resource 190 that data corresponding to segment 152C does not need to be retained. The segment 152C may be deallocated by use of coordination information communicated between the data services module 110 and the storage resource 190. The coordination information may comprise deallocation messages configured to identify the virtual blocks 145 (and/or corresponding virtual addresses 195) comprising the reclaimed segment 152C (e.g., TRIM messages, erase messages, erase commands, and/or the like). Further embodiments of systems and methods for coordinating deallocation are disclosed in U.S. patent application Ser. No. 14/075,951, entitled "Systems and Methods for Log Coordination," filed Nov. 8, 2013 for Nisha Talagala et al., which is hereby incorporated by reference in its entirety. As used herein, a LID that is TRIMed, deleted, and/or erased, refers to a LID that is no longer in use to reference data stored on a storage resource 190. Accordingly, a LID that has been TRIMed, deleted, and/or erased, may refer to a LID that was previously being used to referenced stored data. Data. Alternatively, a LID referred to as "unmapped and/or "untranslated" may correspond more generally to a LID that is not currently in use to reference data on a storage resource 190 (e.g., regardless of whether the LID was previously associated with stored data).

As disclosed herein, the data log module 132 may be configured to append data sequentially within respective segments 152 of the VDL 150. Accordingly, the relative order of data within a segment 152 may correspond to the relative address and/or offset of the data within the segment 152 (e.g., the relative address of the storage unit 155 comprising the data within the segment 152). Segments 152 of the VDL 150 may, for example, comprise M log storage units 155, and the data log module 132 may be configured to append data to the segments 152 sequentially from 1 to M. The relative order of data stored within a segment 152 may, therefore, be determined by the relative offset and/or address of data within the segment 152. Specifically, the relative order of data in a segment 152 ranges from the oldest data (earliest in time or earliest received) at log storage unit 1, to the most recent data in the segment in log storage unit M.

The data log module 132 may be further configured to maintain an ordered sequence of segments 152. As disclosed above, after filling the log storage units 155 of a segment 152, the data log module 132 may be configured to advance the append point 156 to a next available segment 152. The next available segment 152 may not correspond to the next sequential address in the storage resource address space 194. The next available segment 152 may be determined according to the availability of erased and/or initialized segments 152, as disclosed in further detail herein (e.g., segments 152 in a write queue). Accordingly, the next available segment 152 may be at a non-sequential storage address and/or on another storage resource 190 (as disclosed in further detail herein).

Figure 1G:
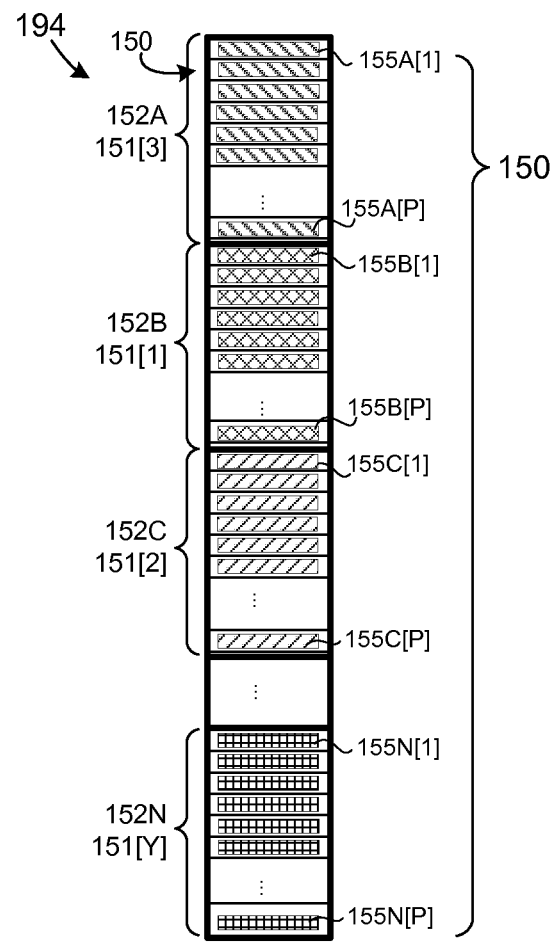
FIG. 1G depicts further embodiments of log operations.
Figure 1G:
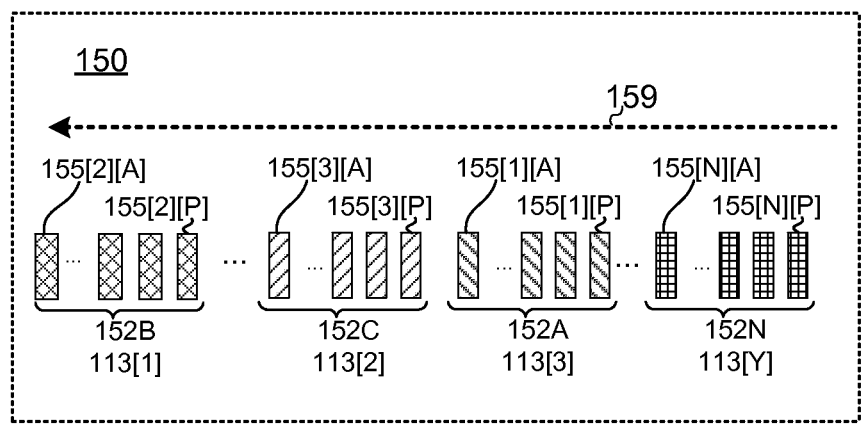

In the 101G embodiment of FIG. 1G, the VDL 150 comprises segments 152A-N, each of which comprises P log storage units 155. As depicted in FIG. 1G, the data log module 132 may be configured to associate segments 152A-N of the VDL 150 with respective sequence metadata 151 (sequence metadata 151[1]-151[Y]). The sequence metadata 151 may be configured to define a log order of the segments 152A-N, which, in part, may be used to determine log order 159 of the VDL 150. As disclosed above, a "log order" of a log, such as the VDL 150, refers to an order of data stored within the log. The log order of the VDL 150 may, therefore, correspond to an order in which data is appended to the VDL 150.

In the FIG. 1G embodiment, the data log module 132 has appended data to log storage units 155A[1]-155A[P] sequentially in the storage address space of segment 152A (e.g., within the log storage units 152A[1]-152A[P]), such that the data stored in log storage unit 155A[P] is later in the log order 159 (more recent) relative to the data stored in log storage unit 155A[1]. FIG. 1G further illustrates data stored sequentially within log storage units 155 of other segments 152: segment 152B comprises data stored sequentially within log storage units 155B[1]-155B[P], segment 152C comprises data stored sequentially within log storage units 155C[1]-155C[P], segment 152N comprises data stored sequentially within log storage units 155N[1]-155N[P], and so on.

The data log module 132 may be configured to assign respective sequence information 151[1]-151[Y] to the segments 152A-N. The sequence information 151[1]-151[Y] may be configured to define the order in which the segments 152A-N were filled. Accordingly, the order in which the data was appended to the VDL 150 may be defined by, inter alia, sequence information 151[1]-151[Y] of the segments 152A-N and/or the relative addresses of the log storage locations 155 within the respective segments 152A-N. In some embodiments, the sequence information 151[1]-151[Y] may be stored on the storage resource 190 and/or in the VDL 150. In some embodiments, the sequence information 151[1]-151[Y] is stored at predetermined locations within the segments 152A-N (e.g., in a header, at a predetermined offset, and/or the like). The sequence information 151[1]-151[Y] may be stored when the segments 152A-N are prepared for use by the data log module 132 (e.g., re-initialized), when the segments 152[1]-152[N] are placed in a write queue, when the data log module 132 fills the respective segments 152A-N, and/or the like.

In the FIG. 1G embodiment, the sequence metadata 151[Y] may correspond to the most recently written (youngest) segment 152 in the VDL 150, and the sequence metadata 151[1] may correspond to the earliest (oldest) segment 152.

Therefore, the log order 159 of the VDL 150 may be 152N (head of the log), 152A, 152C, to 152B (tail of the log). The order of the individual log storage locations 155 may be determined based on the sequence information 151[1]-151[Y] assigned to the segments 152 and the relative order of the log storage unit(s) 155 within the segments 152.

As disclosed above, the log storage operations performed by the data log module 132 may not be strictly ordered time. Accordingly, in some instances, data segments may be appended to the VDL 150 in a different order from the order in which the corresponding I/O requests were received by the data services module 110. The data log module 132 may append data out of order within the VDL 150 due to any number of conditions including, but not limited to: performance considerations, a QoS policy, availability of the data to be written to the VDL 150 (e.g., data source bandwidth, direct memory access (DMA) latency, and/or the like), back-end storage resource availability (e.g., bandwidth to/from storage resources 190), and/or the like. Moreover, and as disclosed in further detail herein, the VDL 150 may correspond to a plurality of different storage resources 190, which may have different performance characteristics, resulting in different latencies for I/O operations performed thereon.

Figure 1H:
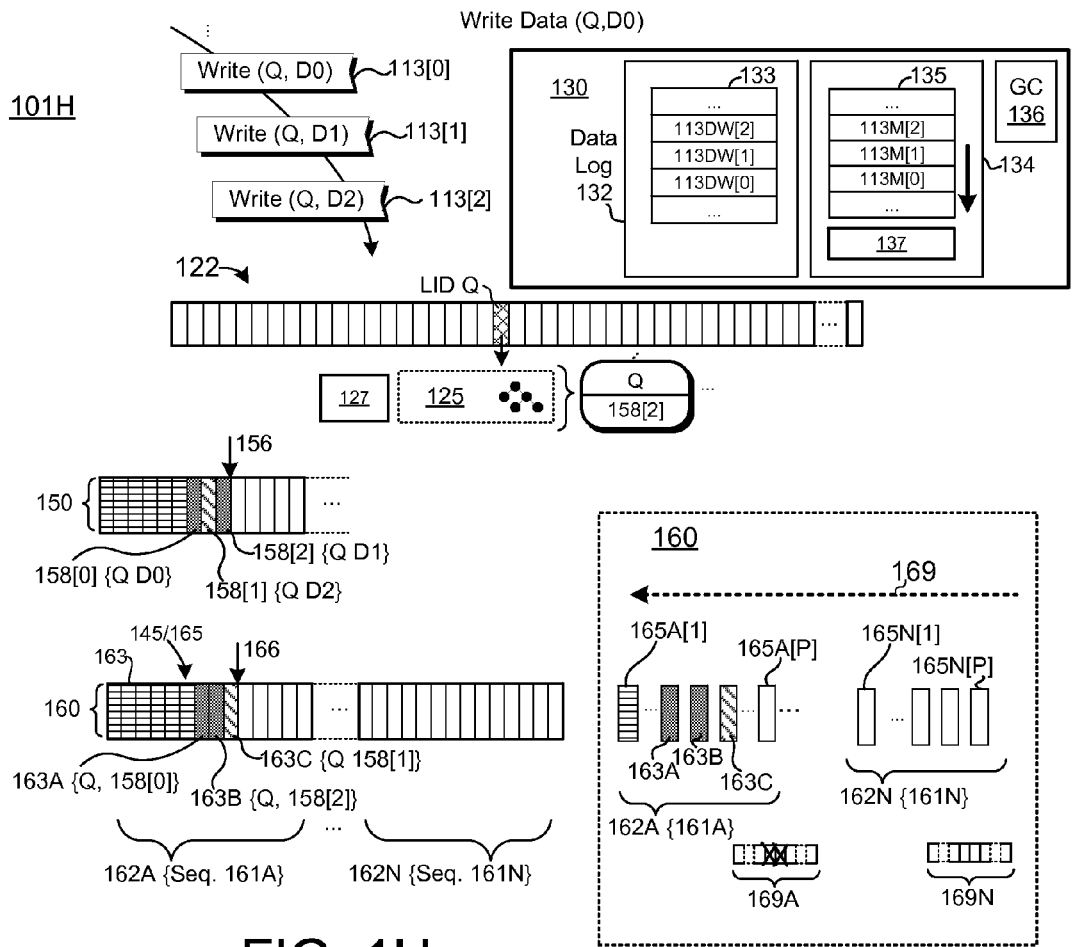
FIG. 1H depicts embodiments of metadata log operations.

Referring to embodiment 101H depicted in FIG. 1H, the data services module 110 may comprise a metadata log module 134 configured to maintain an ordered metadata log 160 on a storage resource 190. The metadata log 160 may define an ordered sequence of storage operations performed by use of the data services module 110, regardless of the log order 159 of the VDL 150.

The metadata log 160 may comprise an ordered sequence of metadata pertaining to the I/O operations serviced by the data services module 110. As used herein, an "ordered sequence of metadata" refers to data stored in a manner that defines an order of the metadata (e.g., defines a relative order of segments 152 of the VDL 150 and/or log storage units 155 within the segments 152, as disclosed above). The metadata log 160 may include, inter alia, mapping metadata, such as mapping entries 163, which may comprise persistent metadata configured to bind a LID of the logical address space 122 to one or more log storage units 155 (e.g., virtual blocks 145 and/or virtual addresses 195). As disclosed in further detail herein, the metadata log 160 may further comprise logical manipulation entries configured to modify associations between LIDs and data stored in the VDL 150. The mapping entries 163 of the metadata log 160 may correspond to entries 126 of the forward map 125. The metadata log 160 may comprise a plurality of segments 162A-N. The segments 162A-N may comprise respective metadata log storage units 165, which may correspond to virtual blocks 145 and/or virtual addresses 195 of one or more storage resources 190. As illustrated in FIG. 1H, the segments 162A-N may be assigned respective sequence metadata 161A-N, which may correspond to the order in which the segments 162A-N were programmed by the metadata log module 134. Accordingly, the sequence metadata 161A-N may define a temporal order of the segments 162A-N within the metadata log 160. As disclosed above, the metadata log module 134 may be configured to append mapping metadata sequentially to metadata log storage units 165 within respective segments 162A-N. Therefore, the temporal order of mapping metadata stored in a particular metadata log storage unit 165 of the metadata log 160 may be determined based on: a) the sequence metadata 161A-N of the segment 162A-N comprising the particular metadata log storage unit 165; and b) the address and/or offset of the particular metadata log storage unit 165 within the segment 162A-N. Although particular mechanisms for ordering the metadata log 160 as described herein, the disclosure is not limited in this regard and could be adapted to order the metadata log 160 (and/or other logs disclosed herein) using any suitable technique including, but not limited to: applying sequence information to each log entry, time stamping each log entry, and/or the like.

The metadata log 160 may be configured to manage the logical interface to data stored in the VDL 150. As disclosed above, the "logical interface" to data stored in the VDL 150 may correspond to the LIDs bound to the data by use of, inter alia, the forward map 125 and/or other metadata. The metadata log 160 may comprise an ordered, persistent, and crash-safe log of mapping metadata configured to manage the logical interface to data stored in the VDL 150 which may include, but is not limited to: allocating LIDs, binding LIDs to data stored in the VDL 150, deallocating LIDs (e.g., invalidating LID bindings), moving LID ranges (e.g., binding data in the VDL 150 to different sets of LIDs), replicating LID ranges (e.g., cloning and/or snapshotting particular sets of LIDs, providing for referencing the same data in the VDL 150 through two or more different sets of LIDs), merging LID ranges, and/or the like. Accordingly, as used herein, the metadata log 160 refers to a persistent, ordered log comprising mapping metadata configured to manage the logical interface to data in the VDL 150 by: a) binding LIDs of the logical address space 122 to data storage locations in the VDL 150 and/or b) implementing logical manipulation operations pertaining to said bindings.

The metadata log module 134 may be configured to append mapping entries 163 to the ordered metadata log 160 in accordance with the order in which the corresponding I/O requests 113 were received. As disclosed above, the data log module 132 may not enforce strict temporal ordering in the VDL 150 and, as such, the order of I/O operations reflected in the metadata log 160 may differ from the log order 159 of the VDL 150.

In some embodiments, the metadata log module 134 comprises an ordered metadata log queue 135. The metadata log queue 135 may comprise mapping metadata corresponding to I/O requests 113 received at the data services module 110. The metadata log queue 135 may be ordered such that the metadata log module 134 appends mapping metadata to the metadata log 160 in accordance with the order in which the corresponding I/O requests 113 were received. In some embodiments, the metadata log queue 135 comprises a first-in-first-out (FIFO) buffer and/or other ordered buffer. The metadata log module 134 may be configured to append mapping entries 163 to the metadata log 160 in accordance with the order of the corresponding mapping metadata in the ordered metadata log queue 135. In some embodiments, the metadata log module 134 comprises a queue management module 137 configured to ensure that mapping metadata is appended to the metadata log 160 in accordance with the order of the mapping metadata in the ordered metadata log queue 135. The data log module 132 may comprise a data log queue 133 configured to queue I/O operations corresponding to I/O requests 113 received at the data services module 110. In some embodiments, the data log queue 133 is ordered such that data operations are issued to the storage resource 190 in accordance with the order in which the I/O requests 113 were received. The data log module 132 may be configured to process entries of the data log queue 133 in order, as disclosed above. Alternatively, the data log module 132 may be configured to implement data storage operations out of order in accordance with the availability of storage resources 190, I/O bandwidth, data transfer bandwidth (e.g., DMA bandwidth), and/or the like.

In the FIG. 1H embodiment, the data services module 110 may receive a plurality of I/O requests 113, including I/O requests 113[0]-113[2]. The I/O requests 113[0]-113[2] may comprise requests to write data to LID Q. The I/O requests 113[0]-113[2] may be received in a particular order: 113[0] may be received first, followed by 113[1], then followed by 113[2]. The data log module 132 may queue corresponding data write operations in the data log queue 133 (e.g., data write operations 113DW[2], 113DW[1], and 113DW[0]). The data log module 132 may implement the data write operations 113DW[0]-113DW[2] by appending data to the VDL 150 at respective log storage units 158[0], 158[1], and 158[2]. In the FIG. 1H embodiment, the data may be appended to the VDL 150 out of order such that data D1 of I/O request 113[1] is appended after data D2 of I/O request 113[2].

The translation module 124 may be configured to update the forward map 125 in accordance with the order in which the I/O requests 113[0]-113[2] were received at the data services module 110 (e.g., by use of an ordered queue, by implementing updates in serial, thread-safe operations, and/or the like). Accordingly, the forward map 125 may reflect the order of the I/O requests 113[0]-113[2], and, as such, the forward map 125 comprises an entry 126 to bind LID Q to data D2 at log storage location 158[1] regardless of the order of the corresponding data within the VDL 150. In some embodiments, the translation module 124 is configured to update the forward map 125 in a serial, thread-safe operation, which may include a) obtaining a lock on the forward map 125, b) modifying the forward map 125 (e.g., adding, removing, and/or modifying one or more entries 126 of the forward map 125), and c) unlocking the forward map 125. The translation module 124 may perform a serial, thread-safe operation for each I/O request 113 received at the data services module 110.

The forward map 125 may, however, be maintained in volatile memory resources 103 of the computing system 100 and, as such, may be subject to loss and/or corruption. The data services module 110 may comprise a metadata management module 128 configured to, inter alia, reconstruct the forward map 125 and/or other metadata by use of a metadata log 160. Reconstructing the forward map 125 from the contents of the VDL 150 alone, however, may result in errors due, inter alia, to the lack of strict ordering in the VDL 150. In the FIG. 1H embodiment, for example, the metadata management module 128 may incorrectly associate LID Q with data D1 at log storage location 158[2] due to the log order 159 of the data D0-D2 within the VDL 150 (e.g., order of log storage locations 158[0]-158[2]). The data services module 110 may, therefore, be configured to maintain a separate metadata log 160, configured to maintain the relative order of I/O operations performed in the VDL 150. As disclosed above, the metadata log 160 may comprise ordered mapping metadata configured to a) bind to data to LIDs and/or b) manipulate said bindings (e.g., move data, replicate sets of LIDs, clone sets of LIDs, merge sets of LIDs, move data, and/or the like). Moreover, the metadata log 160 may be ordered such that the logical interface metadata stored therein corresponds to the order in which the associated I/O requests 113 were received at the data services module 110. The metadata log 160 may comprise a plurality of metadata log storage locations 165, which may correspond to virtual blocks 145 (and/or corresponding virtual addresses 195) associated with one or more storage resources 190. In some embodiments, the metadata log 160 is stored on the same storage resource(s) 190 as the VDL 150. Alternatively, the metadata log 160 may be stored on one or more storage resource(s) 190 that are separate from and/or independent of the storage resource 190 used by the data log module 132. The metadata log storage locations 165 may be partitioned into respective segments 162A-N, as disclosed herein.

As illustrated in FIG. 1H, the metadata log module 134 may be configured to assign respective sequence metadata 161A-N to the segments 162A-N of the metadata log 160. The sequence metadata 161A-N may define an ordered sequence of segments 162A-N within the metadata log 160. The metadata log module 134 may be further configured to append data within metadata log storage units 165 within respective segments 162A-N in accordance with a predetermined pattern, such as a sequential storage pattern as disclosed herein. The segments 162A-N may, for example, each comprise P metadata log storage units 165 such that segment 162A comprises metadata log storage units 165A[1]-165A[P], segment 162N comprises metadata log storage units 165N[1]-165N[P], and so on. The metadata log module 134 may be configured to append data sequentially within a segment 162 (at a metadata log append point 166) until the segment is filled, and then advance the metadata log append point 166 to a next available segment 162A-N as disclosed herein. The metadata log module 134 may be configured to append data sequentially within the segments (from metadata log storage unit 1 through P). Accordingly, the log order 159 of data within the metadata log 160 may be determined by: a) the sequence metadata 161A-N associated with the log segments 162A-N and b) the relative location of the metadata log storage units 165 within the respective log segments 162A-N.

In the FIG. 1H embodiment, the metadata log module 134 is configured to append mapping metadata (mapping entries 163A-C) to the metadata log 160. The mapping entries 163A-C may correspond to the I/O operations performed in response to the I/O requests 113[0]-113[2]. The mapping entries 163A-C may be appended to the metadata log 160 in the order in which the I/O requests 113[0]-113[2] were received. As illustrated in FIG. 1H, the mapping entries 163A-C may associate the LID Q to respective metadata log storage locations 165 within the VDL 150. As illustrated in FIG. 1H, the mapping metadata of the mapping entries 163A-C may comprise tuples (and/or other data structures) configured to associate a particular LID with a particular VDL storage unit 155. The mapping entry 163A corresponds to the I/O request 113[0] and binds LID Q to data D0 stored at log storage unit 158[0], mapping entry 163B corresponds to the I/O request 113[1] and binds LID Q to data D1 stored at log storage unit 158[2], and mapping entry 163C corresponds to the I/O request 113[2] and binds LID Q to data D2 stored at log storage unit 158[1]. Accordingly, the mapping entries 163A-C in the metadata log 160 reflect the order of the I/O requests 113[0]-113[2], regardless of the ordering of the corresponding data in the VDL 150. As disclosed above, in some embodiments, the metadata log module 134 comprises an ordered metadata log queue 135, which may comprise metadata operations 113M[0]-113M[2] corresponding to the I/O requests 113[0]-113[2]. The metadata log module 134 may be configured to append mapping metadata (mapping entries 163A-C) to the metadata log 160 in accordance with the order of the metadata operations 113M[0]-113M[2] in the metadata log queue 135. In some embodiments, the metadata log module 134 comprises a queue management module 137 configured to ensure that metadata pertaining to the operations 113M[0]-113M[2] are appended in order. The queue management module 137 may lock the metadata log queue 135 (prevent operations from being taken from the queue 135 for processing) while a metadata operation is being written to the metadata log 160, and may unlock the queue 135 to allow a next metadata operation to be processed, in response to an acknowledgement that the write operation has completed.

In response to loss and/or corruption of the volatile memory resources 103, the metadata management module 128 may reconstruct the forward map 125 (and/or other metadata) by use of the metadata log 160. The metadata management module 128 may be configured to access the metadata log 160 in log order 159 to ensure that the entries 126 are accurately reconstructed. In the FIG. 1H embodiment, the metadata management module 128 may be configured to determine that the mapping entry 163C that associates LID Q with log storage unit 158[1] in the VDL 150 corresponds to the most up-to-date version of LID Q based, inter alia, on the order of the mapping entries 163A-C within the metadata log 160.

The metadata log module 134 may be further configured to append mapping entries 163 to the metadata log 160 in response to log management operations in the VDL 150. As disclosed above, the garbage collector 136 may be configured to relocate valid data during compaction operations. Relocating valid data may comprise updating one or more entries 126 in the forward map 125 to bind LIDs to new log storage units 158 in the VDL 150. Relocating valid data may further comprise appending a mapping entry 163 to the metadata log 160 to identify the new storage location of the LID within the VDL 150. Referring back to FIG. 1F, the garbage collection operation to reclaim segment 152C may comprise writing a mapping entry 163 to the metadata log to tie LID B to the log storage unit 158F.

The data services module 110 may be configured to implement deallocation operations by use of, inter alia, the metadata log module 134. As used herein, a deallocation operation refers to an operation configured to deallocate a LID (e.g., remove an association, binding, tie, and/or mapping between a LID and one or more virtual addresses). A deallocation operation may comprise a hint, message, and/or command configured to indicate that a particular LID (or set of LIDs) is no longer in use and/or that the data bound to the LIDs does not need to be retained in the VDL 150. Deallocation operations implemented by the data services module 110 may be configured to ensure that operations to erase, delete, and/or otherwise deallocate LIDs are persistent and crash-safe by, inter alia, appending mapping metadata to the metadata log 160 configured to identify deallocated LIDs. The deallocation operations may be persistent and/or crash-safe regardless of whether the corresponding data is removed from the underlying storage resources 190 and/or regardless of whether the underlying storage resource(s) 190 support deallocation hints, messages, and/or commands.

A client 106 may deallocate a LID by use of a deallocation message, an erase message, an erase command, and/or the like. The deallocation message may be issued as an I/O request 113 through the interface 112 of the data services module 110 (and/or another I/O interface). The deallocation message may identify one or more LIDs that are no longer in use to reference data. In response, the translation module 124 may be configured to write one or more mapping entries 163 to the metadata log 160 to indicate that the one or more LIDs have been deallocated.

Referring to FIG. 1A, the VDL 150 may comprise segments 152 that correspond to sets, ranges, and/or extents of virtual blocks 145 (virtual addresses 195) of a storage resource 190, which may not support deallocation operations. Accordingly, data corresponding to a deallocated LID may remain on the storage resource 190. Moreover, after loss and/or corruption of the virtualization metadata, the metadata management module 128 may reconstruct an entry 126 corresponding to the deallocated data absent a persistent indication of the deallocation operation. A deallocation operation may, therefore, comprise appending a deallocation mapping entry 163 to the metadata log 160 to ensure that deallocation requests of the clients 106 are consistent and persist regardless of failure conditions. Deallocated data may be identified as invalid in a mark-and-sweep operation of the garbage collector 136 and, as such, may be removed from the VDL 150 in a storage recovery operation. Accordingly, a deallocation operation may be implemented exclusively within the metadata log 160 and without requiring storage operations in the VDL 150. A deallocation operation may further comprise issuing corresponding deallocation hints, messages, and/or commands (e.g., TRIM hints) to the corresponding storage resources 190 as disclosed above in conjunction with FIG. 1F. The data services module 110 may be configured to return "undefined," "null," "not allocated," and/or "does not exist" in response to requests pertaining to deallocated LIDs.

Figure 1I:
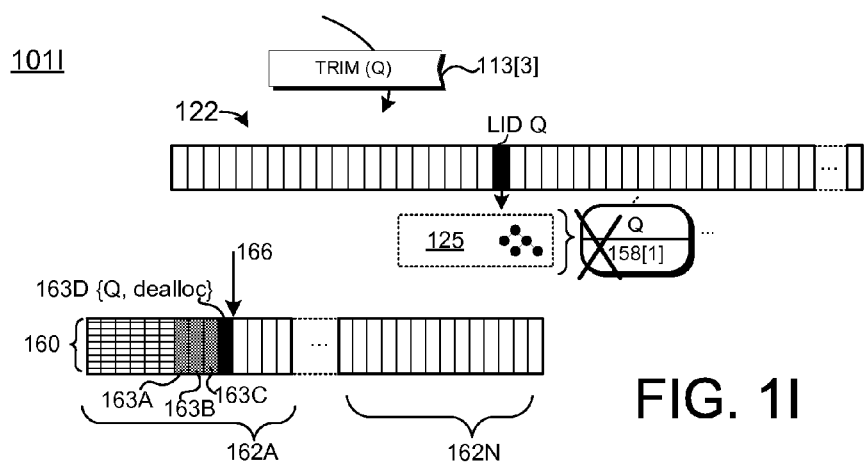
FIG. 1I depicts further embodiments of metadata log operations.

Referring to embodiment 101I of FIG. 1I, the data services module 110 may receive an I/O request 113[3] configured to deallocate LID Q (e.g., erase LID Q). In response, the translation module 124 may be configured to remove the entries 126 corresponding to LID Q from the forward map 125. In addition, the metadata log module 134 may be configured to append a mapping entry 163D to the metadata log 160 configured to deallocate LID Q (e.g., indicate that LID Q is not bound to data in the VDL 150). As illustrated in FIG. 1I, the mapping metadata of mapping entry 163D may identify the LID Q and may indicate that the LID Q is no longer in use to reference data in the VDL 150 (e.g., indicate that Q has been deallocated). Absent the deallocation mapping entry 163D, the metadata management module 128 may reconstruct a mapping between LID Q and log storage unit 158[1] based on the mapping entry 163C (as disclosed above), obviating the effect of the I/O request 113[3].

The garbage collector 136 may be configured to reclaim segments 162 of the metadata log 160. As disclosed herein, reclaiming a segment 162 of the metadata log 160 may comprise a) identifying valid mapping metadata in the segment 162 (e.g., identifying valid mapping entries 163 in the segment), and b) relocating the valid metadata within the metadata log 160. Identifying valid mapping metadata in the segment 162 may comprise identifying valid mapping entries 163 in the segment 162. As used herein, a "valid mapping metadata" and/or a "valid mapping entry" refers to mapping metadata that correlates to the forward map 125 (e.g., a mapping entry 163 that reflects an entry 126 in the forward map 125). In the FIG. 1H embodiment, the garbage collector 136 may determine that mapping entry 163C is valid since the mapping entry 163C matches the binding between LID Q and log storage unit 158[1] in the forward map 125. Invalid mapping metadata refers to mapping metadata that does not correspond to the forward map 125 (e.g., a mapping entry 163 that does not have a matching entry 126 in the forward map 125). In the FIG. 1H embodiment, the garbage collector 136 may determine that the mapping entries 163A and 163B are invalid, since neither mapping entry 163A nor mapping entry 163B binds LID Q to log storage unit 158[1]; rather, mapping entry 163A binds LID Q to log storage unit 158[0], which was rendered invalid (obsolete) by I/O request 113[1], and mapping entry 163A binds LID Q to log storage unit 158[2], which was rendered invalid (obsolete) by I/O request 113[2]. An operation to compact the segment 162A may, therefore, comprise relocating the mapping entry 163C within the metadata log 160 and removing the mapping entries 163A-B. In some embodiments, valid mapping entries 163 may be distinguished from invalid mapping entries 163 by use of the forward map 125. Alternatively, or in addition, the metadata log module 134 may be configured to maintain validity metadata, such as validity bitmaps 169A-N pertaining to the segments 162A-N of the metadata log 160. The validity bitmaps 169A-N may identify invalid entries within the segments 162A-N. In the FIG. 1H embodiment, the validity bitmap 169A corresponding to segment 162A may indicate that the mapping entries 163A and 163B are made invalid by, inter alia, entries in respective location(s) within the validity bitmap 169A. The disclosure is not limited in this regard, however, and could be adapted to use any mechanism for indicating data validity.

Figure 1J:
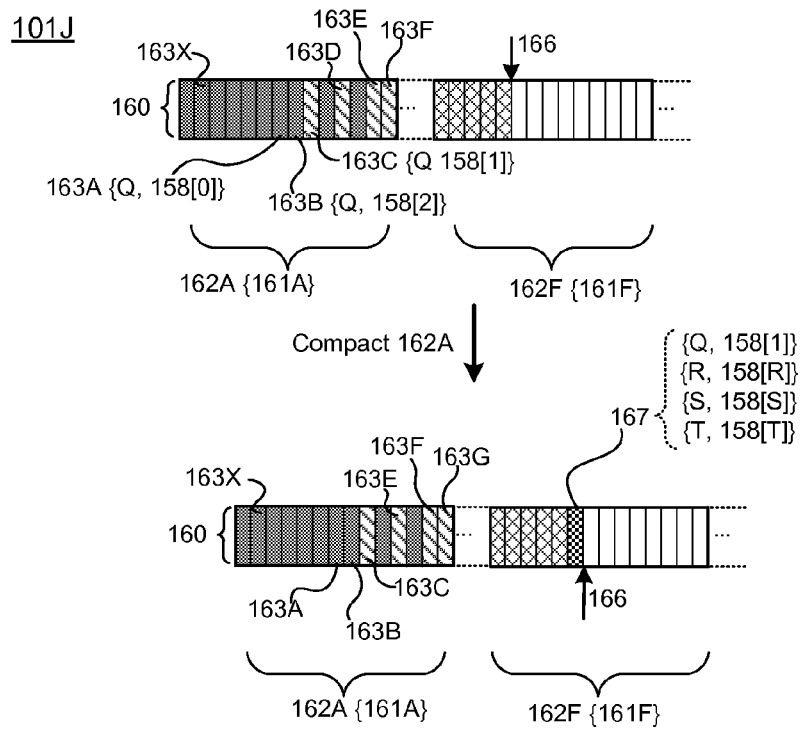
FIG. 1J depicts embodiments of garbage collection operations in a metadata log.

The metadata management module 128 may be further configured to aggregate mapping entries 163. As used herein, an "aggregate" mapping entry 167 refers to persistent metadata configured to bind two or more LIDs to respective storage location(s) within the VDL 150. The metadata management module 128 may be configured to generate aggregate mapping entries 167 in response to reclaiming a segment 162 of the metadata log 160. In the FIG. 1J embodiment 101J, the garbage collector 136 may be configured to reclaim segment 162A of the metadata log 160. The segment 162A may comprise valid mapping entries 163C and 163E-G. The segment 162 may further comprise invalid mapping entries 163X, including the invalid mapping entries 163A-B, disclosed above. Compacting the segment 162A of the metadata log 160 may comprise identifying the valid data within the segment, including mapping entries 163C and 163E-G. As disclosed above, the valid mapping entries 163C and 163E-G may be identified by use of the forward map 125 and/or validity bitmap 169A pertaining to the segment 162A, as disclosed herein. Compacting the segment 162A may further comprise relocating the valid data within the metadata log 160. The data may be relocated by, inter alia, appending the valid data at the append point 166 in the metadata log 160. In the FIG. 1J embodiment, the append point 166 is currently in segment 162F. In some embodiments, the valid data is relocated by copying and/or moving the data to the new append point 166 (e.g., re-appending the mapping entries 163C and 163E-G). Alternatively, the metadata management module 128 may be configured to combine the valid mapping entries 163C and 163E-G into a single aggregate mapping entry 167. The aggregate mapping entry 167 may comprise the mapping information of the mapping entries 163C and 163E-G, including the association between LID Q and log storage unit 158[1] corresponding to mapping entry 163C, an association between LID R and VDL log storage unit 158[R] of mapping entry 163E, an association between LID S and VDL log storage unit 158[S] of mapping entry 163F, and an association between LID T and VDL log storage unit 158[T] of mapping entry 163G.

In some embodiments, the metadata management module 128 is configured to checkpoint the forward map 125 (and/or other metadata pertaining to the data services module 110). As used herein, "checkpointing" or "destaging" refers to storing metadata of the data services module 110 in the metadata log 160 (and/or another persistent storage resource). Destaging the forward map 125 may refer to storing entries 126 of the forward map 125 in the metadata log 160. The metadata management module 128 may be configured to checkpoint the forward map 125 in order to, inter alia, compact the mapping entries 163 of the forward map 125 in the metadata log 160. As disclosed herein, the metadata log module 134 may be configured to append mapping entries 163 to the metadata log 160 in response to I/O requests 113 received at the data services module 110. The mapping entries 163 may be appended to the metadata log 160 in accordance with the order in which the I/O requests 113 were received (may be temporally ordered). The metadata log module 134 may be configured to append a mapping entry 163 in a respective metadata log segment 162 in response to each I/O request 113. The data services module 110 may be configured to acknowledge completion of an I/O request 113 in response to a) writing data of the I/O request 113 to the VDL 150 and b) writing a corresponding mapping entry to the metadata log 160. As such, appending mapping entries 163 to the metadata log 160 may be in the critical timing path of I/O operations (e.g., the data services module 110 may guarantee that a metadata log entry is recorded for each completed I/O request 113). The metadata log segments 162 and/or storage locations may have a physical storage capacity that is significantly larger than the size of the mapping entries 163. For example, the metadata log segments 162 may correspond to 4 k disk blocks or pages, whereas the mapping entries 163 consume minimal storage space. Accordingly, the individual mapping entries 163 may not be space efficient. The metadata management module 128 may be configured to compact segments 162 of the metadata log 160, which may comprise combining multiple mapping entries 163 into aggregate mapping entries 167, as disclosed herein. The aggregate mapping entries 167 may combine multiple mapping entries 163 into a single metadata log storage unit 165, which may improve space efficiency. The aggregate mapping entries 167, however, may be formed from limited amounts of valid data within segments 162 that are being recovered and, as such, may not fully exploit the storage capacity of the metadata log storage units 165. In addition, the aggregate mapping entries 167 may correspond to unstructured groups of LIDs (e.g., LIDs of different, disjoint, and/or non-contiguous regions of the logical address space 122). Accordingly, processing the aggregate mapping entries 167 to identify entries corresponding to particular LIDs and/or reconstruct the storage metadata (e.g., forward map 125) may not be computationally efficient.

The metadata management module 128 may be configured to checkpoint portions of the forward map 125, such that the checkpointed portions correspond to structured groups of LIDs that are computationally efficient to search and/or process. In some embodiments, the metadata management module 128 is configured to checkpoint LID regions, ranges, and/or extents within the logical address space 122.

In some embodiments, the data services module 110 configures the storage metadata for efficient access and/or copy operations (e.g., checkpoint operations as disclosed herein). Referring to embodiment 101K illustrated in FIG. 1K, the data services module 110 may represent entries 126 of the forward map 125 as fixed-size data structures, which may be arranged contiguously in the memory address space of the computing system 100 (e.g., within the volatile memory resources 103 of the computing system 100). The forward map 125 of the FIG. 1K embodiment comprises entries 126A, 126C, 126N, and so on. The entries 126A, 126C, and 126N may be embodied as fixed and/or deterministically sized mapping data structures 123 on the volatile memory resources 103, as disclosed herein. The data structures 123 may include a LID field 127A configured to represent one or more LIDs of the entry 126 and a VDL field 127B configured to represent one or more data log storage unit address(es) and/or links to data in the VDL 150. As disclosed above, the forward map 125 may be configured to represent LID bindings using leaf nodes and, as such, the mapping data structures 123 may not include references to child nodes. Alternatively, or in addition, the data structures 123 may include a fixed-size (and/or deterministically sized) field 127C comprising links and/or references to other entries 126 in the forward map 125 and/or a parent intermediate reference node 129 of the entry 126.

Figure 1K:
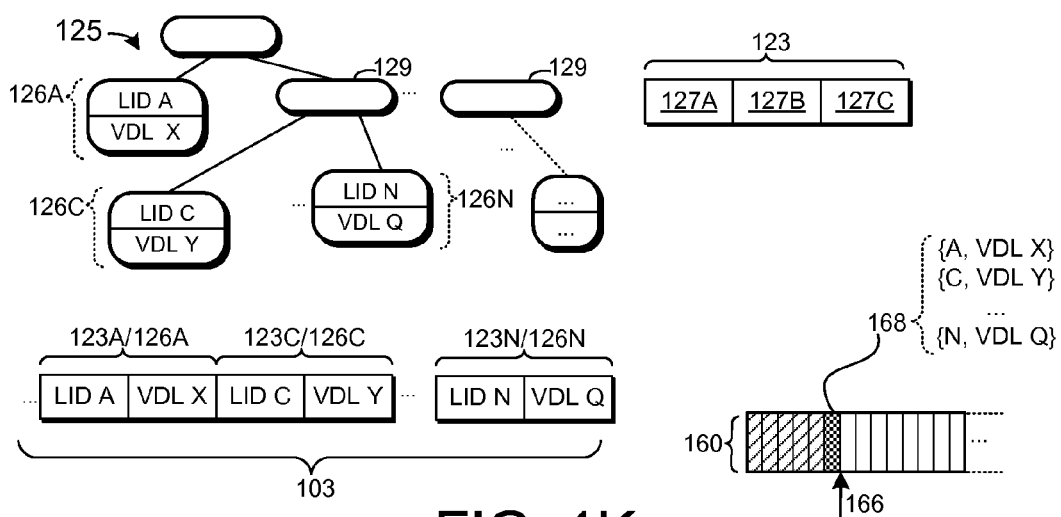
FIG. 1K depicts embodiments of checkpoint operations.

The data services module 110 may be configured to arrange the data structures 123 in the memory address space of the computing system 100 to facilitate DMAs to ranges and/or extents of entries 126. As illustrated in FIG. 1K, the data structures 123A, 123C, and 123N may be arranged contiguously in the volatile memory resources 103 of the computing system 100, the entry 126A may comprise metadata (data structure 123A) corresponding to a binding between LID A and VDL storage unit X (in fixed-size fields 127A and 127B), the data structure 123C of entry 126C may tie LID C to VDL storage unit Y, and the data structure 123N of entry 126N may associate LID N with VDL storage unit Q. As shown in FIG. 1K, the data structures 123A, 123C, and 123N may be maintained within contiguous storage locations in the volatile memory resources 103. Alternatively, the data structures 123A, 123C, and/or 123N may be stored at predetermined offsets and/or locations within the volatile memory resources 103. Although not depicted in FIG. 1K, the memory resources 103 may include data structures 123 associated with other entries 126 of the forward map 125.

Checkpointing the forward map region comprising entries 126A, 126C, and 126N may comprise transferring the contiguous memory region comprising the data structures 123A, 123C, and 123N from the volatile memory resources 103 to the metadata log 160. The metadata management module 128 may be configured to checkpoint regions of the forward map 125 that correspond to storage boundaries of the metadata log 160 (e.g., size of the metadata log storage units 165). In one embodiment, the metadata log storage units 165 comprise 4 k of storage capacity and the data structures 123 comprise 128 bytes of data. Accordingly, the metadata management module 128 may be configured to checkpoint groups of 32 entries 126 from the forward map 125. Alternatively, or in addition, the metadata management module 128 may be configured to checkpoint larger regions of the forward map 125 (and/or the entire forward map 125) by, inter alia, streaming the memory region(s) comprising the data structures 123 representing the entries 126 into the metadata log 160, as disclosed herein.

Checkpointing regions of the forward map 125 may comprise storing one or more checkpoint entries 168 in the metadata log 160. As used herein, a checkpoint entry 168 refers to an entry configured to bind a set, group, range, and/or extent of LIDs to respective VDL log storage units 155. A checkpoint entry 168 may correspond to a particular region, range, and/or extent of the forward map 125. Accordingly, in contrast to aggregate mapping entries 167, checkpoint entries 168 may correspond to a structure and/or arrangement of entries 126 in the forward map 125. By contrast, mapping information of an aggregate mapping entry 167 may correspond to unstructured groups of LIDs taken from, inter alia, one or more metadata log segments 162 being reclaimed. The LIDs of checkpoint entry 168 may, or may not, be contiguous with respect to the logical address space 122. In the FIG. 1K embodiment, a checkpoint entry 168 corresponding to entries 126A, 126C, and 126N may include discontiguous LIDs A, C, and N. The LIDs of the checkpoint entry 168 correspond to the arrangement of the entries 126 in the forward map 125 and, as such, may facilitate efficient reconstruction of the forward map 125 and/or facilitate LID-based index lookups.

In some embodiments, the metadata management module 128 is configured to identify portions of the forward map 125 that have been checkpointed. The metadata management module 128 may be configured to iteratively checkpoint portions and/or regions of the forward map 125 in background metadata compaction operations. Checkpointing the forward map 125 may simply be garbage collection operations in the metadata log 160. Referring back to FIG. 1J, in response to selecting the segment 162A for recovery, the garbage collector 136 may determine that one or more (or all) of the valid mapping entries 163C, 163E, 163F, and/or 163G in the segment 162A have been checkpointed. In response, the garbage collector 136 may reclaim the segment 162A without relocating (re-writing) the checkpointed entries to the metadata log 160.

In some embodiments, the metadata management module 128 is configured to identify entries that have been checkpointed by use of a "checkpoint" indicator. The checkpoint indicator may indicate whether an entry 126 has been "checkpointed" (destaged) to the metadata log 160 (e.g., has been destaged and/or checkpointed, as disclosed herein). The checkpoint indicator of an entry 126 may be set to "false" in response to writing a "sparse" mapping entry 163 to the metadata log 160 corresponding to the entry 126. As used herein, a "sparse entry" refers to a mapping entry 163 in the metadata log 160 that corresponds to a single LID and/or LID range. A sparse entry may also refer to an aggregate entry corresponding to an unstructured set of LIDs. As disclosed above, sparse mapping entries 163 may be written to the metadata log 160 in response to servicing I/O requests 113, relocating data in VDL garbage collection operations, and/or the like. Entries 126 that are "checkpointed" refer to entries 126 that have been written to the metadata log 160 in a checkpoint entry 168 that comprises a group of LIDs that correspond to a structure of the forward map 125, as disclosed herein.

In some embodiments, the metadata management module 128 may be configured to determine whether a mapping entry 163 and/or aggregate mapping entry 167 in the metadata log 160 has been checkpointed based on a log time associated with the entries. As disclosed above, the log order (or log time) of data appended to the metadata log 160 may be based on a) sequence metadata associated with the segment 162 comprising the data, and b) the storage address of the data within the segment 162. The metadata management module 128 may compare a log time of a mapping entry 163 and/or 167 to a log time corresponding to a checkpoint operation in the metadata log 160 pertaining to the mapping entries 163 and/or 167 to determine whether the mapping entries 163 and/or 167 were included in the checkpoint. The determination may, therefore, comprise a) identifying a checkpoint operation pertaining to particular mapping entries 163 and/or 167 in the metadata log (e.g., identifying a checkpoint operation corresponding to the entire forward map 125 and/or a section of the forward map 125 that includes the LIDs of the mapping entries 163 and/or 167), and b) comparing a log time of the identified checkpoint operation to the log time of the mapping entries 163 and/or 167. If the log time of the identified checkpoint operation is later than the mapping entries 163 and/or 167, the metadata management module 128 may determine that mapping information in the mapping entries 163 and/or 167 was included in the identified checkpoint operation (and that the mapping entries 163 and/or 167 do not need to be checkpointed and/or copied forward in a garbage collection operation).

As disclosed above, checkpointing a LID region within the forward map 125 may comprise appending a checkpoint entry 168 to the metadata log 160 that corresponds to a particular set, range, and/or extent of LIDs within the logical address space 122 (e.g., checkpoint LIDs 0 through 32786). In some embodiments, checkpoint operations may be performed in the background with respect to other operations of the data services module 110 (e.g., operations to service I/O requests 113). Checkpointing a LID region may comprise a) locking the region within the forward map 125, b) writing a checkpoint entry 168 to the metadata log 160 corresponding to the LID region, and c) unlocking the region. As used herein, locking a region of the forward map 125 refers to preventing I/O operations from modifying LIDs within the region that is being checkpointed. Accordingly, locking a region of the forward map 125 may comprise stalling I/O requests 113 pertaining to the locked region until the checkpoint operation is complete.

Figure 2A:
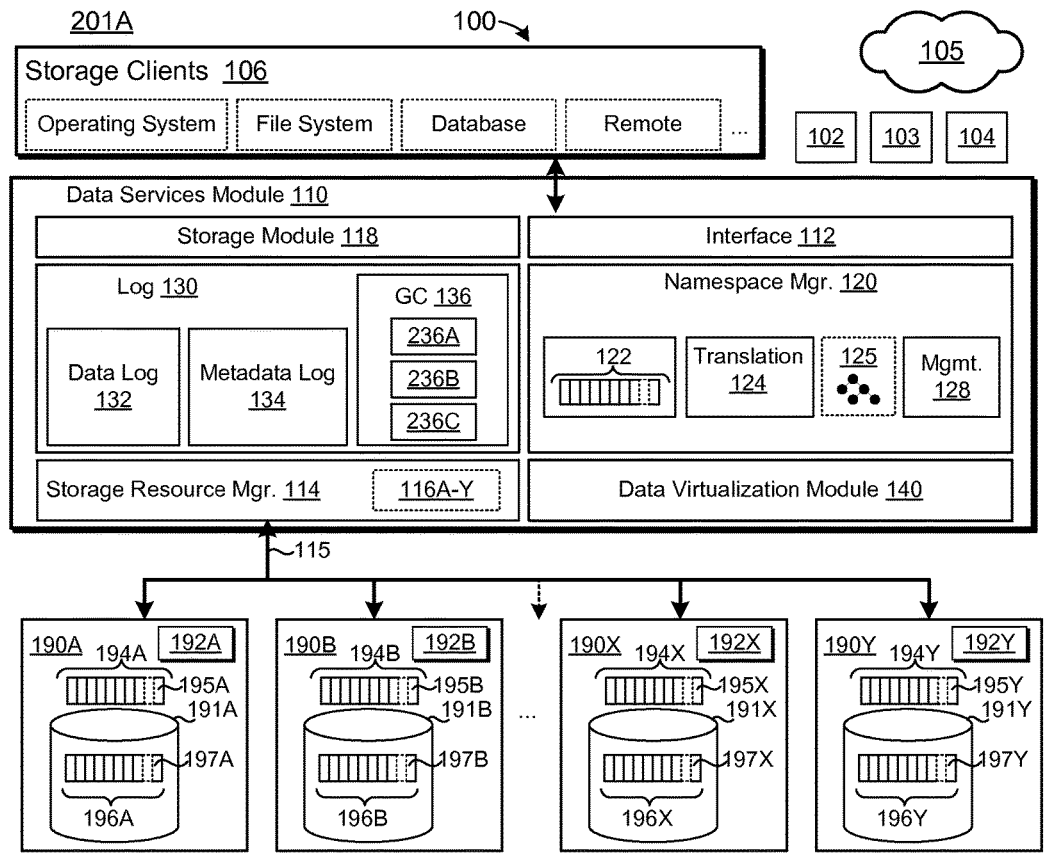
FIG. 2A depicts further embodiments of a data services module configured to manage a data log that spans a plurality of storage resources.
Figure 2B:
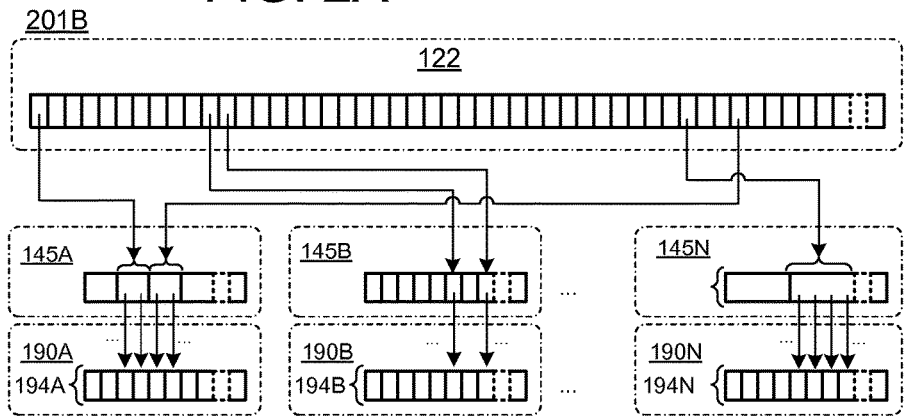
FIG. 2B depicts embodiments of mappings between a logical address space and storage resources.

FIG. 2A is a block diagram of another embodiment 201A of a computing system 100 comprising a data services module 110. In the FIG. 2A embodiment, the data services module 110 is communicatively coupled to a plurality of storage resources 190A-Y through, inter alia, the interconnect 115 and/or network 105, as disclosed herein. The storage resources 190A-Y may be configured to provide storage services through respective interfaces (e.g., storage resource address spaces 194A-Y comprising virtual addresses 195A-Y). The storage resources 190A-Y may further include storage media address spaces 196A-Y having respective storage resource address spaces 194A-Y managed by respective controllers 192A-Y. The translation module 124 may be configured to implement any-to-any mappings between the logical address space 122 and storage resource address space(s) 194A-Y of the respective storage resources 190A-Y. As depicted in embodiment 201B illustrated in FIG. 2B, the forward map 125 may be configured to bind LIDs to arbitrary addresses within the storage resource address spaces 194A-Y of the storage resources 190A-Y.

The translation module 124 may be further configured to manage translations between virtual addresses 195 and virtual blocks 145A-N. As disclosed above, the virtual blocks 145A-N may be configured to determine a storage granularity of the LIDs and/or manage differences between block sizes of the storage resources 190A-N. In the FIG. 2B embodiment, the storage resource 190A may be configured with a block size of 1 kb, the storage resource 190B may have a block size of 2 kb, and the storage resource 190N may have a block size of 512 bytes. The translation module 124 may configure the LIDs to reference 2 kb blocks, which may comprise mapping two virtual addresses 195A to each virtual block 145A, mapping one virtual address 195B to each virtual block 145B, mapping four virtual addresses 195N to each virtual block 145N, and so on.

Figure 2C:
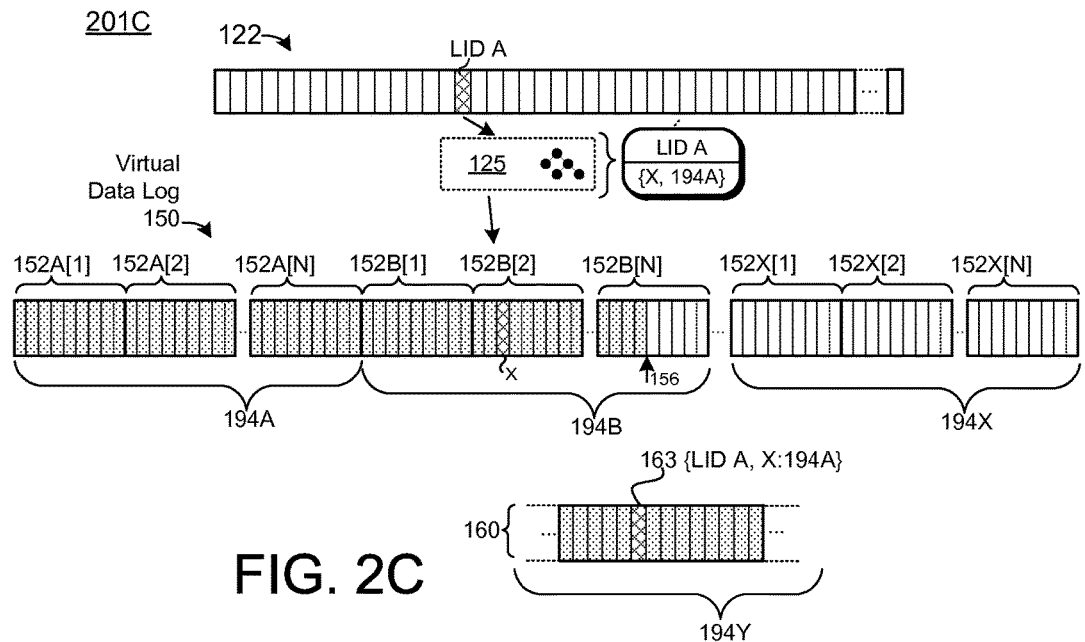
FIG. 2C depicts embodiments of log operations.

The VDL 150 managed by the data log module 132 may comprise segments 152 on the storage resources 190A-Y. As illustrated in embodiment 201C of FIG. 2C, the VDL 150 may comprise segments 152A[1]-152A[N] corresponding to storage resource 190A (e.g., the segments 152A[1]-152A[N] may comprise identifier ranges in the storage resource address space 194A of the storage resource 190A). The VDL 150 may further comprise segments 152B[1]-152B[N] corresponding to storage resource 190B, segments 152N[1]-152N[N] corresponding to storage resource 190N, and so on. Accordingly, data of the VDL 150 may be stored within a plurality of different storage resources 190A-Y. The forward map 125 may be configured to bind LIDs of the logical address space 122 (e.g., LID A) to log storage units 155 in the VDL 150, which may correspond to virtual blocks 145A-N (e.g., virtual addresses 195A-N of the underlying storage resources 190A-Y). In FIG. 2C, data of LID A is stored in log storage unit X on storage resource 190B. An entry 126 in the forward map 125 binds LID A to the virtual block(s) 145A-N corresponding to log storage unit X. The forward map 125 may further include an identifier of the storage resource 190A and/or an identifier of the storage resource address space 194A comprising the data of LID A. The data log module 132 may be configured to append data sequentially within the VDL 150, and the garbage collector 136 may be configured to recover segments 152. The garbage collector 136 may be configured to select segments 152 for recovery and to prepare the selected segments 152 for reuse by the data log module 132. The garbage collector 136 may include a) a scan module 236A configured to scan the VDL 150 to identify segments 152 to recover by, inter alia, identifying invalid data in the VDL 150, b) a relocation plan module 236B configured to determine a relocation plan for valid data in segments selected for recovery, and c) a relocation implementation module 236C configured to relocate the valid data. The scan module 236A may be configured to identify invalid data in the VDL 150 by use of the forward map 125. In some embodiments, the scan module 236A identifies invalid data using a mark-and-sweep approach. The scan module 236A may clear validity indicators for the log storage units 155 in the VDL 150 (e.g., set validity indicators to false) and traverse the entries of the forward map 125. The scan module 236A may set log storage unit validity indicators to "true" (valid) in response to identifying an entry 126 that maps a LID to the log storage unit 155. Log storage units 155 that are bound to LIDs of the logical address space 122 in the forward map 125 are identified as valid, and other log storage units 155 are considered to comprise invalid data.

Relocating valid data in a segment 152 selected for recovery may comprise a) determining a relocation plan for the valid data by use of the relocation plan module 236B, and b) implementing the relocation plan by use of the relocation implementation module 236C. As used herein, a "relocation plan" refers to a plan for relocating valid data from a segment 152 to other log storage unit(s) 155 within the VDL 150. Data may be relocated by, inter alia, copying the valid data within the VDL 150, re-appending the valid data to the VDL 150, moving the valid data, and/or the like.

The relocation plan module 236B may be configured to determine a relocation plan by use of the storage resource manager 114. As disclosed above, the storage resource manager 114 may be configured to interface with the storage resources 190A-Y, which may comprise issuing I/O requests 113 to the storage resources 190A-Y, writing data to the storage resources 190A-Y, reading data from the storage resources 190A-Y, allocating virtual blocks 145A-N (e.g., virtual addresses 195A-Y within respective storage resource address spaces 194A-Y), communicating coordination information with the storage resources 190A-Y (e.g., deallocation information), and/or the like. In some embodiments, the storage resource manager 114 comprises storage resource profiles 116A-Y, which may comprise information pertaining to the respective storage resources 190A-Y. The storage resource profiles 116A-Y may include, but are not limited to: performance characteristics of the respective storage resources 190A-Y, capabilities of the respective storage resources 190A-Y, configuration options pertaining to the respective storage resources 190A-Y, coordination capabilities of the storage resources 190A-Y, storage format used by the storage resources 190A-Y (e.g., whether a storage resource 190A-Y is log-based or the like), and so on. The storage resource profiles 116A-Y may indicate whether a particular storage resource 190A-Y is capable of high-performance, sequential data transfers; comprises DMA functionality; is capable of performing logical address manipulations (e.g., virtual copy operations, disclosed below); and/or the like.

The relocation plan module 236B of the garbage collector 136 may determine a relocation plan based on a) profile information 116A-Y pertaining to the source of the data (e.g., the storage resource 190A-Y comprising the valid data), and b) profile information 116A-Y pertaining to the destination of the data (e.g., the storage resource 190A-Y corresponding to the current append point 156). In the FIG. 2C embodiment, the scan module 236A may select the segment 152B[2] comprising data of LID A for recovery. The scan module 236A may be further configured to determine that the segment 152B[2] comprises valid data, including the data stored in log storage unit X. In response, the relocation plan module 236B may determine a relocation plan for the valid data based on a) profile information 116B pertaining to the source of the valid data (storage resource 190B) and b) profile information 116B pertaining to the destination of the valid data (also storage resource 190B, based on the position of the append point 156 in the VDL 150). The profile information 116B may indicate that the storage resource 190B is capable of performing virtual copy and/or logical move operations. In response, the relocation plan module 236B may be configured to develop a relocation plan in which the valid data is relocated to the segment 152B[N] in a logical move operation without copying the data on the storage resource 190B. The relocation implementation module 236C may be configured to implement the relocation plan, which may comprise issuing commands to configure the storage resource 190B to perform the storage operations comprising the relocation plan.

Figure 2D:
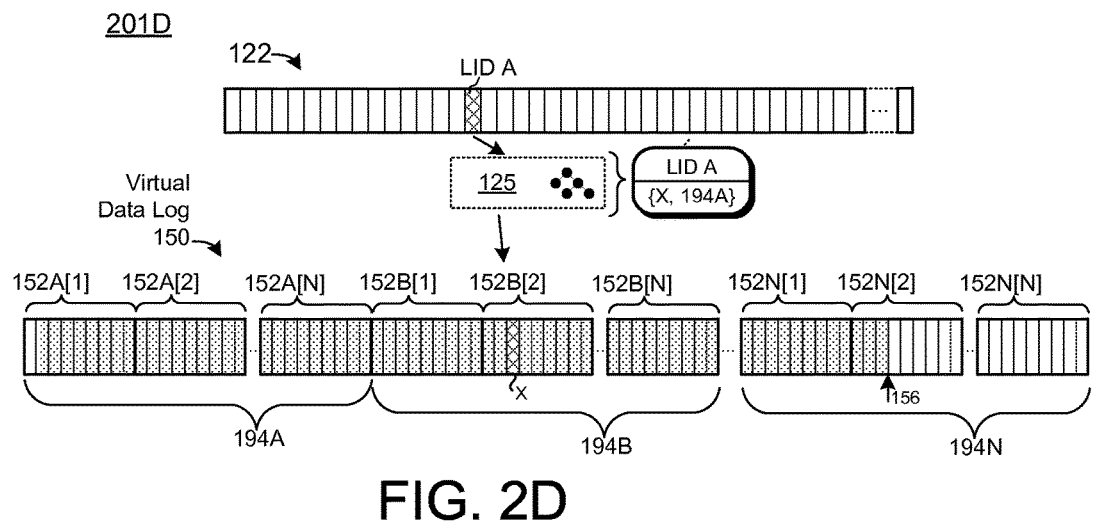
FIG. 2D depicts further embodiments of log operations.

In another embodiment 201D, and as illustrated in FIG. 2D, the append point 156 may correspond to a different storage resource 190N. The relocation plan module 236B may be configured to determine a relocation plan for valid data in the segment 152B[2] based on a) profile information 116B pertaining to the storage resource 190B and b) profile information 116N pertaining to the storage resource 190N. Since the append point 156 is on a different storage resource 190N (e.g., in a different storage resource address space 194N from the segment 152B[2]), it may not be possible to perform a logical move and/or copy operation to relocate the data (regardless of whether the storage resources 190B and/or 190N support such operations). The relocation plan module 236B may, therefore, determine an efficient copy operation to transfer valid data from storage resource 190B to storage resource 190N. Transferring the valid data may comprise one or more of a DMA operation, a high-performance sequential write, and/or the like. The transfer mechanism(s) may be selected in accordance with the capabilities and/or performance characteristics of the storage resources 190B and/or 190N as indicated by the respective profile information 116B and 116N. The relocation implementation module 236C may be configured to implement the determined relocation plan, as disclosed herein.

The data services module 110 may be further configured to maintain a metadata log 160, as disclosed herein. In the FIG. 2A embodiment, the metadata log 160 may be maintained on a separate storage resource 190N (a storage resource 190Y that is separate from and/or independent of the storage resources 190A-Y comprising the VDL 150). The disclosure is not limited in this regard, and in some embodiments the metadata log 160 may be maintained on the same storage resource(s) 190A-Y as the VDL 150. The metadata log module 134 may be configured to maintain a temporal order of storage operations performed through the data services module 110 as disclosed herein. The data services module 110 may be configured to service I/O requests 113 by a) appending data corresponding to the I/O request 113 to the VDL 150, and b) recording a mapping entry 163 pertaining to the I/O request 113 in the metadata log 160. The data services module 110 may be configured to acknowledge completion of the I/O request 113 in response to recording the mapping entry 163 in the metadata log 160. The mapping entries 163 of the metadata log (as well as the aggregate mapping entries 167 and/or checkpoint entries 168) may be configured to bind LIDs of the logical address space 122 to data stored within the VDL 150, through, inter alia, one or more translation layers, such as a translation layer between LIDs and virtual blocks 145A-N, a translation layer between virtual blocks 145A-N and virtual addresses 195A-N, and so on. Accordingly, and as depicted in FIG. 2C, metadata log 160 may be configured to include addressing information to identify the log storage unit X comprising the data bound to LID A, including an identifier of the namespace (storage resource address space 194B) and/or storage resource 190B comprising the data.

As disclosed above, the metadata log module 134 may be configured to append mapping entries 163 to the metadata log 160 in response to I/O requests 113 serviced by the data services module 110. The mapping entries 163 may be written to metadata log storage units 165, which may comprise significantly more storage capacity than required by the mapping entry 163, resulting in wasted space on the underlying storage resource (e.g., storage resource 190Y). In some embodiments, the metadata log 160 may be implemented using a storage resource 190Y configured to implement persistent, byte-addressable storage operations, such as battery-backed RAM, n-Channel DRAM, auto-commit memory, and/or the like.

In some embodiments, the metadata log module 134 may be configured to cache and/or buffer mapping entries 163, and then write groups of mapping entries 163 (and/or aggregate mapping entries 167) to the metadata log 160. The metadata log module 134 may, for example, be configured to buffer a sufficient amount of mapping entry data to fill (or substantially fill) a metadata log storage unit 165. In such embodiments, the data log module 132 may be configured to append data mapping information to the VDL 150 (as disclosed above in conjunction with FIG. 1D). The data log module 132 may be further configured to order the VDL 150 to prevent write hazards as illustrated in FIG. 1H. Accordingly, the data log module 132 may be configured to maintain a temporal order in the VDL 150, such that data (and corresponding mapping information, such as the persistent VDL metadata 184) is appended to the VDL 150 according to the order in which the corresponding I/O requests 113 were received. The mapping information stored in the VDL 150 may be marked for removal in response to the metadata log 160 storing the buffered mapping entries to the metadata log 160. The persistent VDL metadata 184 may, for example, be removed in storage recovery operations performed within the VDL 150 by the garbage collector 136, as disclosed herein.

Figure 3A:
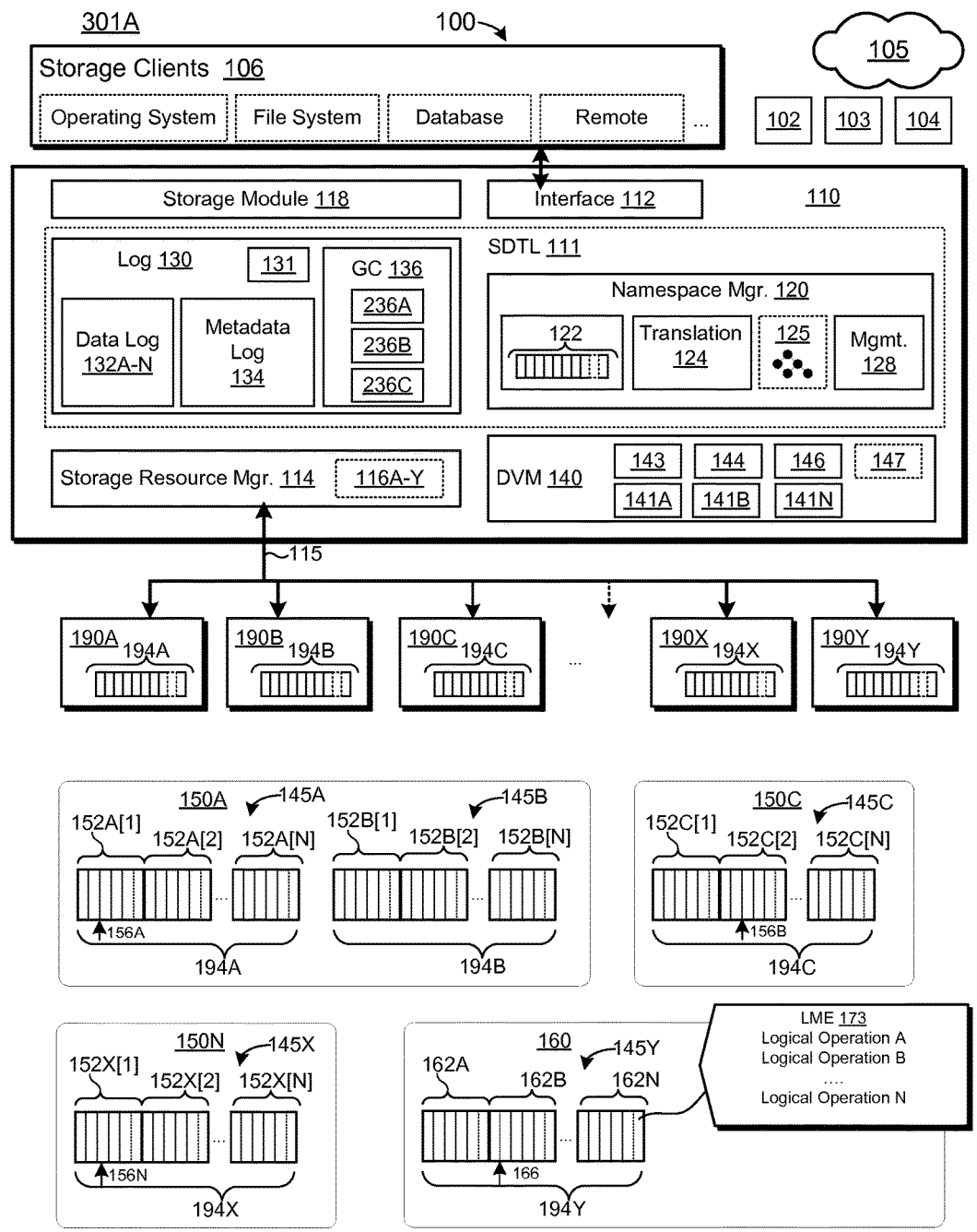
FIG. 3A depicts further embodiments of a data services module configured to manage a plurality of data logs which may span a plurality of storage resources.

FIG. 3A depicts another embodiment 301A of a computing system 100 comprising a data services module 110. The data services module 110 of FIG. 3A is communicatively coupled to storage resources 190A-Y by use of, inter alia, the interconnect 115 and/or network 105, as disclosed herein. In the FIG. 3A embodiment, the log module 130 is configured to maintain a plurality of different VDLs 150A-X. The VDLs 150A-X may be managed by respective data log modules 132A-X (and/or by a single data log module 132 configured to manage a plurality of append points 156A-X). The VDLs 150A-X may correspond to respective storage resources 190A-Y. In FIG. 3A, VDL 150A spans storage resources 190A and 190B and, as such, may include segments 152A[1]-152A[N] that correspond to virtual blocks 145A mapped to the storage resource address space 194A of storage resource 190A, as well as segments 152B[1]-152B[N] that correspond to virtual blocks 145B mapped to the storage resource address space 194B of storage resource 190B. The VDL 150C may correspond to storage resource 190C (e.g., may include segments 152C[1]-152C[N] that correspond to virtual blocks 145C mapped to the storage resource address space 194C), and the VDL 150N may correspond to storage resource 190X (e.g., may include virtual blocks 145X mapped to segments 152X[1]-152X[N] that correspond to the storage resource address space 194X). The translation module 124 may be configured to map virtual blocks 145A-X to respective virtual addresses 195A-X of the storage resources 190A-X, as disclosed herein (e.g., using one-to-one mappings, one-to-N mappings, and/or the like).

The metadata log module 134 may be configured to maintain a metadata log 160 on a separate storage resource 190Y. As disclosed in further detail herein, the metadata log module 134 may be configured to maintain ordered metadata pertaining to multiple VDLs 150A-N. For clarity of illustration, the metadata log 160 of FIG. 3A maintains metadata pertaining to multiple VDLs 150A-N and corresponds to a separate storage resource 190Y that is not being used by a VDL 150A-N. The disclosure is not limited in this regard, however, and could be adapted to implement separate metadata logs 160 to maintain metadata for respective VDL 150A-N and/or could implement the metadata log 160 on a storage resource 190A-X being used for one or more VDLs 150A-N.

In the FIG. 3A embodiment, the log module 130 comprises respective data log modules 132A-N, which may be configured to manage log storage operations within a respective VDL 150A-N. A data log module 132A may be configured to manage log operations of VDL 150A, a data log module 132B may be configured to manage log operations of VDL 150B, and a data log module 132N may be configured to manage log operations of VDL 150N. Alternatively, a single data log module 132 may be configured to manage a plurality of VDLs 150A-N.

The data services module 110 may be configured to service I/O requests 113 by use of one or more VDLs 150A-N. As disclosed above, the data services module 110 may comprise a data virtualization module (DVM) 140, which may include an allocation module 143 configured to allocate resources of the data services module 110 to clients 106. The allocation module 143 may be configured to allocate sets, groups, ranges, and/or extents of LIDs to clients 106 in response to, inter alia, allocation requests. As disclosed herein, LIDs of the logical address space 122 may be mapped to any log storage unit 155 and/or virtual block 145A-N (virtual addresses 195A-N) of any of the storage resources 190A-Y (by use of, inter alia, the forward map 125 and/or metadata log 160). Accordingly, an I/O request 113 pertaining to a particular LID may be serviced by any of the data log modules 132A-N and/or within any of the VDLs 150A-N.

In some embodiments, the data services module 110 includes a log provisioner 131. The log provisioner 131 may be adapted to assign storage resources 190A-Y to one or more VDLs 150A-N. As disclosed in further detail herein, the log provisioner 131 may be configured to configure the VDLs 150A-N to provide a particular level of performance and/or reliability. Accordingly, the log provisioner 131 may be configured to combine (and/or separate) storage resources 190A-Y used in a particular VDL 150A-N based, inter alia, on performance and/or reliability characteristics of the storage resources 190A-Y (as indicated in the profile information 116A-Y, as disclosed herein). The data services module 110 may further include an allocation module 143 configured to allocate resources, such as LIDs, to clients 106.

The log provisioner 131 may be configured to configure VDLs 150A-N of the data services module 110 based, inter alia, on characteristics of the storage resources 190A-Y. As disclosed above, the storage resource manager 114 may comprise profile information 116A-Y configured to indicate the capabilities and/or configuration of the storage resources 190A-Y. The profile information 116A-Y may be further configured to indicate current and/or observed performance and/or reliability characteristics of the storage resources 190A-Y. Accordingly, profile information 116A-Y pertaining to a storage resource 190A-Y may include, but is not limited to: the latency of storage operations performed on the storage resource 190A-Y, a workload the storage resource 190A-Y is capable of sustaining, current workload on the storage resource 190A-Y, available storage capacity, a QoS guaranteed by the storage resource 190A-Y, reliability characteristics pertaining to the storage resource 190A-Y (e.g., persistence level; whether the storage resource is configured to store data redundantly, such as a RAID configuration; observed error rate; and/or the like), capabilities of the storage resource 190A-Y (e.g., whether the storage resource 190A-Y supports particular storage operations and/or interfaces), storage format of the storage resource 190A-Y (e.g., log-based storage, modify-in-place, and/or the like), availability and/or cache mode of the storage resource 190A-Y, and/or the like.

The log provisioner 131 may be configured to assign storage resources 190A-Y to VDLs 150A-N in accordance with the characteristics of the storage resources 190A-Y. The log provisioner 131 may, for example, be configured to combine storage resources 190A-Y having similar performance characteristics in the same VDL 150A-N and/or to avoid combining storage resources 190A-Y with different performance attributes (e.g., avoid pairing high-performance storage resources 190A-Y with lower-performance storage resources 190A-Y in the same VDL 150A-N). The log provisioner 131 may, in one embodiment, configure a VDL 150A-N to separate a combination of a high-performance storage resource 190C with one or more lower-performance storage resources 190A-B. In another embodiment, the assignment module is configured to group a plurality of high-performance storage resources 190A-Y into a single, higher-capacity VDL 150A-N. The log provisioner 131 may be further configured to combine storage resources 190A-Y configured to provide similar levels of persistence. The log provisioner 131 may, in one embodiment, combine storage resources 190A-Y configured to store data redundantly into a particular VDL 150A-N, and to exclude storage resources 190A-Y from the particular VDL 150A-N that are not capable of providing and/or configured to provide a similar level of persistence. In the FIG. 3A embodiment, the log provisioner 131 may configure the VDL 150A to include lower-performance storage resources 190A-B, and may configure the VDL 150C to include a high-performance storage resource 190C.

The log provisioner 131 may be configured to combine storage resources 190A-Y into VDL 150A-N having particular performance and/or reliability characteristics. As disclosed in further detail herein, the data services module 110 may include an allocation policy 147, comprising I/O requirements and/or preferences of the clients 106. The log provisioner 131 may be configured to create VDL 150A-N capable of satisfying the I/O requirements of the clients 106 per the allocation policy 147. The log provisioner may, for example, assign a single high-performance storage resource to VDL 150B in response to QoS requirements of a particular client 106. In another embodiment, the log provisioner 131 may be configured to combine redundant, low-performance storage resources 190A-B into a VDL 150A in response to I/O requirements of a different client 106 (e.g., requirements for reliable, high-capacity storage services).

The data services module 110 may further include a log assignment module 144 configured to assign clients 106 (and/or LIDs allocated thereto) to respective VDL 150A-N. The assignments may be based on, inter alia, profile information of the storage resources 190A-Y comprising the respective VDLs 150A-N and/or requirements of the clients 106. The assignments may be configured to provide clients 106 with a particular QoS, storage-tiering level, persistent level, and/or the like. The I/O requirements and/or preferences of the clients 106 may be embodied in an allocation policy 147. The log assignment module 144 may, therefore, be configured to assign VDLs 150A-N to clients 106 based on a) profile information 116A-Y pertaining to the storage resources 190A-Y comprising the VDLs 150A-N and/or b) the allocation policy 147.

As disclosed above, the allocation policy 147 may correspond to I/O requirements and/or preferences of particular clients 106 (e.g., applications, services, and/or the like). The allocation policy 147 may comprise a QoS requirement of a particular client 106. The QoS policy of a client 106 may correspond to properties of the I/O services provided to the client 106 through the data services module 110, such as input/output bandwidth, input/output latency (e.g., response time), persistence level (e.g., RAID level), high-availability requirement(s), and/or the like. In other embodiments, the allocation policy 147 may comprise a persistence level requirement of a client 106, such as a requirement that data of the client 106 be stored redundantly and/or in a RAID configuration. The data services module 110 may be configured to acquire information pertaining to the I/O requirements of particular clients 106 and/or I/O requests 113 using any suitable mechanism including, but not limited to: receiving I/O requirements and/or preferences through the interface 112, through a storage interface (e.g., as fadvise parameters, IOCTL parameters, and/or the like), and/or the like.

The log assignment module 144 may be configured to associate clients 106 with particular VDLs 150A-N by, inter alia, pairing clients 106 with VDLs 150A-N comprising storage resources 190A-Y that are capable of satisfying the I/O requirements of the clients 106. Assigning a client 106 to a VDL 150 may, therefore, comprise comparing requirements and/or preferences of the client 106 in the allocation policy 147 to profile information 116A-Y corresponding to the storage resources 190A-Y. In the FIG. 3A embodiment, the storage resources 190A and 190B may comprise high-capacity, low-performance storage systems that are configured for redundant storage, and the storage resource 190C may comprise a lower-capacity, higher-performance solid-state storage system. The log assignment module 144 may be configured to assign VDL 150C to clients 106 that require high-performance I/O, and to assign VDL 150A to clients 106 that require redundant storage and/or do not require high-performance I/O. Further embodiments of systems and methods for assigning storage resources 190A-Y to clients 106 (and/or particular I/O requests 113) are disclosed in U.S. patent application Ser. No. 13/829,835 entitled "Systems and Methods for Adaptive Persistence," filed Mar. 14, 2013 for David Flynn et al., which is hereby incorporated by reference.

The storage resource manager 114 may be configured to acquire information pertaining to the availability and/or usage characteristics of the storage resources 190A-Y, and to incorporate the acquired information into the profile information 116A-Y. The acquired information may include, but is not limited to: the availability of logical and/or physical capacity on the storage resources 190A-Y, workload on the storage resources 190A-Y, I/O bandwidth to/from the storage resources 190A-Y (e.g., load on the interconnect 115), data transfer rates, observed latency for storage operations performed on the storage resources 190A-Y, reliability of the storage resources 190A-Y (e.g., observed error rate), and/or the like.

The log assignment module 144 may use information pertaining to the operating state of the storage resources 190A-Y to determine log assignments. In one embodiment, the log assignment module 144 is configured to avoid overloading one or more of the storage resources 190A-Y. As disclosed above, the VDL 150B may correspond to a high-performance storage resource 190C and, as such, may be assigned to clients 106 having particular requirements (e.g., particular QoS requirements). The log assignment module 144 may determine that the storage resource 190C is nearing capacity and that assigning additional workload would degrade performance of the VDL 150B, such that the QoS of one or more clients 106 would no longer be met. In response, the log assignment module 144 may a) assign other clients 106 to one or more other VDLs 150A-N (e.g., VDL A), and/or b) move storage operations of one or more clients 106 to another VDL 150A-N.

Figure 3B:
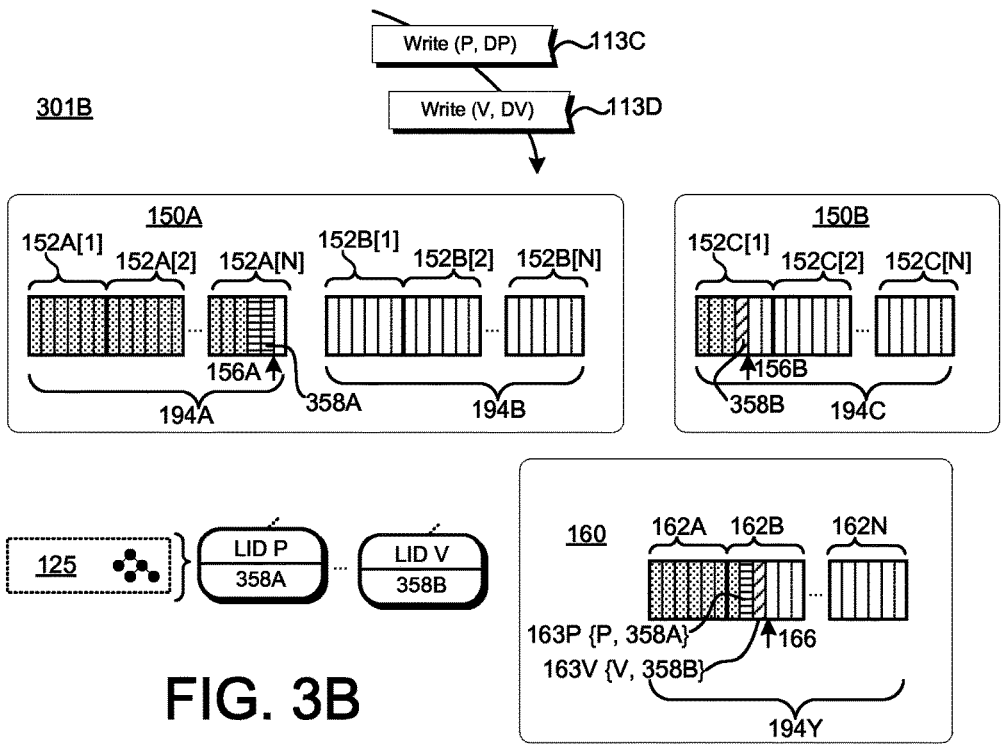
FIG. 3B depicts further embodiments of log operations.

FIG. 3B depicts embodiments 301B of log storage operations of the data services module 110 of FIG. 3A. In the FIG. 3B embodiment, the data services module 110 may receive I/O requests 113C and 113D to write data DP and DV to LIDs P and V, respectively. The LID P may be assigned to VDL 150A and the LID V may be assigned to VDL 150B based, inter alia, on I/O requirements of the clients 106 corresponding to the respective I/O requests 113C and 113D, as disclosed above.

The data services module 110 may be configured to service the I/O requests 113C and 113D by a) appending data DP to VDL 150A (at append point 156A), and appending data DV to VDL 150B (at append point 156B), and b) writing corresponding mapping entries 163P and 163V to the metadata log 160. The data services module 110 may be configured to append data DP and/or DV out of order with respect to the I/O requests 113C and/or 113D. As disclosed above, the storage resource 190C of VDL 150B may comprise a high-performance SSD and, as such, the storage operation in VDL 150B may complete before the storage operation in VDL 150A. Additionally, other I/O requests 113 received after I/O requests 113C and/or 113D may complete within other VDLs 150B-N before the operation(s) to write data DP to the VDL 150A is complete. The metadata log 160, however, may be configured to maintain a temporal order of I/O requests 113 (including I/O requests 113C and 113D). In particular, the metadata log module 134 may be configured to append the mapping entries 163P and 163V to the metadata log 160 in accordance with the order in which the I/O requests 113C and 113D were received, regardless of the order in which the corresponding storage operations are completed within the respective VDLs 150A and/or 150B.

As illustrated in FIG. 3B, the mapping entries 163P and 163V in the metadata log 160 may be configured to bind LIDs P and V to the data appended to VDLs 150A and 150B. The mapping entry 163P may be configured to bind LID P to the log storage unit 358A in VDL 150A (on storage resource 190A), and the mapping entry 163V may be configured to bind LID V to log storage unit 358B in VDL 150B (on storage resource 190C). The mapping entries 163P and 163V may correspond to entries 126 in the forward map 125, as disclosed herein.

Figure 3C:
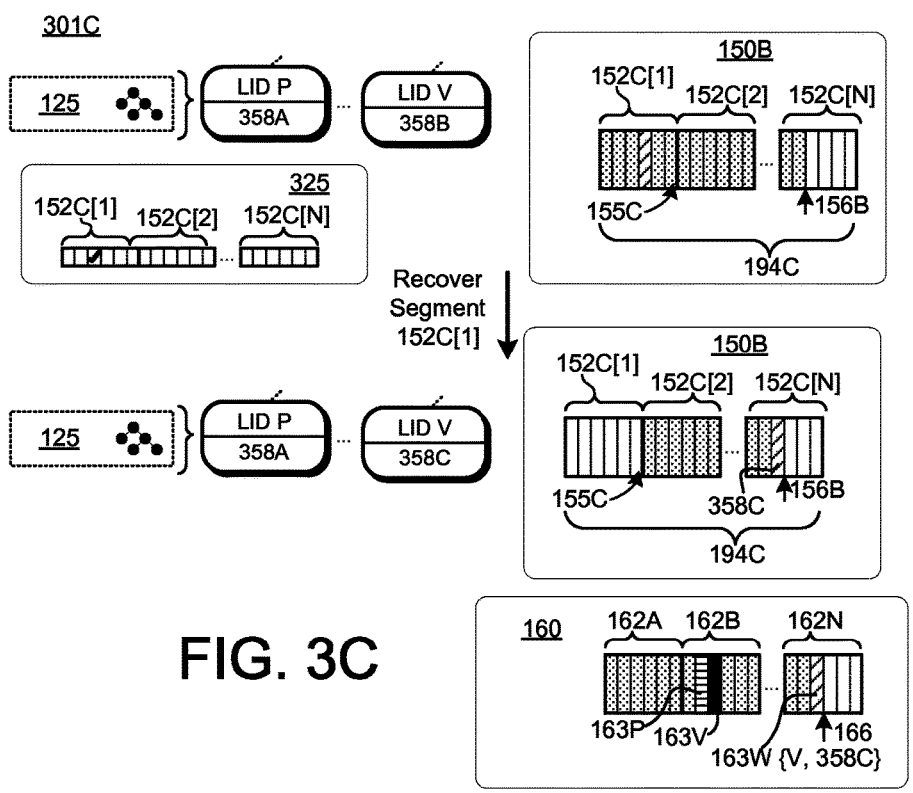
FIG. 3C depicts embodiments of recovery operations.

FIG. 3C depicts embodiments 301C of storage recovery operations of the data services module 110. In the FIG. 3C embodiment, the garbage collector 136 may be configured to scan the VDL 150A-N to identify segments to recover. In some embodiments, each VDL 150A-N may comprise a respective garbage collector 136 configured to reclaim segments within the VDL 150A-N. Alternatively, and as illustrated in FIG. 3A, a single garbage collector 136 may be configured to manage storage recover operations within the VDL 150A-N.

As disclosed above, the garbage collector 136 may comprise a scan module 236A configured to identify segments 152 to recover based, inter alia, on the amount and/or proportion of invalid data in the segments 152. In the FIG. 3B embodiment, the scan module 236A may be configured to identify invalid data in the VDL 150B using a mark-and-sweep operation. The mark-and-sweep operation implemented by the scan module 236A may comprise initializing a validity data structure 325 corresponding to identifiers of the storage resource 190C comprising the VDL 150B. The validity data structure 325 may comprise a bitmap comprising entries corresponding to virtual blocks 145C (and/or virtual addresses 195C) of the storage resource 190C. The validity data structure 325 may be partitioned into sections corresponding to the segments 152C[1]-152C[N] comprising the VDL 150B. Initializing the validity data structure 325 may comprise setting each entry to "invalid" (e.g., clearing the bitmap). The mark-and-sweep operation may further comprise traversing the forward map 125 to identify valid data in the VDL 150B, which may comprise marking entries as "valid" in response entries 126 in the forward map 125 that bind the corresponding log storage units 155 (virtual blocks 145C and/or virtual addresses 195C) to a LID. Accordingly, log storage units 155C and/or virtual blocks 145C that exist in the forward map 125 are marked as valid during the sweep of the forward map 125, and log storage units 155C that do not exist in the forward map 125 remain marked as invalid. In the FIG. 3C embodiment, the log storage unit 358B comprising data DV is marked as valid in the mark-and-sweep operation. Accordingly, the other log storage units 155C in the segment 152C[1] may be considered invalid and need not be relocated in the recovery operation. Determining validity information using a mark-and-sweep approach may obviate the need for maintaining explicit reference counts and/or other metadata to identify virtual addresse(s) that are currently in use. The data services module 110 may, therefore, be capable of implementing a large number of logical copy and/or snapshot operations without limitations imposed by reference count overhead.

The relocation plan module 236B may be configured to determine a relocation plan for the valid data (data DV in log storage unit 358B). As disclosed above, the relocation plan may be based on, inter alia, profile information pertaining to the source of the valid data in the VDL 150B and/or destination of the valid data in the VDL 150B. In the FIG. 3C embodiment, the source and destination are the same (storage resource 190C). The profile information 116C pertaining to the storage resource 190C may indicate that the storage resource 190C is capable of performing logical move operations. As disclosed above, a logical move operation refers to an operation to modify the identifier and/or address of data within the namespace of a storage resource (e.g., in the storage resource address space 194A) without re-writing the data. In the FIG. 3C embodiment, the relocation plan module 236B may, therefore, determine that a logical move operation is to be used to relocate the data DV from log storage unit 358B to a new log storage unit 155 in segment 152C[N] (at append point 156B). The relocation implementation module 236C may be configured to implement the logical move operation on the storage resource 190C by use of the storage resource manager 114, as disclosed herein. The relocation operation may further comprise updating the forward map 125 to bind LID V to the storage unit 358C, and appending a corresponding mapping entry 163W to the metadata log 160, as disclosed herein. As illustrated in FIG. 3C, appending the mapping entry 163W renders the mapping entry 163V invalid due, inter alia, to the log order of the mapping entries 163W and 163V within the metadata log 160.

Referring back to FIG. 3A, the data services module 110 may further include a virtualization service module (VSM) 146, which may be configured to efficiently implement logical manipulation operations configured to modify the logical interface to data managed by the data services module 110. As disclosed above, the "logical interface" to data stored within the VDL 150 refers to, inter alia, the identifiers (e.g., LIDs) used to reference the data. Therefore, a logical manipulation operation refers to an operation pertaining to mappings, bindings, associations, and/or ties between LIDs and data stored within a VDL 150A-N. Logical manipulation operations may include operations configured to manipulate the logical address space 122 by, inter alia, manipulating associations between LIDs and/or data stored within one or more VDLs 150A-N. As disclosed in further detail herein, the logical manipulation operations implemented by the VSM 146 may be configured to modify the logical interface to data without re-writing the data within the VDL(s) 150A-N and/or without modifying data stored in the VDL(s) 150A-N. The logical manipulation operations implemented by the VSM 146 may include, but are not limited to: logical move operations (e.g., modify the LIDs bound to data stored within one or more VDLs 150A-N), logical copy operations (e.g., clone and/or replicate data stored within one or more VDLs 150A-N by, inter alia, referencing the data through two or more different sets of LIDs), copy-on-write operations, logical merge operations, and/or the like. Logical manipulation operations implemented by the data services module 110 may be persistent and crash-safe. In some embodiments, the metadata log module 134 is configured to append logical manipulation entries 173 to the metadata log 160 in response to logical manipulation operations implemented by the data services module 110. The metadata log 160 may, therefore, include an ordered, persistent record of logical manipulation operations performed by the data services module 110. As used herein, a "logical manipulation entry" (LME) 173 refers to persistent data stored in the metadata log that is configured to indicate one or more modification(s) to the logical interface to data in a VDL 150A-N. An LME 173 may comprise a packet, note, persistent note, and/or other data structure stored within the metadata log 160 and/or within a VDL 150A-N. As illustrated in FIG. 3A, an LME 173 may correspond to a plurality of different logical manipulation (LM) operations A-N, which may be configured to alter associations between data stored in one or more of the VDL 150A-N and LIDs of the logical interface 122. As disclosed above, the LM operations A-N recorded in an LME 173 may include, but are not limited to: operations to associate data with different set(s) of LIDs (e.g., logical move operations), operations to associate data with a plurality of different set(s) of LIDs (e.g., logical copy operations), operations to merge one or more different sets of LIDs (e.g., logical merge operations), operations to remove mappings (e.g., delete), operations to query LID status (e.g., exist), and so on. An LME 173 may be ordered relative to other metadata in the metadata log 160 (e.g., mapping entries 163, aggregate mapping entries 167, checkpoint entries 168, and so on), as disclosed above.

The DVM 140 may comprise one or more logical manipulation modules 141A-N configured to implement LM operations. The logical manipulation modules 141A-N may include a logical move module 141A configured to implement logical move operations. As used herein, a "logical move," "virtual move," and/or "range move" operation refers to an operation configured to modify the LIDs bound to data stored in a VDL 150A-N. A logical move operation may comprise: a) modifying one or more entries 126 in the forward map 125, and b) appending corresponding metadata to the metadata log 160 (e.g., LME 173). Logical move operations may be implemented without modifying the corresponding data stored in the VDL 150A-N and/or without appending data to the VDL 150A-N.

Figure 3D:
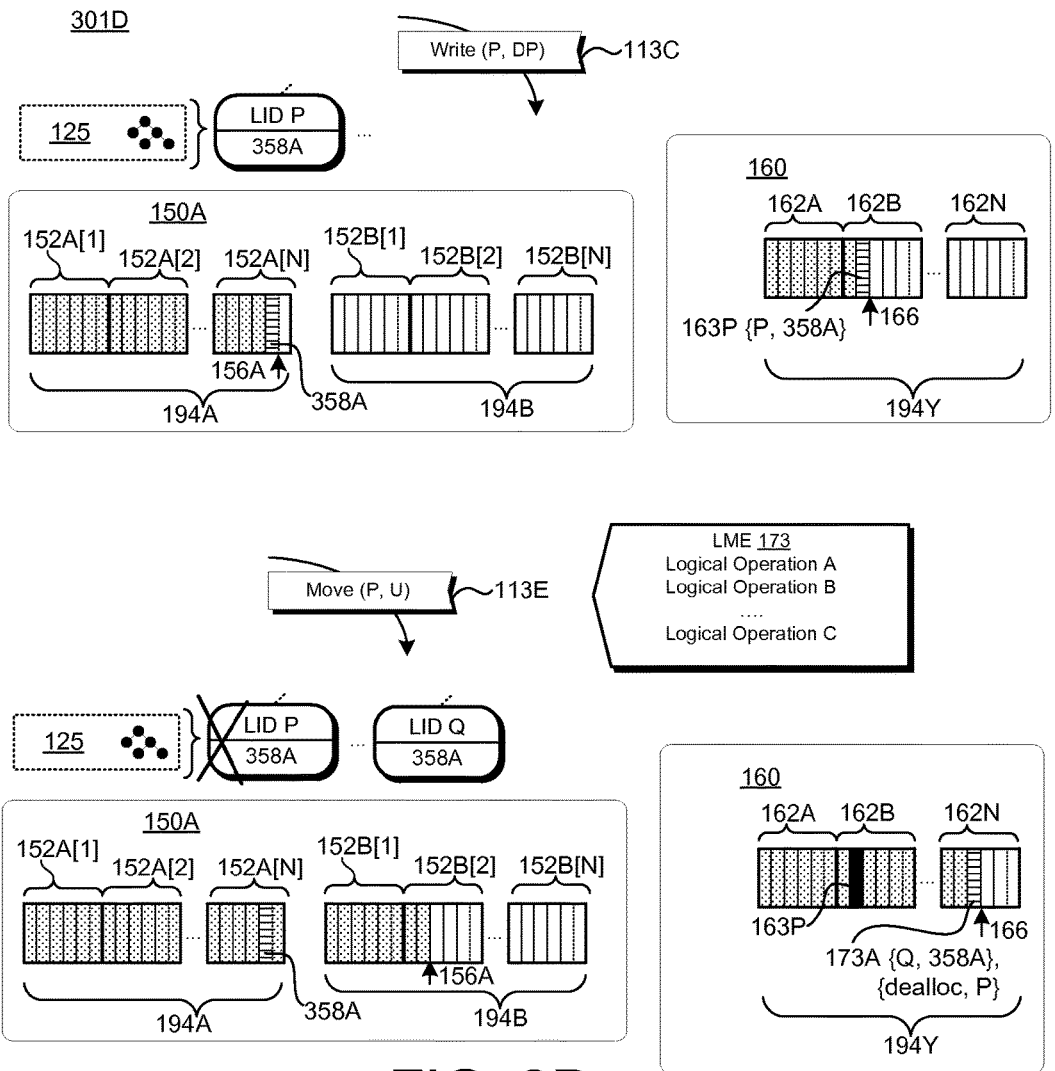
FIG. 3D depicts embodiments of logical move operations.

FIG. 3D depicts one embodiment of a logical move operation implemented by the data services module 110 and VSM 146. In the FIG. 3D embodiment 301D, the data log module 132A has serviced an I/O request 113C to write data DP to LID P. As disclosed above, servicing the I/O request 113C may comprise appending the data DP to a log storage unit 358A of VDL 150A, updating a mapping pertaining to LID P in the forward map 125, and/or writing a mapping entry 163P to the metadata log 160 to associate LID P with the log storage unit 358A comprising the data DP.

After servicing the I/O request 113C, the data services module 110 may receive an I/O request 113E to perform a logical move operation to move data of LID P to LID U. The I/O request 113E may be received through the interface 112 of the data services module 110, as disclosed herein. The VSM 146 may be configured to implement the logical move operation of the I/O request 113E by a) updating the forward map 125 to bind LID U to the data at log storage unit 358A, and b) appending an LME 173A to the metadata log 160. The LME 173A may correspond to the logical move operation and, as such, may be configured to indicate that the data DP stored at log storage unit 358A is bound to LID U. The LME 173A may be further configured to indicate that LID P is no longer associated with the data DP (e.g., deallocate LID P). The LME 173A may invalidate the original mapping entry 163P due to, inter alia, the log order of the mapping entry 163P and the LME 173A within the metadata log 160 (the LME 173A is later in the metadata log 160 than the original, pre-move mapping entry 163P).

As illustrated in FIG. 3D, the logical move operation may be implemented without modifying the data DP stored within the VDL 150A and without appending data to VDL 150A. The I/O request 113E may, therefore, be serviced by exclusive use of the metadata log 160. Implementing the virtual move operation includes updating volatile metadata (forward map 125) and appending the LME 173A to the metadata log 160. As disclosed above, the LME 173A is configured to record the association between LID U and the data DP and remove the association to LID P. Although a particular implementation of a logical move is described herein, the disclosure is not limited in this regard, however, and could be adapted to implement logical move operations using any suitable form of logical manipulation metadata, such as an LME 173A configured to indicate that data associated with LID P is now associated with LID U (e.g., {move P, U}) and/or other data structure.

Figure 3E:
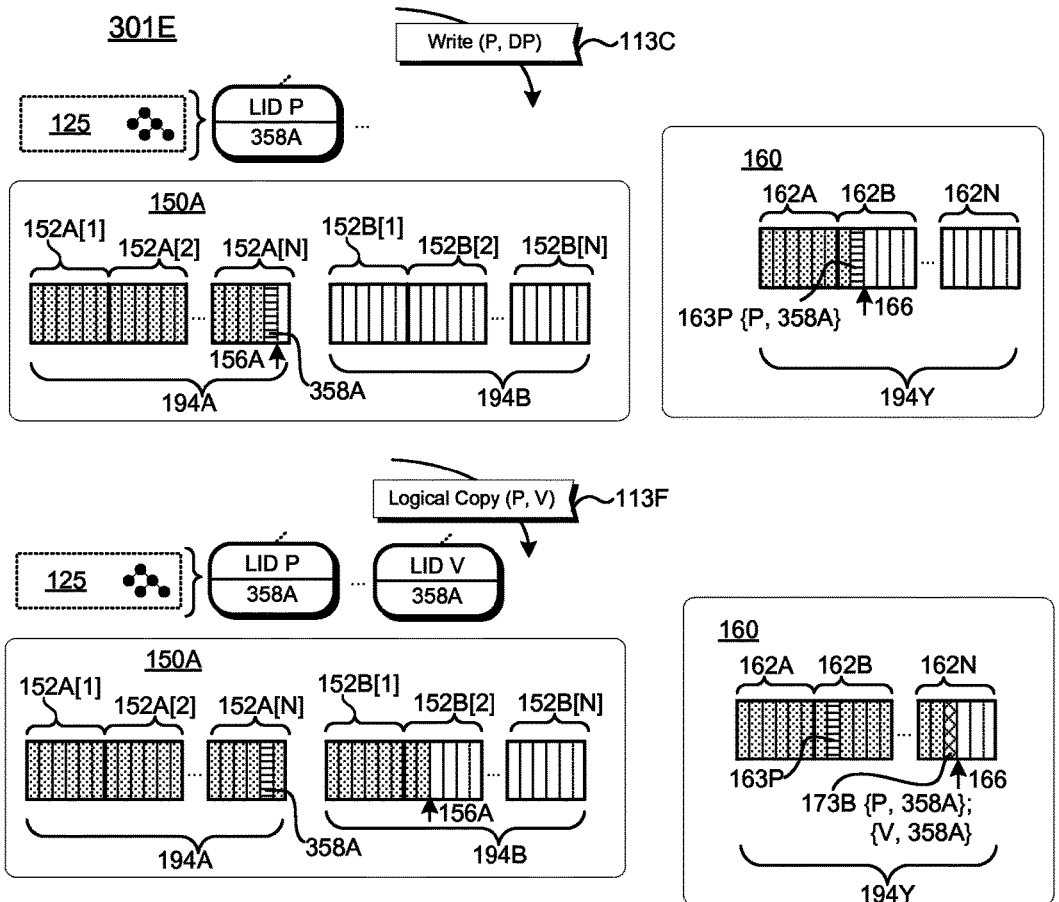
FIG. 3E depicts embodiments of logical copy operations.

The DVM 140 may comprise a logical replication module 141B configured to implement logical copy operations. As used herein, a "logical copy," "logical replication," and/or "virtual copy" operation refers to an operation to associate two or more different LIDs with the same data in the VDL 150A-N. FIG. 3E depicts one embodiment 301E of a logical copy operation implemented by the data services module 110. In the FIG. 3E embodiment 301E, the data services module 110 may have serviced the I/O request 113C to write data DP to LID P (at log storage unit 358A of VDL 150A), as disclosed herein. After servicing the I/O request 113C, the data services module 110 may receive an I/O request 113F to create a logical copy of LID P. As disclosed herein, the data services module 110 may be configured to implement logical copy operations without replicating data within the VDL 150A-N (e.g., without creating separate copies of the data within the VDL 150), modifying data stored in the VDL 150A-N, and/or appending data to the VDL 150A-N.

Implementing the logical copy operation of FIG. 3E may comprise a) recording an association between LID V and the data of LID P in the forward map 125 and b) appending an LME 173B to the metadata log 160 configured to indicate that LID V is associated with log storage unit 358A. The mapping entry 163P configured to indicate that LID P is associated with data DP may remain valid. In some embodiments, and as illustrated in FIG. 3E, the LME 173B may be configured to indicate that both LID P and LID V are mapped to log storage unit 358A (e.g., may comprise metadata configured to associate both LIDs P and V to data in log storage unit 358A). Alternatively, the LME 173B may indicate that a logical copy operation has been performed (e.g., record the logical copy as copy {P, V}). The data services module 110 may implement the logical copy operation of the I/O request 113E without modifying data in the VDL 150A and without appending data to the VDL 150A.

Figure 3F:
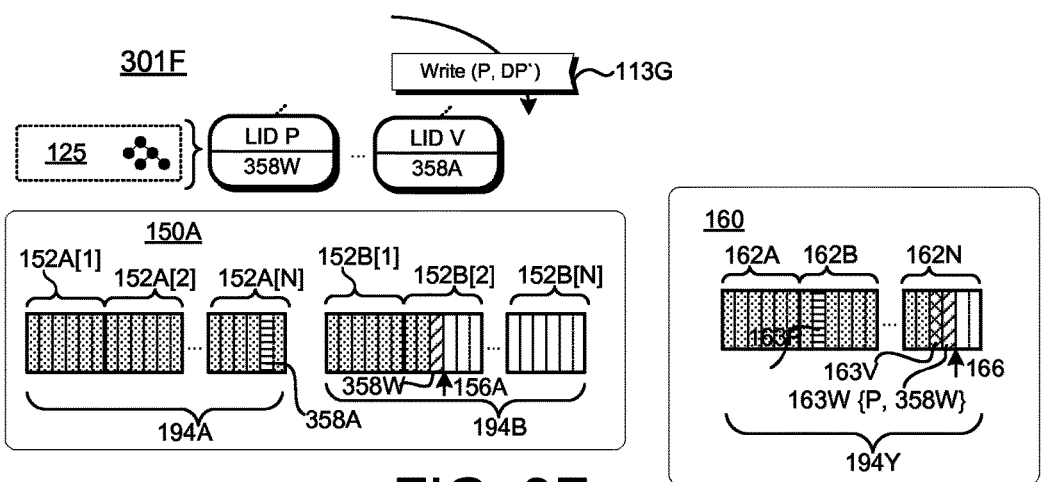
FIG. 3F depicts further embodiments of log operations.

The mapping between LID V and data DP (at log storage unit 358A) may be maintained regardless of subsequent modifications to LID P in subsequent I/O requests. FIG. 3F depicts one embodiment 301F of an operation to write data to LID P, which may comprise overwriting data DP with DP' (e.g., a copy-on-write operation). The data services module 110 may be configured to service the I/O request 113G by a) writing data DP' to the VDL 150A, which may comprise storing DP' in log storage unit 358W, b) associating LID P with log storage unit 358W in the forward map 125, and c) appending a mapping entry 163W to the metadata log 160.

The mapping entry 163W appended to the metadata log 160 may be configured to bind LID P to the log storage unit 358W comprising data DP'. The LME 173B configured to associate LID V with data DP at log storage unit 358A (and the corresponding entry 126 in the forward map 125) may remain valid. Accordingly, LID V may continue to reference data DP, and LID P may reference modified data DP'. Moreover, the garbage collector 136 may determine that DP is valid, despite the removal of the binding to LID P due, inter alia, to the mapping between DP and LID V reflected in the forward map 125 and/or metadata log 160.

Figure 4A:
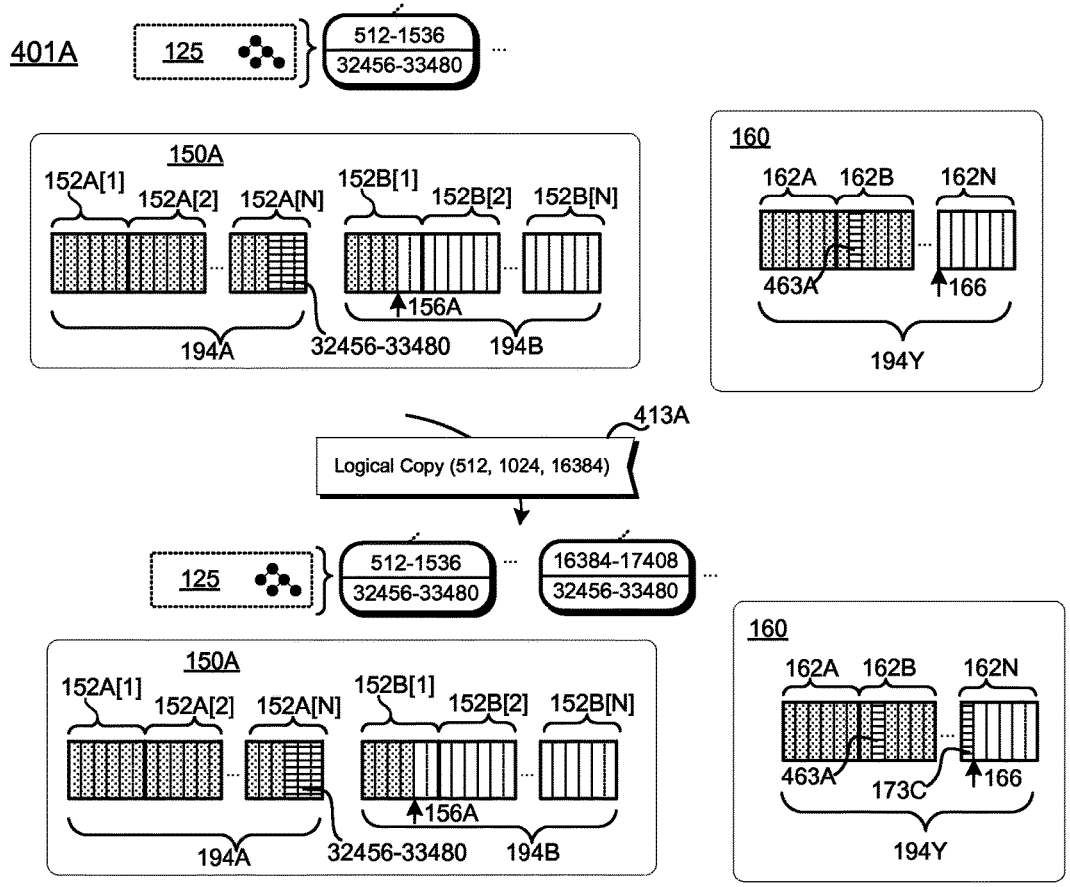
FIG. 4A depicts embodiments of logical copy operations.

The operations implemented by the VSM 146 may be performed on LID vectors, which may comprise sets, ranges, and/or extents of LIDs. A vector may be defined using a starting address (LID), range (size), and/or destination address. FIG. 4A depicts another embodiment 401A of a logical copy operation implemented by the data services module 110. The logical copy operation depicted in FIG. 4A may comprise a vector operation. The vector operation of the I/O request 413A may comprise a request to create a logical copy of the LID range 512-1536 (a vector starting at LID 512 having extent 1024) at LID 16384. The LID range 512-1536 may correspond to data stored in the VDL 150A. Accordingly, the forward map 125 of FIG. 4A includes an entry configured to bind LIDs 512-1536 to log storage units 32456-33480. Although in FIG. 4A the LID range 512-1536 corresponds to a single entry 126 in the forward map 125, the disclosure is not limited in this regard, and could include any number of entries 126 corresponding to the LID range 512-1536, bound to different log storage unit(s) within the VDL 150A. The metadata log 160 may comprise a mapping entry 463A configured to bind the LIDs 512-1536 to the log storage units 32456-33480, as disclosed above.

The interface module 112 may receive the I/O request 413A to create a logical copy of the LID range 512-1536. The data services module 110 may be configured to service the I/O request 413A by use of, inter alia, the VSM 146. Servicing the I/O request 413A may comprise a) altering the forward map 125 to associate the data of LIDs 512-1536 with LIDs 16384-17408 and b) appending an LME 173C to the metadata log corresponding to the logical copy operation. The LME 173C may be configured to indicate that LIDs 16384-17408 are associated with the same data as the source LID vector 512-1536 (e.g., bind the destination LIDs 16384-17408 to the log storage units 32456-33480). As disclosed above, the data services module 110 may implement the vector logical copy operation without modifying the corresponding data stored within the VDL 150A and/or without appending data to the VDL 150A.

The data services module 110 may be configured to manage logical copies, such that storage operations in the LID range 512-1536 do not affect the corresponding logical copies (e.g., LID range 16384-17408). The data services module 110 may, therefore, be configured to implement copy-on-write operations within the respective LID vectors 512-1536 and 16384-17408, without incurring additional copy overhead. Accordingly, the write operation(s) performed in reference to cloned LIDs may be implemented using write indirection. As used herein, write indirection refers to implementing a copy-on-write operation in which an unmodified version of the data is maintained. As disclosed herein, write indirection may enable copy-on-write operations that preserve a copy of the unmodified data, without additional copy operation(s) typically required in a copy-on-write.

Figure 4B:
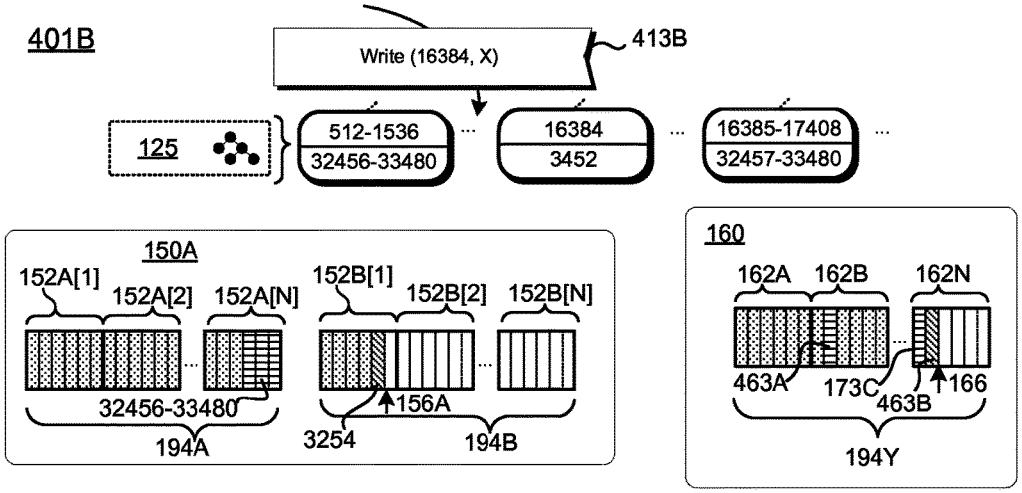
FIG. 4B depicts embodiments of write indirection operations.

In embodiment 401B illustrated in FIG. 4B, the data services module 110 may service an I/O request 413B to write data X to LID 16384. In response, the data services module 110 may a) append data X to the VDL 150A at log storage unit 3254 (on storage resource 190B), b) append a mapping entry 463B configured to bind LID 16384 to log storage unit 3254 on storage resource 190B, and c) modify the forward map 125 to bind LID 16384 to log storage unit 3254. The LIDs 512-1536 may be unaffected (continue to reference data stored on log storage units 32456-33480). Since the write operation is redirected to the LID 16384 without affecting the existing data bound to LID 1536, no additional copy operation(s) are needed. Moreover, unchanged portions of the logical copy (LIDs 16385-17408) may continue to reference the logical storage units 32457-33480. The binding between LID 16384 and 32456, however, is removed (rendered obsolete) by the new binding to log storage unit 3254. The data stored at log storage unit 32456 may continue to be considered valid by the scan module 236A due to the remaining association between LID 512 and the log storage unit 32456 (e.g., the mark-and-sweep algorithm will mark the log storage unit 32456 valid in response to the binding to LID 512). As illustrated in FIG. 4B, the logical copy operation may be completed without modifying data stored in the VDL 150A and/or without appending data to the VDL 150A.

The DVM 140 may comprise a logical merge module 141N configured to implement logical merge operations. As used herein, a logical merge operation refers to combining two or more different sets, ranges, and/or extents of LIDs. A merge operation may comprise, for example, merging LIDs 512-1536 with LIDs 16385-17408. The VSM 146 may be configured to perform merge operations in accordance with a merge policy. As used herein, a "merge policy" refers to mechanisms and/or rules for resolving merge conflicts (e.g., differences in the LID vectors to be merged). A merge policy may include, but is not limited to: a write-order policy in which more recent modifications override earlier modifications, a priority-based policy based on the relative priority of storage operations and/or LID vectors (e.g., based on properties of the clients 106 and/or I/O requests 113), a completion indicator (e.g., completion of an atomic storage operation, failure of an atomic storage operation, or the like, as disclosed in further detail herein), and/or the like. Clients 106 may specify a merge policy in an I/O request (as an I/O request parameter), through the interface 112 (e.g., set a default merge policy), by use of fadvise parameters or IOCTL parameters, and/or the like.

Figure 4C:
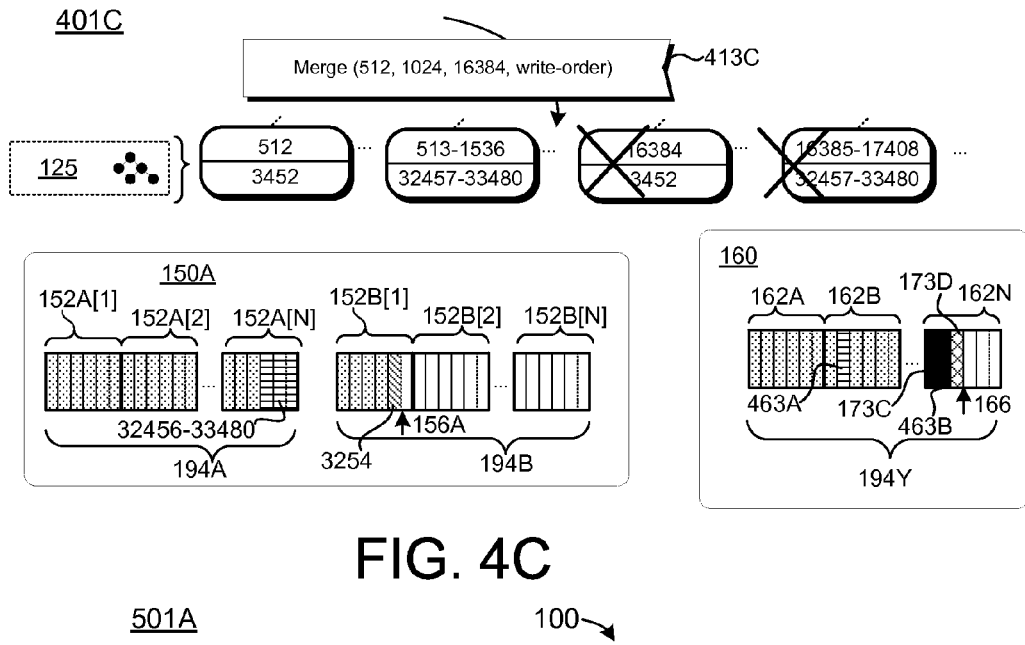
FIG. 4C depicts embodiments of logical merge operations.

FIG. 4C depicts one embodiment 401C of a logical merge operation to merge LIDs 512-1536 with LIDs 16385-17408. The logical merge operation of FIG. 4C may be performed in response to an I/O request 413C received through the interface 112 of the data services module 110, as disclosed herein. In the FIG. 4C embodiment, the I/O request 413C identifies the destination vector for the merge operation (LID 512, length 1024), identifies the LID vector(s) to be merged (LIDs 16384-17408), and specifies a "write-order" merge policy (data written later trumps older data). In the FIG. 4C embodiment, the destination vector corresponds to one of the source vectors (LID range 512-1536). The logical merge operation may, therefore, comprise folding the LID range 16384-17408 into the destination range 512-1536. In other embodiments, the destination vector may be a separate and/or independent LID range (e.g., the LID ranges 512-1536 and 16384-17408 may be merged into a new LID range 10240-11264).

The merge I/O request 413C may be received after servicing the I/O request 413B to write data X to LID 16384. Accordingly, the LID 16384 may be bound to log storage unit 3254 on storage resource 190B, as illustrated in FIG. 4B. As disclosed above, a logical merge operation may comprise combining LID ranges to selectively incorporate modifications made within the respective ranges. In the FIG. 4C embodiment, the only modification that occurred after the logical copy operation was the I/O request 413B to write data X to LID 16384. Accordingly, the only potential merge conflict is between the original data at log storage unit 32456 and data X at log storage unit 3254. The conflict may be resolved by use of a conflict policy, which in the FIG. 4C embodiment is a "write-order" policy (as specified in the I/O request 413C). Based on the merge policy, data X at log storage unit 3254 may override the original data at log storage unit 32456 based on the relative log order of the corresponding storage operations. The data at log storage unit 32456 may, therefore, be unreferenced in the forward map 125 and, as such, may be removed in a subsequent garbage collection operation in the VDL 150A. Servicing the logical merge I/O request 413C may further comprise writing an LME 173D to the metadata log 160 corresponding to the logical merge operation. The LME 173D may be configured to indicate that a) LID 512 is associated with log storage unit 3254 (in accordance with the merge policy disclosed above), and b) the LID range 16385-17408 has been deallocated. The LME 173D may, therefore, invalidate the mapping entry 463B corresponding to the logical copy operation (bound LIDs 16384-17408 to storage units 32456-33480), and the mapping entry 463B that bound LID 16385 to log storage unit 3254. The logical merge operation may further include updating the forward map 125 to bind LID 512 to log storage unit 3254 and to remove references to LIDs 16384-17408. As illustrated in FIG. 4C, the logical merge operation may be completed without modifying the corresponding data stored in the VDL 150A and/or without appending data to the VDL 150A.

Figure 5A:
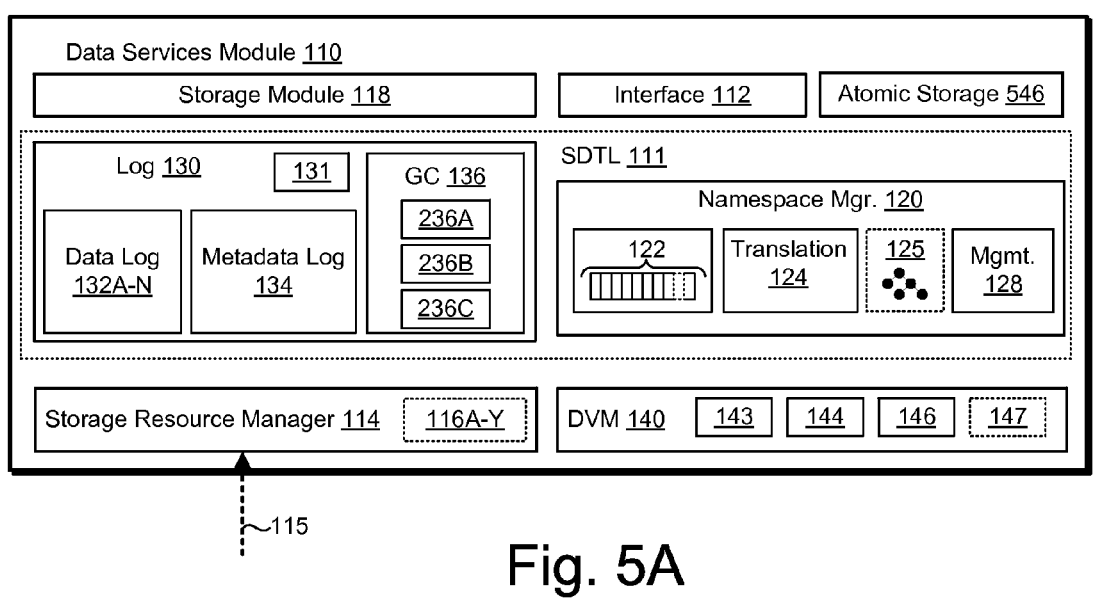
FIG. 5A depicts an embodiment of a data services module configured to implement atomic storage operations.

The efficient logical manipulation operations implemented by the VSM 146 may be used to implement other higher-level storage operations, including, but not limited to: atomic storage operations, transactions, snapshots, and/or the like. Referring to embodiment 501A depicted in FIG. 5A, the data services module 110 may comprise an atomic storage module 546 configured to service atomic storage requests. The data services module 110 may be implemented in conjunction with a computing system 100 and may be communicatively coupled to storage resources 190A-Y and clients 106, as disclosed herein.

Figure 5B:
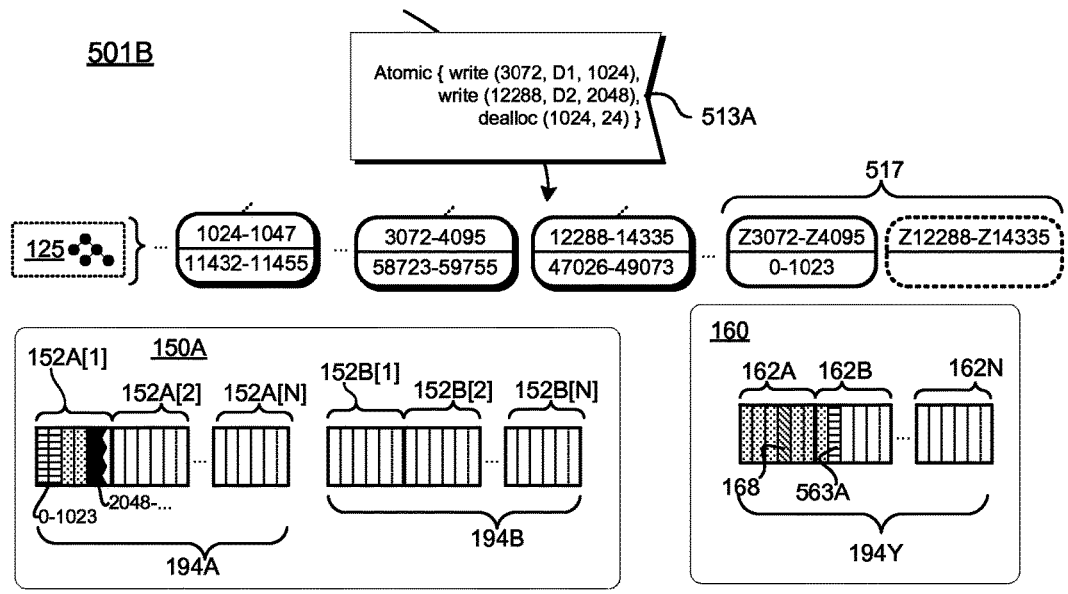
FIG. 5B depicts embodiments of atomic storage operations.

As used herein, an atomic storage operation refers to a storage operation that is either fully completed as a whole or rolled back. Accordingly, atomic storage operations may not be partially completed. Implementing an atomic storage request may comprise: a) creating a logical or "transactional" copy of one or more vectors pertaining to the atomic storage operation, b) performing storage operations of the atomic operation in the transactional vectors, and c) performing a logical move and/or merge operation to relocate the transaction vectors to the destination vectors of the atomic storage request. The atomic storage module 546 may be further configured to service composite and/or vector atomic storage operations, which may comprise a plurality of different storage operations pertaining to one or more different vectors. As illustrated in embodiment 501B of FIG. 5B, a composite atomic storage request (I/O request 513A) may comprise a request to a) write data D1 to LID range 3072-4095, b) write data D2 to LID range 12288-14335, and c) deallocate the LID range 1024-1047. The atomic storage module 546 may be configured to service the I/O request 513A by use of the data services module 110 and/or VSM 146, as disclosed above. Servicing the I/O request 513A may comprise allocating transactional vectors 517 corresponding to the LID ranges 3072-4095 and 12288-14335. Allocating a transactional vector 517 may comprise a logical copy operation as disclosed herein (e.g., creating a virtual copy of source LID vectors 3072-4095 and/or 12288-14335). Alternatively, and as illustrated in FIG. 5B, in embodiments in which the atomic storage operation(s) do not comprise reading and/or accessing data in the target vectors (e.g., the vectors are only used for write operations as in I/O request 513A as opposed to read-modify-write operations), the atomic storage module 546 may be configured to allocate the transactional vectors 517 without performing a logical copy (e.g., without binding LIDs of the transactional vectors to data of the corresponding vectors in the atomic storage request).

The atomic storage module 546 may be configured to create the transactional vectors 517 in a designated section or region of the logical address space 122 and/or in a separate namespace, such that the LIDs of the transactional vectors 517 can be distinguished from other non-transactional LIDs. In the FIG. 5B embodiment, the atomic storage module 546 is configured to allocate transactional vectors 517 comprising transactional LIDs Z3072-Z4095 and Z12288-Z14335, which correspond to a separate namespace from the logical address space 122. In other embodiments, the transactional vectors 517 may correspond to LIDs in a designated region and/or section of the logical address space 122, as disclosed above. As illustrated in FIG. 5B, the forward map 125 may include entries 126 corresponding to existing data pertaining to the vectors 3072-4095 and 12288-14335. The mapping information of the entries 126 may be stored in a checkpoint entry 168 in the metadata log 160. The transactional vectors 517 may be represented as allocation entries in the forward map 125 (e.g., may correspond to LIDs that are allocated for use in servicing the I/O request 113B, but are not yet bound to data stored in the VDL 150A-N). Although the transactional vectors 517 are represented in the forward map 125, the disclosure is not limited in this regard and could be adapted to manage entries representing transactional vectors and/or LIDs in one or more separate mapping data structures.

Servicing the atomic storage request may further comprise assigning a VDL 150A-N to the transactional vectors 517 (and/or target vectors of the atomic I/O request 513A). In the FIG. 5B embodiment, the log assignment module 144 is configured to assign the VDL 150A to the storage operations pertaining to the transactional vectors. The log assignment may be based on the client 106 and/or LIDs associated with the atomic storage request (LIDs 3072-4095 and 12288-14335), such that the storage operations pertaining to the transactional vectors are performed on the same VDL 150A-N that would have been assigned to the original vectors of the atomic storage request (using the log assignment module 144, disclosed above).

The atomic storage module 546 may be configured to implement the atomic storage operations of the I/O request 513A using the transactional vectors 517, which may comprise appending data D1 and D2 to a VDL 150A-N. As illustrated in FIG. 5B, the atomic storage module 546 may implement the request to write data D1 to vectors 3072, 1024 by a) appending the data D1 to log storage units 0-1023 within the VDL 150A, b) mapping the transactional LIDs Z3072-Z4095 to the data D1 in the forward map 125, and c) recording a corresponding mapping entry 563A in the metadata log 160. Other data that is unrelated to the atomic storage request may be appended to the VDL 150A at log storage units 1024-2047. The atomic storage module 546 may be further configured to implement the request to write data D2, by, inter alia, appending data D2 to the VDL 150A beginning at log storage unit 2048. As depicted in FIG. 5B, however, an invalid shutdown condition may occur before the operation is completed. The invalid shutdown may result in loss of the forward map 125. In response, the metadata management module 128 may be configured to rebuild the forward map 125 (and/or other virtualization metadata) using, inter alia, the contents of the ordered metadata log 160.

Figure 5C:
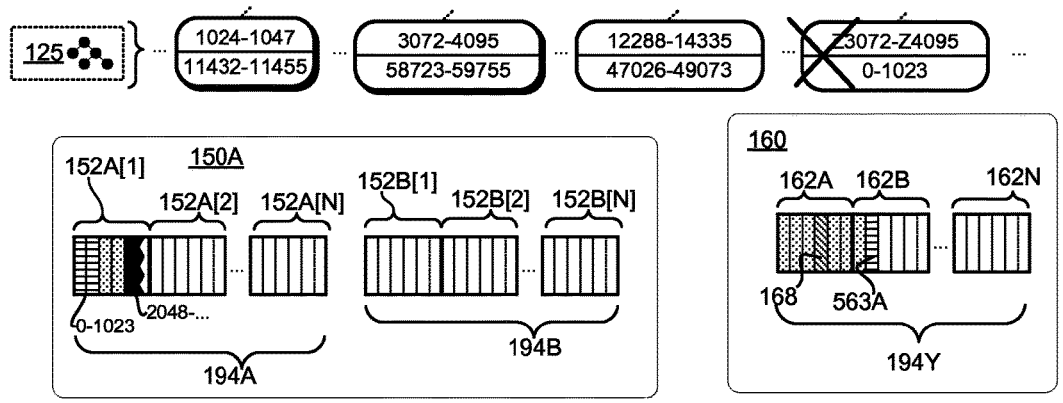
FIG. 5C depicts further embodiments of atomic storage operations.

FIG. 5C depicts embodiments 501C of metadata reconstruction operations configured to manage incomplete atomic storage operations. In the FIG. 5C embodiment, the metadata management module 128 may determine that the mapping entry 563A pertains to a transactional vector (LIDs in a designated transactional namespace and/or region of the logical address space 122). As disclosed above, a transactional vector and/or LID may be used to identify data pertaining to an atomic storage operation that has not been completed. Accordingly, the metadata management module 128 may be configured to exclude data bound to transactional vector(s) and/or LID(s) from the forward map 125, which may comprise preventing mapping information of the mapping entry 563A from being included in the forward map 125 (and/or removing existing mapping information, if any). The data D1 at log storage units 0-1023 may be identified as invalid and removed in a storage recovery operation (since the data is not bound to LID(s) in the forward map 125). The metadata management module 128 may be further configured to reconstruct the mapping information corresponding to the original vectors 3072-4095 and 12288-14335 based on the checkpoint entry 168. The original mapping information may be admitted into the forward map 125, since the original vectors 3072-4095 and 12288-14335 do not include transactional LIDs, as disclosed herein. Accordingly, the failed atomic storage operation may be completely rolled back.

Figure 5D:
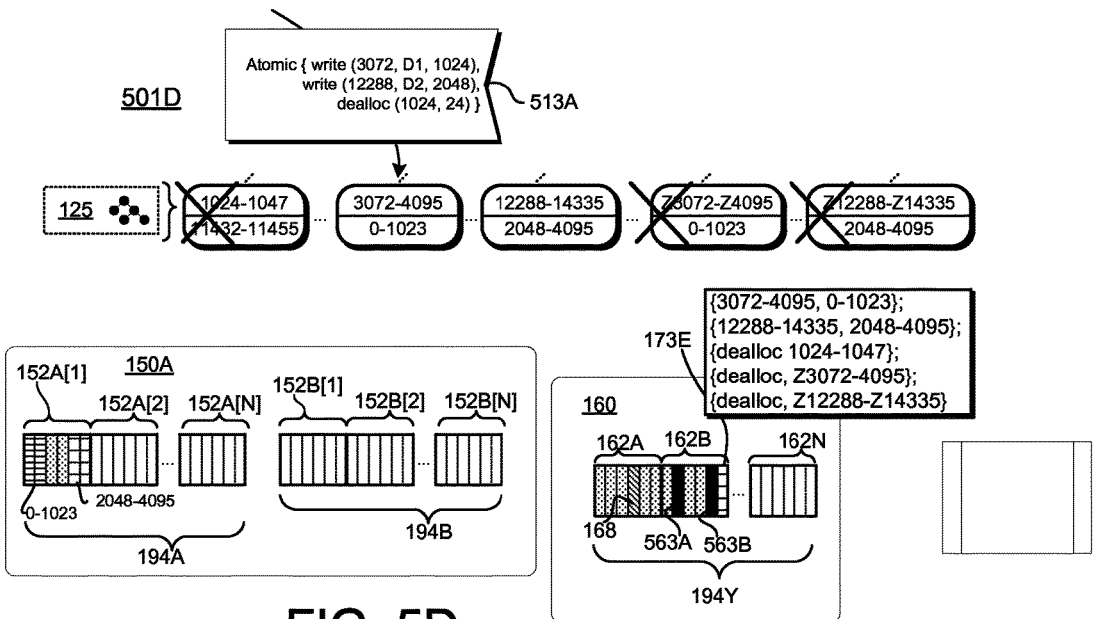
FIG. 5D depicts further embodiments of atomic storage operations.

In embodiment 501D illustrated in FIG. 5D, the operation to append data D2 may complete successfully. In response, the atomic storage module 546 may be configured to append a mapping entry 563B to the metadata log 160 to bind the transactional vector Z12288-Z14335 to log storage units 2048-4095, and record the corresponding mapping information in the forward map 125. After completing the individual operations of the atomic storage request, the atomic storage module 546 may be configured to "close" the atomic storage request in a single atomic operation. As used herein, "closing" an atomic storage operation or request refers to completing the atomic storage request. The atomic storage module 546 may be configured to close the atomic storage operation by implementing a logical move operation to move the transactional vectors Z3072-Z4095 and Z12288-Z14335 to the destination or target vectors of the atomic storage request (LID ranges 3072-4095 and 12288-14335). The logical move operation may be implemented by writing a single LME 173 to the metadata log 160. The logical move operation may further comprise updating the forward map 125 (and/or other virtualization metadata) in accordance with the logical move operation.

As illustrated in FIG. 5D, the LME 173E may correspond to closure of the atomic storage operation. In particular, the LME 173E may be configured to indicate that a) the LID vector 3072-4095 is bound to log storage units 0-1023 in VDL 150A and b) that LID vector 12288-14335 is bound to log storage units 2048-4095 in VDL 150A. The LME 173E may also indicate that the LID range 1024-1047 is deallocated. In some embodiments, the LME 173E is further configured to indicate that the transaction vectors Z3072-Z4095 and Z12288-Z14335 are deallocated.

In some embodiments, the efficient logical manipulation operations implemented by the data services module 110 may be leveraged to implement snapshots. As used herein, a snapshot refers to a storage operation configured to preserve the state of a storage system at a particular point in time. A snapshot operation may, therefore, be configured to preserve data associated with LIDs of the logical address space 122 managed by the data services module 110.

Figure 6A:
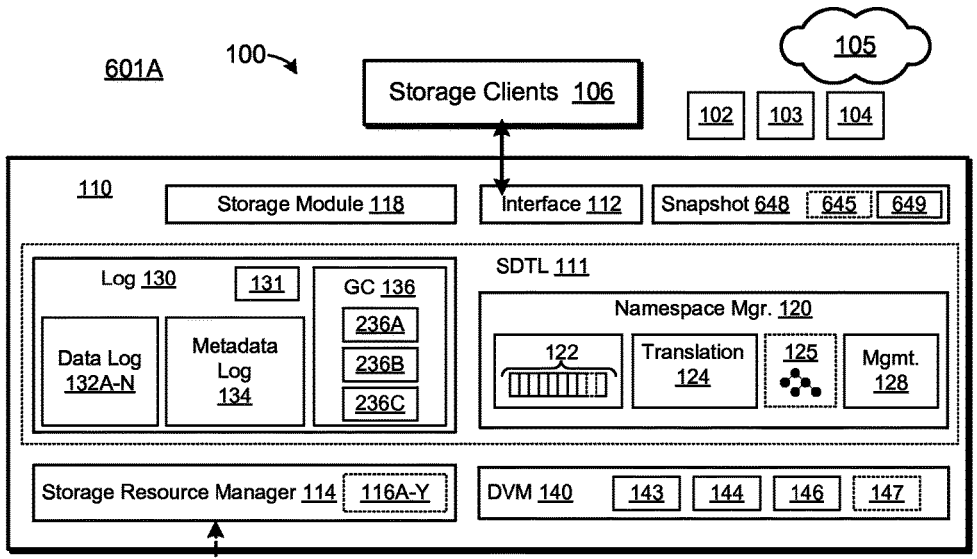
FIG. 6A depicts an embodiment of a data services module configured to implement snapshot operations.

FIG. 6A depicts one embodiment 601A of a computing system 100 comprising a snapshot module 648 configured to implement snapshot operations by use of, inter alia, the logical manipulation functionality provided by the data services module 110. The data services module 110 may be communicatively coupled to one or more storage resources 190A-N, which may comprise one or more VDLs 150A-N managed by the data log module 132A-N, and/or a metadata log 160 managed by the metadata log module 134, as disclosed herein.

As illustrated in FIG. 6A, the snapshot module 648 may be implemented as a component and/or module of the data services module 110. Alternatively, the snapshot module 648 may be implemented as a separate component and/or module, and may be configured to interface with the data services module 110 through, inter alia, the interface 112. In some embodiments, the snapshot module 648 may be configured to manage snapshots of one or more clients 106 by use of the data services module 110.

Figure 6B:
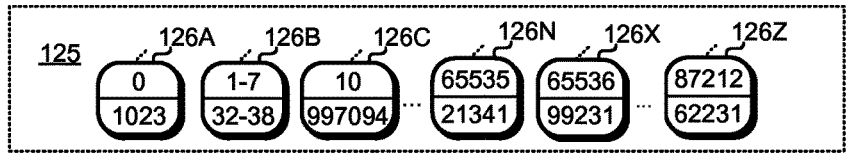
FIG. 6B depicts embodiments of snapshot operations.
Figure 6B:
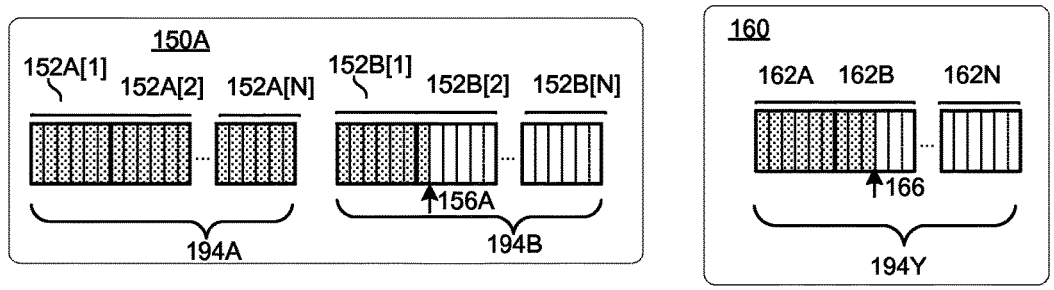
Figure 6B:
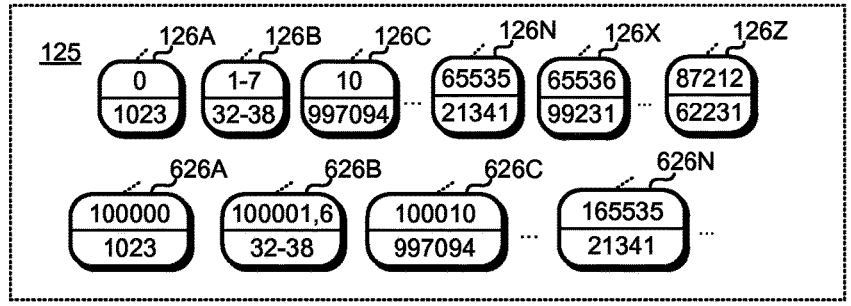
Figure 6B:
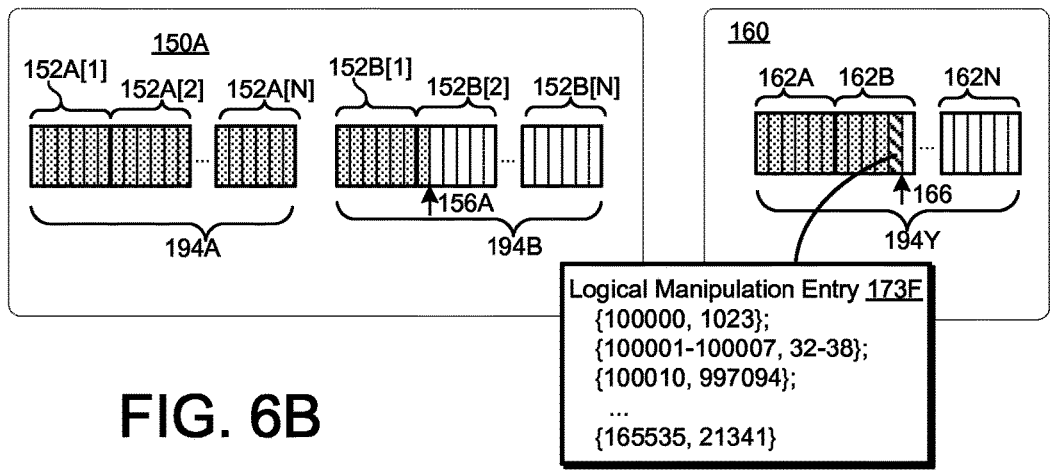

As disclosed above, a snapshot refers to an operation to preserve the state of a storage system and, in particular, to preserving the state of a particular set, range, and/or extent of LIDs within the logical address space 122. In some embodiments the snapshot module 648 may be configured to create a snapshot through a logical copy operation implemented by use of, inter alia, the VSM 146. FIG. 6B depicts embodiments 601B of snapshot operations implemented by use of the data services module 110 (and/or snapshot module 648). In the FIG. 6B embodiment, the data services module 110 has serviced I/O requests 113 pertaining to the logical address space 122 by: a) appending data to the VDL 150A, b) appending mapping metadata to the metadata log 160 configured to bind LIDs of the I/O requests 113 to the data appended to the VDL 150A (e.g., mapping entries 163, aggregate mapping entries 167, and/or checkpoint entries 168), and c) maintaining a forward map 125 comprising entries 126A-N and 126X-Z. Although not depicted in FIG. 6B, the data services module 110 may be further configured to append data to other VDLs 150B-N associated with other LIDs and/or LID ranges, as disclosed herein.

The snapshot module 648 may be configured to service a snapshot I/O request 613A. The I/O request 613A may specify a source address for the snapshot (LID 0 in the logical address space 122), a destination for the snapshot (LID 100000), and a size, range, and/or extent (65536). The snapshot I/O request 613A of FIG. 6B may comprise a request to generate a snapshot comprising the LID range 0-65535 at LID 100000. Accordingly, the resulting snapshot may correspond to the LID range 100000-165535. Alternatively, a snapshot I/O request 613A may specify a source address for the snapshot, and may allow the snapshot module 648 to select an available destination LID range. In some embodiments, the snapshot module 648 may manage a plurality of snapshots within different, respective LID ranges. The snapshot module 648 may be configured to increment the destination LID range in response to requests to create new snapshots, and may deallocate ranges in response to requests that identify snapshots that no longer need to be retained.

Servicing the snapshot I/O request 613A may comprise allocating the destination LIDs 100000-165535 (if not already allocated), and creating a logical copy of the LID range 0-65535 by, inter alia, appending an LME 173F to the metadata log 160. The LME 173F may be configured to indicate that the destination LIDs of the snapshot are associated with the same data as the source LIDs. The LME 173F may, therefore, be configured to associate the snapshot destination LID range 100000-165535 with the log storage units bound to the snapshot source LID range 0-65535, which may comprise associating LID 100000 with log storage unit 1023, associating LIDs 100001-100007 with log storage units 32-38, associating LID 100010 with log storage unit 997094, associating LID 165535 with log storage unit 21341, and so on. The LME 173F may exclude mapping information pertaining to portions of the logical address space 122 that are outside of the source range (e.g., LIDs 65536 and 87212 of entries 126X-Z). As disclosed above, the LME 173F may be embodied as one or more of a packet, note, persistent note, and/or other data structure stored within the metadata log 160. Although not depicted in FIG. 6B, the LME 173F may further include the existing data associations pertaining to the source LID range of the snapshot request 613A (e.g., LID range 0-65535). As illustrated in FIG. 6B, implementing the snapshot operation may comprise appending a single LME 173F to the metadata log 160, without modifying data stored in the VDL 150A-N and/or without appending data to the VDL 150A-N.

In some embodiments, the snapshot operation further comprises activating the snapshot. As used herein, "activating" a snapshot refers to adding entries 126 to the forward map 125 corresponding to the snapshot operation. In the FIG. 6B embodiment, activating the snapshot of the I/O request 613A comprises creating entries 626A-N in the forward map 125. In some embodiments, the data services module 110 may configure the entries 126 of the forward map 125 to facilitate efficient snapshot activation. As disclosed above in conjunction with FIG. 1K, the data services module 110 may be configured to store the entries 126 of the forward map 125 contiguously in the address space of the volatile memory resources 103. Alternatively, the entries 126 may be stored according to a pre-determined pattern and/or layout within the memory address space of the computing system 100. Moreover, the size of the entries 126 may be fixed (and/or deterministic), such that individual fields of the entries (e.g., the logical address fields 127A-N) can be selective modified based on, inter alia, fixed and/or deterministic offsets within the memory address space.

Figure 6C:
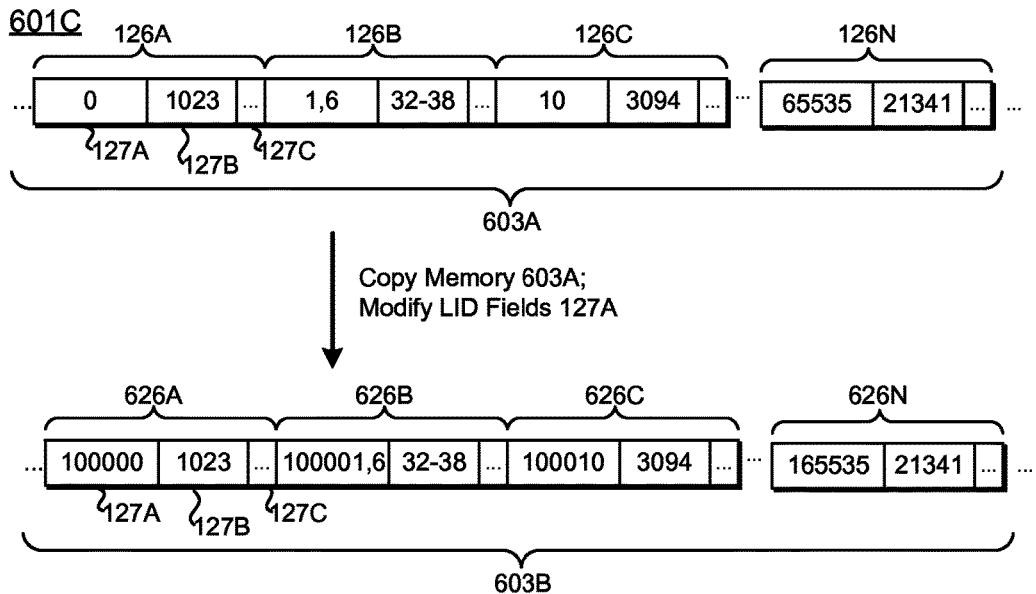
FIG. 6C depicts embodiments of virtualization metadata management operations.

Referring to embodiment 601C depicted in FIG. 6C, the snapshot module 648 may include a snapshot activator 649 configured to efficiently activate snapshots by, inter alia, accessing memory structures corresponding to the entries 126 in the volatile memory resources 103 of the computing system 100. As illustrated in FIG. 6C, the entries 126A-N corresponding to the snapshot operation of FIG. 6B may be maintained in a pre-determined format within a region 603A of the memory address space of the computing system 100. In the FIG. 6C embodiment 601C, the entries 126A-N are arranged contiguously in the volatile memory resources 103 of the computing system 100. The disclosure is not limited in this regard, however, and could be adapted to use any fixed, deterministic, and/or pre-defined memory layout and/or arrangement. As disclosed above, the entries 126A-N may comprise respective LID fields 127A, VDL fields 127B, and the like. The entries 126A-N may further include metadata pertaining to links and/or references between the entries 126A-N and/or intermediate reference nodes 129, as disclosed above.

The snapshot activator 649 may be configured to efficiently replicate the entries 126A-N in memory by: a) copying the memory address range (region 603A) to a destination memory address range (region 603B), and b) modifying the LID fields 127A of the copied entries in accordance with the snapshot destination. As illustrated in the FIG. 6C embodiment 601C, the snapshot activator 649 is configured to modify the LID fields 127A according to the destination offset LID 100000. In embodiments comprising large ranges within the logical address space 122, it may be inefficient to perform a single bulk copy. In such embodiments, the snapshot activator 649 may be configured to perform multiple memory copy operations configured to transfer portions of the memory region 603A being replicated.

Referring back to FIG. 6B, in some embodiments the data services module 110 is configured to acknowledge completion of the snapshot I/O request 613B in response to a) appending the corresponding LME 173F to the metadata log 160 and b) activating the snapshot (e.g., creating corresponding entries 626A-N in the forward map 125). Accordingly, the I/O request 613B may block while the entries 626A-N are created. In other embodiments, described below, the snapshot may be activated asynchronously and, as such, the data services module 110 may acknowledge completion in response to writing the LME 173F to the metadata log 160, without creating the entries 126 in the forward map 125 (e.g., without creating entries 626A-N).

As disclosed above, even with the efficiency improvements disclosed in conjunction with FIGS. 1K and 6C, creating entries 626A-N for a snapshot operation may take a significant amount of time, and make take significantly longer than writing the corresponding LME 173F to the metadata log 160. Moreover, the memory manipulations involved in activating the snapshot may be subject to variable delays due to, inter alia, memory management operations of the computing system 100 (e.g., virtual memory management, paging, and so on), and the snapshot entries 626A-N may consume limited volatile memory resources 103 of the computing system 100. Additionally, the translation module 124 may lock the forward map 125 during updates, which may delay other, unrelated storage operations. Accordingly, in some embodiments, the snapshot module 648 may be configured to defer snapshot activation until the snapshot is needed.

Figure 6D:
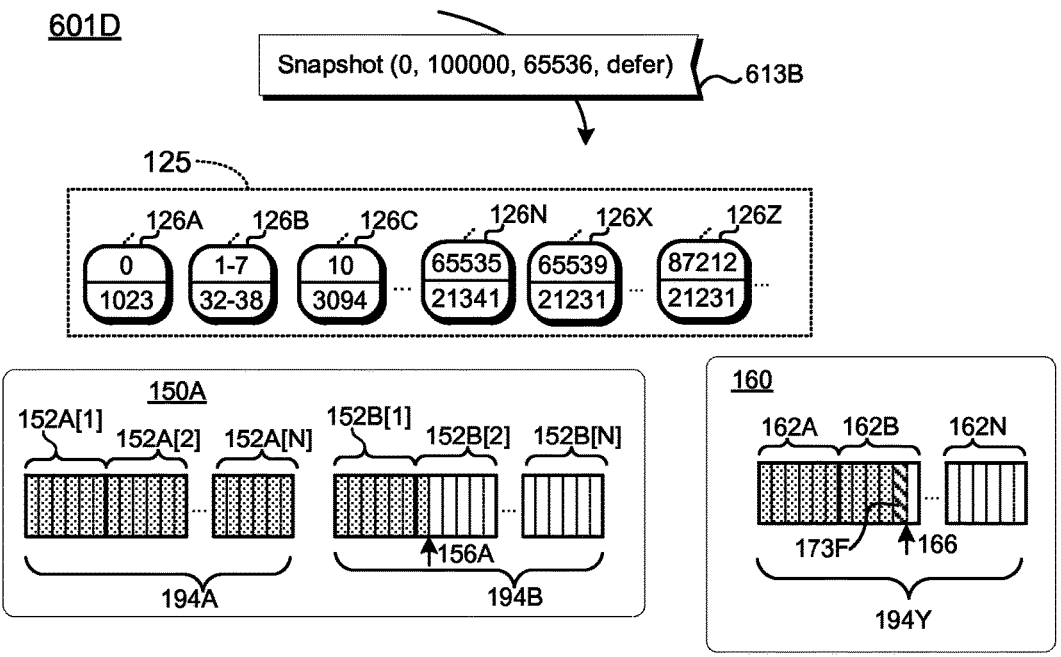
FIG. 6D depicts further embodiments of snapshot operations.

The snapshot I/O request 613A may specify whether to defer snapshot activation. FIG. 6D depicts one embodiment 601D of a snapshot operation with deferred activation. As shown in FIG. 6D, the snapshot I/O request 613B may include a "defer" parameter configured to instruct the data services module 110 to defer snapshot activation. Alternatively, the I/O request 613B may comprise a non-blocking, asynchronous API call. In response to the I/O request 613B, the snapshot module 648 may append the LME 173F to the metadata log 160, as disclosed above. The data services module 110 may, however, acknowledge completion of the snapshot I/O request 613B without creating entries for the snapshot in the forward map 125.

In some embodiments, snapshot operations may be assigned respective identifiers. The identifier of a snapshot may correspond to a LID associated with the snapshot and/or a log time of the snapshot. As disclosed above, a "log time" refers to a particular time and/or log location in the ordered, metadata log 160. The log time of a metadata log storage unit 165 in the metadata log 160 may correspond to a) sequence information of the segment 162 comprising the metadata log storage unit 165 and b) the relative address and/or offset of the metadata log storage unit 165 within the segment 162. The log time may be configured to be monotonically increasing (in accordance with sequence metadata 161 applied to the segments 162). As used herein, the log time of a snapshot refers to the log time of the LME 173F appended to the metadata log 160 to create the snapshot. Accordingly, the log time of the snapshot of FIGS. 6B and 6D is the log time of the metadata log storage unit(s) 165 comprising the LME 173F.

Figure 6E:
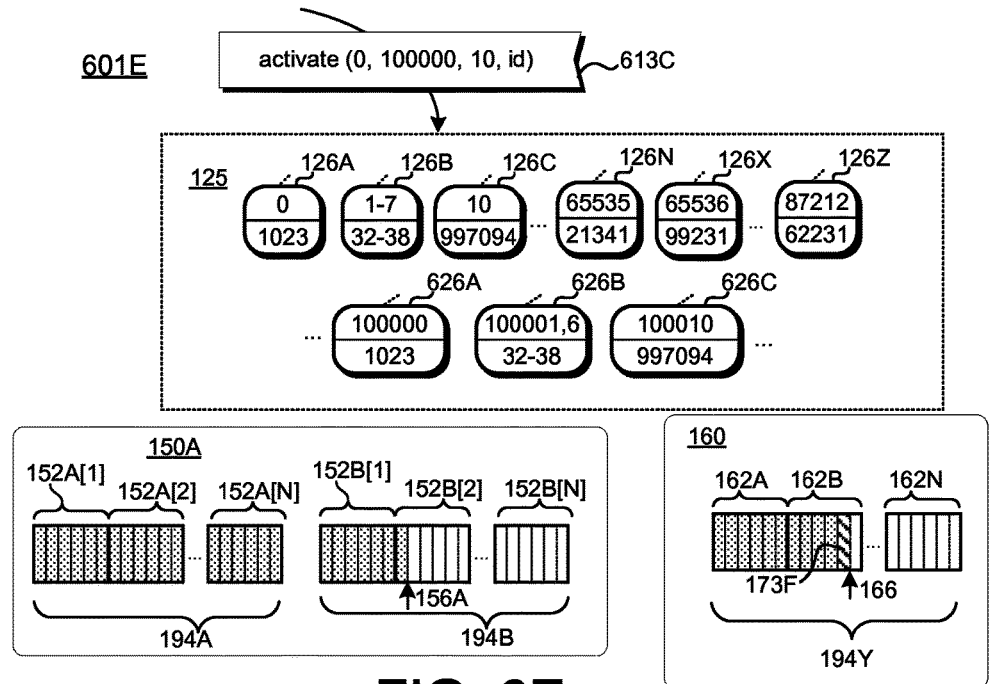
FIG. 6E depicts embodiments of snapshot activation operations.

As illustrated in embodiment 601E depicted in FIG. 6E, the snapshot of FIG. 6D may be activated in response to an activation I/O request. The snapshot activation I/O request 613C may include an identifier of the snapshot, as disclosed above, which may comprise a snapshot identifier, snapshot log time, snapshot LID, and/or the like. A snapshot activation I/O request 613C may be configured to activate a portion (subset) of a snapshot. In the FIG. 6E embodiment, the I/O request 613C may specify activation of only LIDs 0-10. In response, the snapshot module may create corresponding entries 626A-C in the forward map 125, as disclosed above. Entries corresponding to other LIDs not specified in the snapshot activation I/O request 613C may not be created.

Deferring snapshot activation may impact garbage collection operations of the data services module 110. As disclosed above, the scan module 236A of the garbage collector 136 may be configured to identify invalid data based on the forward map 125 (in a mark-and-sweep operation). Data corresponding to the activated snapshots and/or snapshot regions of FIGS. 6B and 6E may be protected from garbage collection due to, inter alia, the activated snapshot entries 626A-N in the forward map 125, regardless of changes in the original entries 126A-N. Snapshots that are not activated may be subject to garbage collection in response to modifications to the original LID bindings. As illustrated in FIG. 6D, data of the deferred activation snapshot are not bound to the LIDs in the snapshot range 100000-165535 in the forward map 125. After initial creation of the snapshot in FIG. 6D, data of the snapshot may be identified as valid due to the existing bindings between the data and the original entries 126A-N. However, subsequent I/O operations may modify the entries 126A-N, which may render the data subject to garbage collection.

Figure 6F:
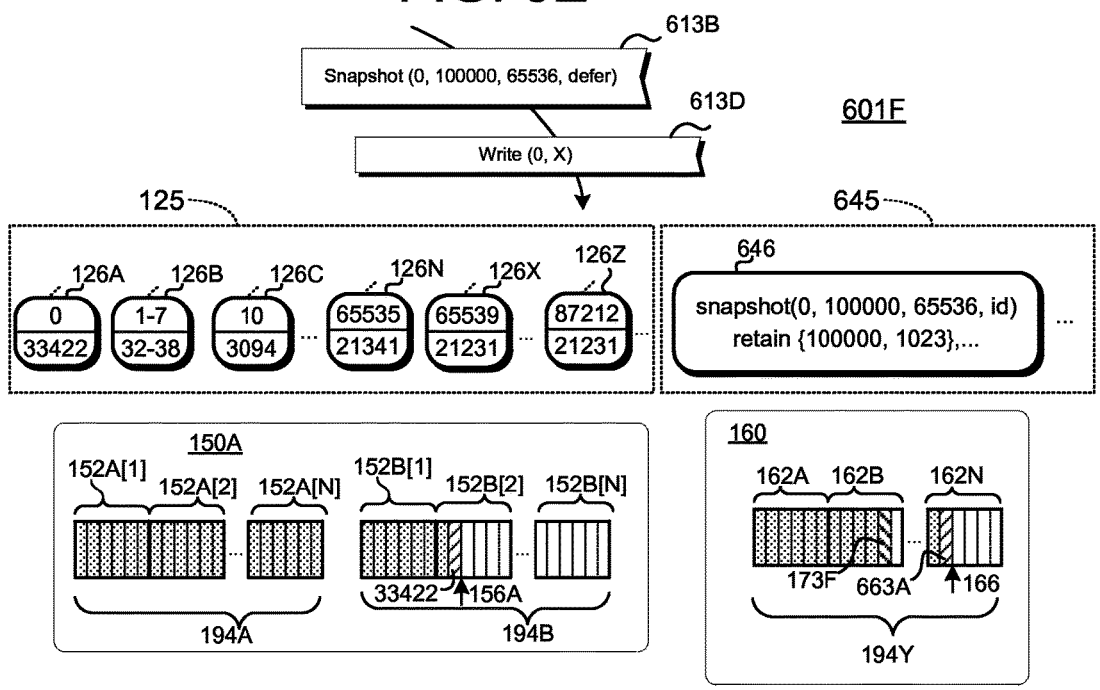
FIG. 6F depicts embodiments of snapshot management operations.

As illustrated in embodiment 601F depicted in FIG. 6F, a subsequent I/O request 613D to write data X to LID 0 may remove the binding to the log data unit 1023. As disclosed herein, servicing the I/O request 613D may comprise a) appending data X to the VDL 150A (at log storage unit 33422), b) appending a mapping entry 663A to the metadata log 160, and updating the entry 126A in the forward map 125. Servicing the I/O request 613D may, therefore, remove the binding between LID 0 and log storage unit 1023, which may cause a mark-and-sweep operation of the scan module 236A to identify the data in log storage unit 1023 as invalid, and subject to removal from the VDL 150A.

In some embodiments, the snapshot module 648 is configured to preserve snapshot data. The snapshot module 648 may be configured to maintain snapshot metadata 645, including an entry corresponding to the deferred activation snapshot of FIG. 6D. The snapshot entry 646 may include information pertaining to the snapshot, such as the source LIDs, destination LIDs, size, identifier (e.g., log time), and/or the like. The translation module 124 may access the snapshot metadata 645 to identify modifications to the forward map 125 that would render snapshot data invalid, such as the modification to entry 126A resulting from the I/O request 613D. The translation module 124 may be configured to notify the snapshot module 648 of the original log storage unit mappings. In response, the snapshot module 648 may include the log storage unit mapping retention information of the snapshot entry 646. The snapshot module 648 may use the snapshot metadata 645 (e.g., the retention information) to prevent the data at log storage unit 1023 from being marked invalid and/or removed. The scan module 236A may be configured to query the forward map 125 to identify valid bindings between LIDs and log storage units 155A. The scan module 236A may be further configured to query the snapshot module 648 for validity information (and/or the translation module 124 may forward queries to the snapshot module 648), which may indicate that log storage unit(s) included in the retention information of a snapshot entry 646 comprises valid data that should be retained. The snapshot module 648 may be further configured to update the retention information in response to, inter alia, the data at log storage unit 1023 being relocated in a storage recovery operation.

Figure 6G:
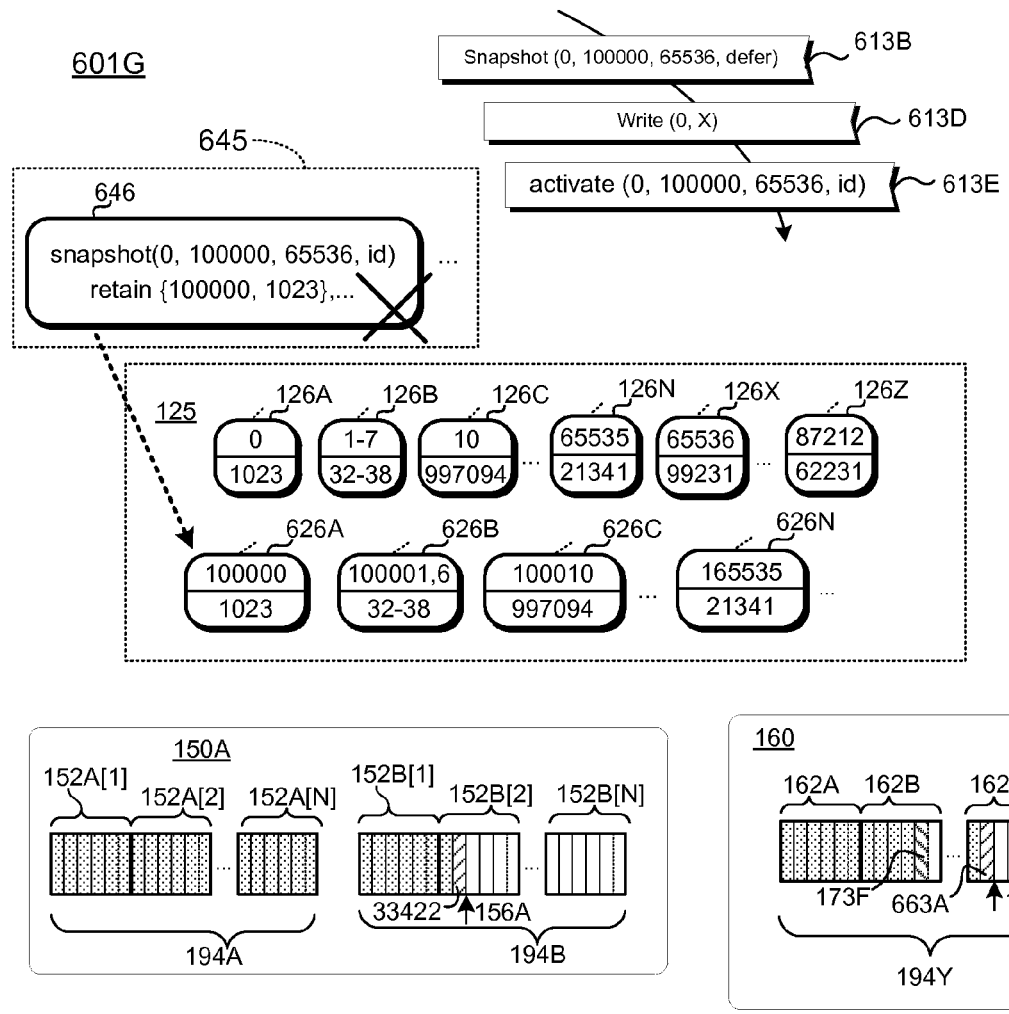
FIG. 6G depicts further embodiments of snapshot management operations.

The snapshot module 648 may use the snapshot metadata 645 to activate the snapshot. FIG. 6G depicts an embodiment 601G of a snapshot activation operation implemented by the snapshot module 648. As disclosed above, in response to the I/O request 613D to write data to LID 0, the snapshot metadata 648 may include a binding between LID 100000 and log storage unit 1023 in a snapshot entry 646. The I/O request 613E may request activation of the snapshot, and may be received after servicing the I/O request 613D.

In response to the activation I/O request 613E, the snapshot activator 649 may activate the snapshot by, inter alia, copying the memory region corresponding to entries 126A-126N, and modifying the LID field 127A of the copied entries 626A-N, as disclosed above. Snapshot activation may further comprise modifying the entry 626A in accordance with the retention information. Based on the retention information of the snapshot entry 646, the snapshot activator 649 may determine that the entry 126A no longer references the snapshot data at log storage unit 1023. In response, the snapshot activator 649 may be further configured to modify the VDL field 127B of the entry 626A in accordance with the retention information (e.g., set the VDL field 127B to 1023 rather than 33422). After activating the snapshot, the snapshot module 648 may remove the snapshot entry 646.

Figure 6H:
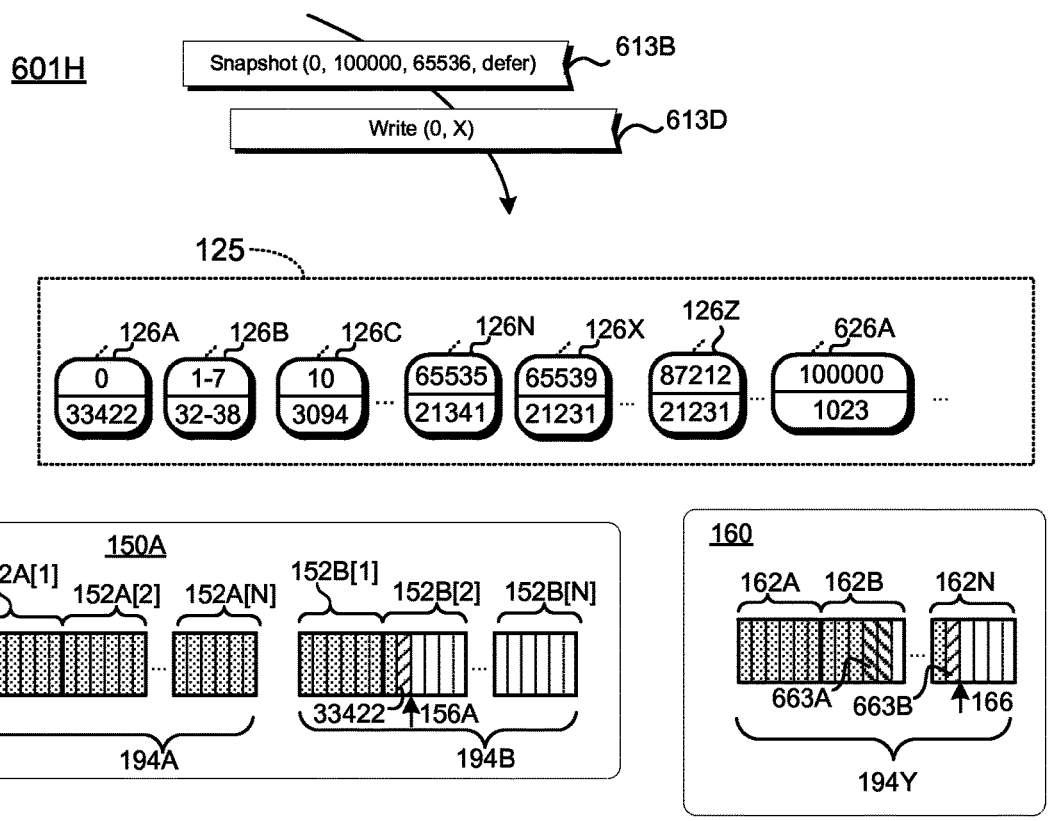
FIG. 6H depicts further embodiments of snapshot management operations.

In another embodiment, the snapshot module 648 is configured to activate snapshot entries "on demand" (e.g., in response to storage operations that would remove bindings to snapshot data). In embodiment 601H illustrated in FIG. 6H, the snapshot module 648 is configured to generate a deferred activation snapshot in response to the I/O request 613B, as disclosed above. After creating the snapshot, the I/O request 613D to write data X to LID 0 is received. The data services module 110 may service the I/O request 613D by storing data X to log storage unit 33422, appending a mapping entry 663A to the metadata log 160, and updating the entry 126A in the forward map 125. As disclosed above, the translation module 124 may be configured to notify the snapshot module 648 that an operation pertaining to a deactivated snapshot has been performed. The notification may identify the corresponding LID and/or log storage unit 1023. In response, the snapshot activator 649 may be configured to generate a corresponding entry 626A in the forward map 125, activating the affected LIDs. The snapshot activator 649 may be configured to continue activating snapshot LIDs on demand, until an activation request is received and/or the snapshot is deallocated, or the like.

The snapshot module 648 may be further configured to deallocate snapshots. As used herein, deallocating a snapshot may comprise deallocating the LIDs comprising the snapshot (e.g., deallocating destination LIDs of an activated snapshot). Activated snapshot LIDs may be deallocated by a) appending metadata to the metadata log configured to deallocate the activated LIDs and/or b) removing the corresponding entries from the forward map 125. Deallocating the snapshot of FIG. 6B may comprise, for example, removing entries 626A-N from the forward map 125. Deallocation may further comprise removing snapshot metadata 645 pertaining to the snapshot. Deallocating the snapshot of FIG. 6F may comprise removing the snapshot entry 646, which may allow log storage units in the retention information of the snapshot entry 646 to be identified as invalid and removed by the garbage collector 136, as disclosed herein.

As disclosed herein, the snapshot module 648 may be configured to generate and/or manage snapshots by use of the metadata log 160. Snapshots may be created and/or managed without modifying the underlying data stored in the VDL 150A-N. Moreover, the garbage collector 136 may be configured to identify invalid data by use of entries 126 and/or retention information maintained in volatile memory resources 103, without affecting the storage overhead of the data on the VDL 150A-N and/or creating reference count overhead in the metadata log 160 and/or forward map 125. Accordingly, the snapshot module 648 may be capable of creating any number of snapshots, without significantly increasing the metadata management overhead of the data services module 110.

Figure 7A:
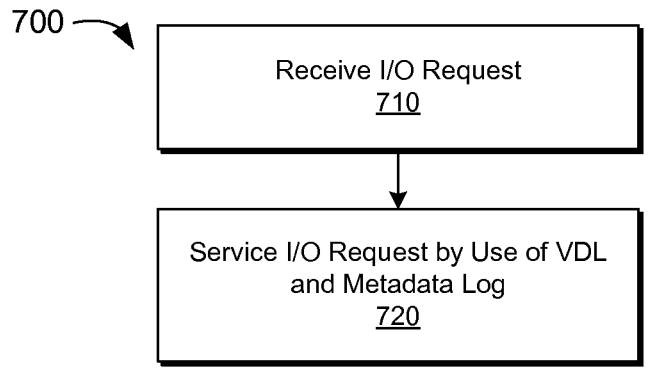
FIG. 7A is a flow diagram of one embodiment of a method for servicing I/O requests.

FIG. 7A is a flow diagram of one embodiment of a method 700 for servicing I/O requests 113 by use of a data services module 110, as disclosed herein. Step 710 may comprise receiving an I/O request 113 pertaining to a logical identifier of a logical address space 122. The request of step 710 may correspond to a particular client 106 and may be received through the interface 112 of the data services module 110.

In some embodiments, step 710 comprises maintaining a logical address space 122 comprising a plurality of LIDs using, inter alia, virtualization metadata. The virtualization metadata may include a forward map 125 comprising entries 126 configured to bind LIDs of the logical address space 122 to log storage units 155, virtual blocks 145, and/or corresponding virtual addresses 195 of one or more VDLs 150A-N.

Step 720 may comprise servicing the I/O request 113 received at step 710 by: a) storing data of the I/O request 113 within the VDL 150, and b) appending a mapping entry 163 to the metadata log 160 corresponding to the I/O request 113. Storing the data of the I/O request 113 may comprise writing the data to one or more log storage units 155 in a segment 152 of the VDL 150 by, inter alia, issuing commands to one or more storage resources 190 corresponding to the VDL 150. The data may be stored to one or more identifier(s) 195 within a storage resource address space 194 of the storage resource 190.

The mapping entry 163 appended to the metadata log 160 may be configured to bind the LID of the I/O request 113 to the data appended to the VDL 150. The mapping entry 163 may, therefore, be configured to bind the LID to a particular log storage unit 155, virtual block 145, and/or virtual address(es) 195. The metadata log 160 may be ordered, such that an order of the metadata stored in the metadata log 160 (e.g., mapping entries 163, aggregate mapping entries 167, checkpoint entries 168, LME 173, and so on) corresponds with an order in which I/O requests 113 were received at the data services module 110. The log order of the metadata in the metadata log 160 may be determined by a) sequence metadata assigned to segments 162 of the metadata 160, and b) the relative address and/or offset of the metadata within the respective segments 162.

Figure 7B:
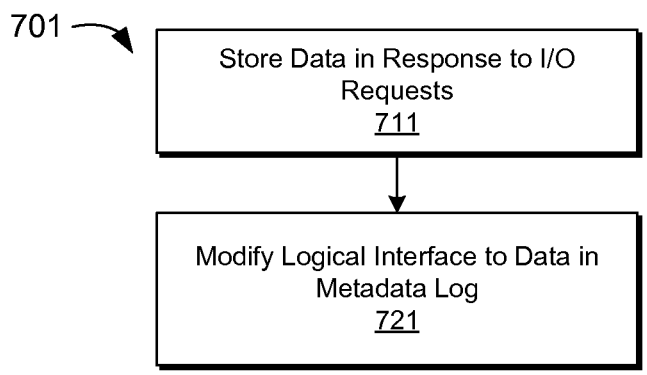
FIG. 7B is a flow diagram of another embodiment of a method for servicing I/O requests.

FIG. 7B is a flow diagram of another embodiment of a method 701 for servicing I/O requests by use of the data services module 110 disclosed herein. Step 711 may comprise storing data one or more storage resources 190A-X in response to I/O requests 113 from clients 106. As disclosed above, step 711 may comprise storing the data by appending the data to one or more VDLs 150A-N. The VDL 150A-N may correspond to one or more of the storage resources 190A-X. In some embodiments, data may be appended to the VDL 150A-N out of order with respect to the order in which the I/O requests corresponding to the data were received at the data services module 110.

Step 711 may further comprise associating the stored data with a logical interface. Step 711 may comprise assigning identifiers of a logical address space 122 to the stored data, which may include, but is not limited to: assigning logical identifiers to the data by use of a logical interface and/or virtualization metadata (e.g., the forward map 125), and recording the assignments in a metadata log 160 (e.g., appending mapping entries 163 to the metadata log 160, as disclosed above).

Step 721 may comprise modifying the logical interface to data stored at step 711. Step 721 may comprise manipulating a logical interface to the stored data, which may include modifying bindings between identifiers of the logical address space 122 and the stored data by a) altering the logical interface to the data and/or virtualization metadata (e.g., modifying the forward map 125), and b) recording an LME 173 corresponding to the altered logical interface. The modifications to the logical interface may include, but are not limited to: modifications configured to: a) change the LIDs associated with the stored data (e.g., modify the LID(s) bound to stored data), b) replicate sets of LIDs (e.g., create logical copies of particular LIDs, snapshot particular sets of LIDs, and/or the like), c) merge sets of LIDs, and/or the like. In some embodiments, step 721 comprises modifying a mapping between data stored at step 711 and one or more identifiers of the logical address space 122 in the forward map 125, and appending a record corresponding to the modified mapping in the metadata log 160. The record appended to the metadata log 160 may comprise a logical manipulation entry 173, as disclosed above. The logical interface modification(s) of step 721 may be implemented without storing data to the VDL 150 and/or without modifying data stored within the VDL 150.

Figure 8:
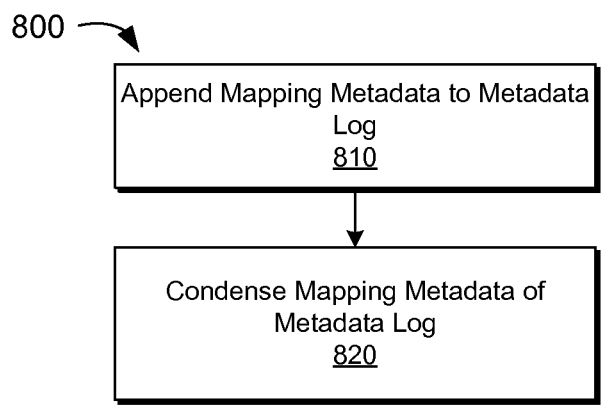
FIG. 8 is a flow diagram of one embodiment of a method for managing a metadata log.

FIG. 8 is a flow diagram of another embodiment for servicing I/O requests by use of the data services module 110. Step 810 may comprise appending mapping metadata to a metadata log 160. The mapping metadata may comprise sparse mapping entries 163 appended to the metadata log 160 in response to I/O requests 113 received at the data services module 110. The metadata mapping entries 163 may be configured to tie LIDs of the logical address space 122 to log storage units 155 comprising data associated with the LIDs in the VDL 150. The VDL 150 may be separate and/or independent of the metadata log 160. The metadata log 160 may be stored on a different storage resource 190Y and on the storage resources 190A-X comprising the VDL 150.

Step 820 may comprise condensing valid mapping metadata in the metadata log 160. Step 820 may comprise a)

compacting segments 162 of the metadata log 160 and/or b) checkpointing portions of the forward map 125 to the metadata log 160. Compacting segments 162 of the metadata log 160 may comprise a) identifying valid mapping metadata within the segments 162 and b) combining the valid mapping metadata into one or more aggregate mapping entries 167. Checkpointing portions of the forward map 125 may comprise appending one or more checkpoint entries 168 to the metadata log 160, wherein the checkpoint entries 168 are configured to map a plurality of LIDs to respective log storage units 155 of the VDL 150.

Accordingly, in some embodiments, step 820 comprises recovering a segment 162 of the metadata log 160. Recovering the segment 162 may comprise a) identifying valid metadata mapping entries 163 in the segment 162 (if any), and b) combining mapping information of the identified mapping entries 163 into an aggregate mapping entry 167. The aggregate mapping entry 167 may comprise the mapping information of the combined mapping entries 163. Step 820 may further comprise appending the aggregate mapping entry 167 to the metadata log 160 and/or preparing the segment 162 for reuse. Identifying valid mapping entries 163 may comprise identifying metadata mapping entries 163 comprising mapping information that a) corresponds to an entry in the forward map 125, and b) that have not been persisted to the metadata log 160 in other persistent metadata, such as an aggregate mapping entry 167 and/or checkpoint entry 168. Identifying valid metadata entries may, therefore, comprise comparing a log time and/or log order of the metadata entries to a log time and/or log order of one or more checkpoint entries 168 in the metadata log 160. If a checkpoint entry 168 corresponding to the same LID(s) as the mapping entry 163 exists in the metadata log 160, and is later in log time and/or log order than the mapping entry 163, the mapping entry 163 may be identified as invalid, since the mapping metadata of the entry has already been checkpointed to the metadata log 160.

Alternatively, or in addition, step 820 may comprise checkpointing mapping metadata of the forward map 125 to the metadata log 160. Checkpointing mapping metadata may comprise one or more checkpoint entries 168 to the metadata log 160 comprising mapping information pertaining to a set, range, and/or extent of LIDs in the logical address space 122. The amount of mapping metadata included in a checkpoint entry 168 may correspond to a storage capacity of the metadata log storage units 165 of the metadata log 160. In some embodiments, step 820 comprises streaming mapping information pertaining to the entire logical address space 122 (e.g., all entries 126 in the forward map 125) to the metadata log 160.

Figure 9:
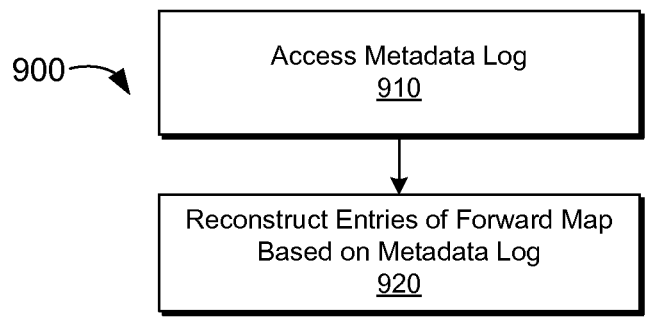
FIG. 9 is a flow diagram of one embodiment of a method for metadata recovery.

FIG. 9 is a flow diagram of one embodiment of a method 900 for reconstructing virtualization metadata, such as the forward map 125. The method 900 may be performed by the metadata management module 128 in response to loss and/or corruption of the virtualization metadata due to, inter alia, an invalid shutdown.

Step 910 may comprise accessing a metadata log 160 pertaining to one or more VDLs 150A-N corresponding to respective storage resources 190A-N. The metadata log 160 accessed at step 910 may be stored on a storage resource 190Y that is separate from and/or independent of the storage resources 190A-X used to implement the VDL 150A-N.

Step 920 may comprise reconstructing entries of the forward map 125 based on the ordered metadata log 160 accessed at step 910. Step 920 may comprise identifying a checkpoint entry 168 in the metadata log 160. As used herein, a checkpoint entry 168 refers to mapping metadata pertaining to a set, range, and/or extent of LIDs of the logical address space 122. A checkpoint entry 168 may comprise mapping information for the entire logical address space 122. Step 920 may further comprise reconstructing entries of the forward map 125 based on the mapping metadata of the identified checkpoint entry 168, and updating the entries of the forward map 125 based on mapping metadata appended after the checkpoint entry 168. Alternatively, step 920 may comprise reconstructing the forward map 125 by use of individual mapping entries 163 and/or aggregate mapping entries 167 stored in the metadata log 160. Step 920 may further comprise reconstructing and/or modifying the forward map 125 based on one or more LME 173 stored in the metadata log 160.

Figure 10:
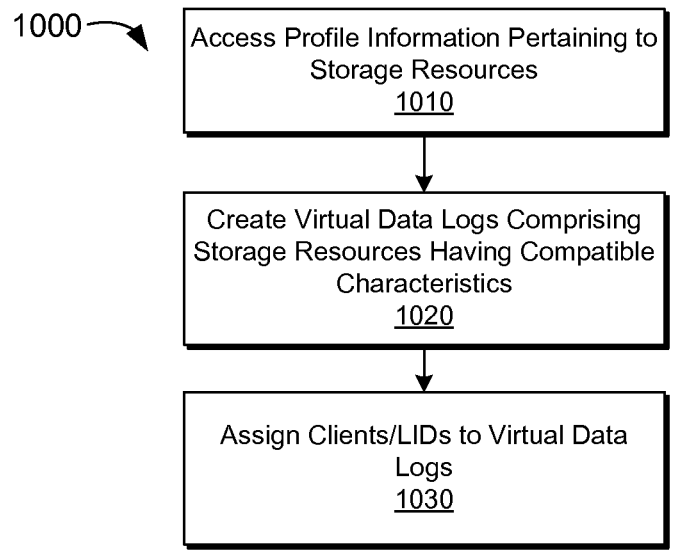
FIG. 10 is a flow diagram of one embodiment of a method for managing a virtual data log.

FIG. 10 is a flow diagram of another embodiment of a method 1000 for servicing I/O requests using the data services module 110 disclosed herein. Step 1010 may comprise accessing profile information 116A-Y pertaining to a plurality of storage resources 190A-X. As disclosed above, the profile information 116A-Y may be maintained by the storage resource interface module 112, and may include information pertaining to the performance, reliability, capacity, and/or operating characteristics of the storage resources 190A-X.

Step 1020 may comprise creating one or more VDLs 150A-N comprising storage resources 190A-X having compatible characteristics. Step 1020 may comprise identifying storage resources 190A-X for use in respective VDLs 150A-N. Step 1020 may comprise grouping the storage resources 190A-X based on, inter alia, the profile information 116A-Y pertaining to the storage resources 190A-X accessed at step 1010. Step 1020 may further comprise forming VDL 150A-N comprising storage resources 190A-X that have similar characteristics and/or that are capable of satisfying similar performance, reliability, and/or capacity requirements (e.g., QoS requirements). Step 1020 may further comprise forming VDL 150A-N configured to satisfy I/O requirements of one or more clients 106. Accordingly, step 1020 may comprise identifying storage resources 190A-X that are capable of satisfying I/O requirements (e.g., QoS requirements of particular clients 106), and forming VDL 150A-N comprising the identified storage resources 190A-X.

Step 1030 may comprise assigning I/O requests and/or LIDs to the respective VDL 150A-N created at step 1020. Step 1030 may comprise comparing I/O requirements of a client 106 to characteristics of the storage resources 190A-X comprising the respective VDLs 150A-N in order to, inter alia, identify a VDL 150A-N capable of satisfying the I/O requirements of the client 106. Step 1030 may further comprise assigning a set, range, and/or extent of LIDs of the logical address space 122 to respective VDL 150A-N. In some embodiments, step 1030 may further include monitoring operating characteristics of the storage resources 190A-X of the VDL 150A-N to ensure that the storage resources 190A-X are not overloaded, such that the I/O requirements of clients 106 and/or LIDs assigned to the VDL 150A-N can no longer be satisfied.

Figure 11:
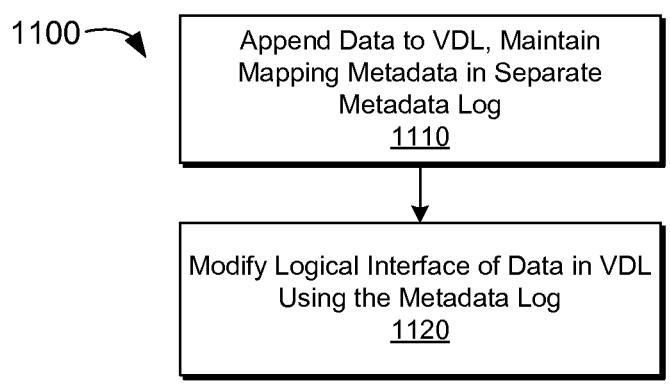
FIG. 11 is a flow diagram of one embodiment of a logical manipulation operation.

FIG. 11 is a flow diagram of one embodiment of a method 1100 for implementing a logical manipulation operation using the data services module 110. Step 1100 may comprise appending data to a VDL 150 and mapping metadata to a separate metadata log 160.

Step 1120 may comprise modifying a logical interface to data appended to the VDL 150 by appending persistent data to the metadata log 160 (appending an LME 173 to the metadata log 160). Step 1120 may further comprise modifying one or more entries in a forward map 125 corresponding to the modified logical interface. Step 1120 may comprise modifying the logical interface of the data without modifying the data stored on the VDL 150 and/or without appending data to the VDL 150.

Figure 12:
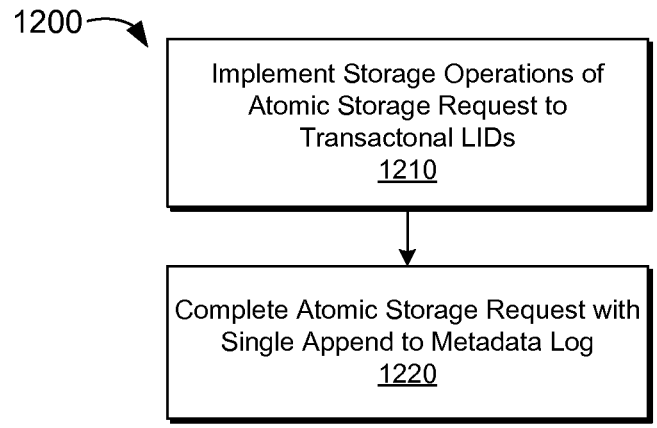
FIG. 12 is a flow diagram of one embodiment of a method for implementing atomic storage operations.

FIG. 12 is a flow diagram of one embodiment of a method for implementing atomic storage operations by use of the data services module 110. Step 1210 may comprise implementing storage operations of an atomic storage request to transactional LIDs. As disclosed above, transactional LIDs may correspond to LIDs (and/or vectors) in a designated range of the logical address space 122 and/or in a separate namespace. Step 1210 may comprise performing a logical copy operation to create a transactional copy of LIDs pertaining to the atomic storage request in the designated range and/or namespace. Step 1210 may further comprise implementing the storage operations by a) appending data of the storage operations to a VDL 150, and b) appending mapping metadata configured to bind the appended data to the transactional LIDs.

Step 1220 may comprise completing the atomic storage request by use of, inter alia, the metadata log 160. Step 1220 may comprise implementing a logical merge operation to merge the LIDs in the designated range of the logical address space 122 and/or separate namespace to target LIDs of the atomic storage request (e.g., to the vectors designated in the atomic storage request of step 1210). Step 1220 may, therefore, comprise completing and/or closing the atomic storage request in a single, atomic write operation to the metadata log 160, which may comprise recording an LME 173 in the metadata log 160, as disclosed above. In some embodiments, step 1220 may further comprise recording logical management metadata specified in the atomic storage request, such as deallocation information, as described above in conjunction with FIG. 5D. The logical management metadata may be included in the LME 173, as disclosed above.

Figure 13:
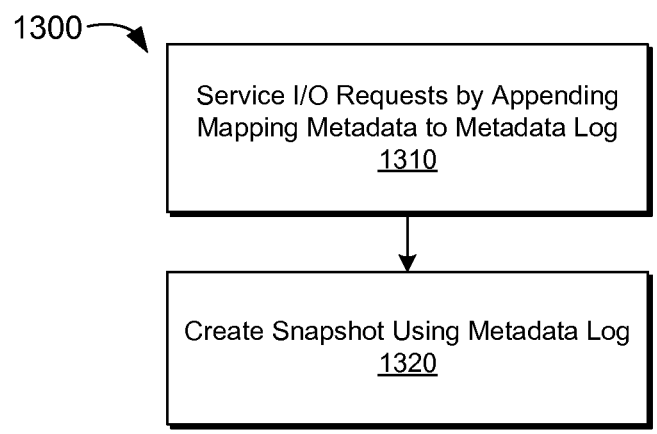
FIG. 13 is a flow diagram of one embodiment of a method for implementing snapshot operations.

FIG. 13 is a flow diagram of one embodiment of a method 1300 for implementing snapshot operations by use of the data services module 110. Step 1310 may comprise servicing I/O requests by a) appending data to a VDL 150, b) appending mapping metadata to a separate metadata log 160 configured to associate LIDs of a logical address space 122 with log storage units 122 of the VDL 150, and c) maintaining a forward map 125 comprising entries corresponding to the mapping metadata.

Step 1320 may comprise creating a snapshot of a set, range, and/or extent of LIDs in the logical address space 1320 by using the metadata log 1320. As disclosed above, creating a snapshot may comprise appending a persistent note, packet, and/or other data to the metadata log 160 (e.g., an LME 173) that is configured to bind a set of destination LIDs to the data bound to a set of source LIDs. In some embodiments, step 1320 comprises activating the snapshot by, inter alia, creating entries corresponding to the snapshot in the forward map 125. Alternatively, snapshot activation may be deferred, as disclosed herein. Step 1320 may further comprise preserving data corresponding to the snapshot by, inter alia, maintaining retention information pertaining to data of the snapshot and/or activating portions of the snapshot on demand, as disclosed herein.

Figure 14:
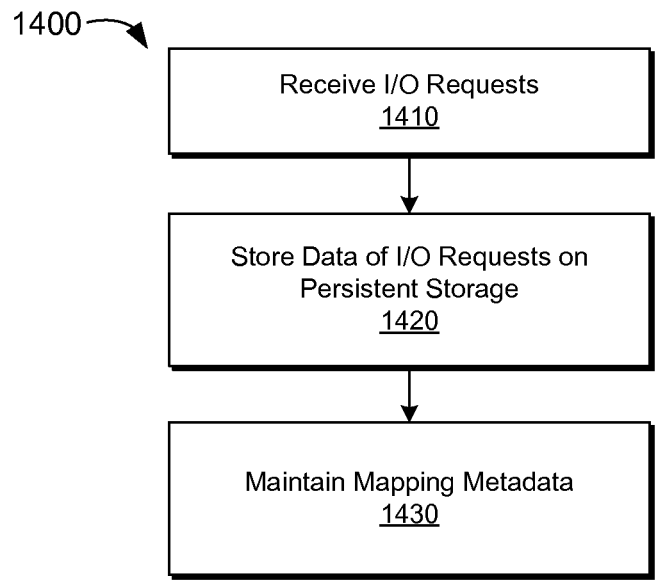
FIG. 14 is a flow diagram of one embodiment of a method for providing data virtualization services.

FIG. 14 is a flow diagram of one embodiment of a method 1400 for providing storage virtualization services. Step 1410 may comprise receiving I/O requests at a data services module 110, as disclosed herein.

Step 1420 may comprise servicing the I/O requests by, inter alia, storing data pertaining to the I/O requests on a persistent storage resource (e.g., storage resource 190A-X). Step 1420 may comprise appending data pertaining to the I/O requests to a VDL 150, as disclosed herein. Alternatively, step 1410 may comprise storing data using another storage mechanism, such as a write-out-of-place storage system, a write-in-place storage system, a key-value storage system, a journaling storage system, and/or the like.

Step 1430 may comprise maintaining mapping metadata pertaining to the I/O requests received at step 1410. Step 1430 may comprise storing mapping metadata that is persistent and crash-safe, such that bindings between LIDs of the data stored at step 1420 and storage unit(s) of the data may be maintained despite loss and/or corruption of the volatile memory resources 103 of the computing system 100. Step 1430 may comprise storing mapping metadata to a metadata storage, which may comprise a metadata log 160, as disclosed herein. Alternatively, the metadata storage may comprise a different storage mechanism, such as key-value pair storage, a journaling storage system, and/or the like. Step 1430 may comprise maintaining an order of the stored mapping metadata, such that mapping information stored in the metadata storage is ordered in accordance with an order in which the I/O requests were received at the data services module 110. Maintaining metadata order may comprise appending mapping metadata to an ordered metadata log 160, as disclosed herein. Alternatively, mapping metadata may be ordered using other mechanisms, such as dedicated sequence metadata, monotonically increasing ordering values, and/or the like.

Figure 15:
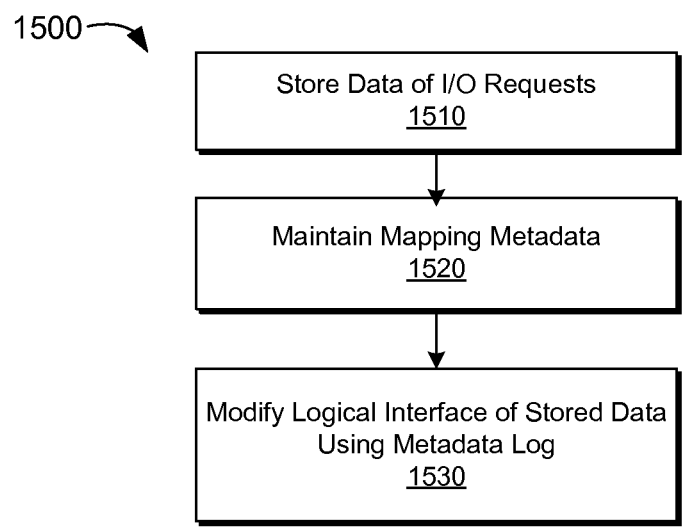
FIG. 15 is a flow diagram of another embodiment of a method for providing data virtualization services.

FIG. 15 is a flow diagram of another embodiment of a method 1500 for providing data virtualization services. Step 1510 may comprise storing data pertaining to I/O requests received at a data services module 110. Step 1510 may comprise storing data of the I/O requests on one of a plurality of storage resources 190A-Y. In some embodiments, step 1510 comprises appending data of the I/O requests to a VDL 150. Alternatively, step 1510 may comprise storing data of the I/O requests in a different storage format and/or using a different storage technique, such as write-in-place, write-out-of-place, write anywhere, journaling, and/or the like.

Step 1520 may comprise maintaining mapping metadata corresponding to the I/O requests, as disclosed above. Step 1520 may comprise appending mapping entries to a metadata log 160. Alternatively, step 1520 may comprise storing mapping metadata in another storage format and/or using another storage technique. Step 1520 may further comprise maintaining ordering information pertaining to the mapping metadata, as disclosed herein.

Step 1530 may comprise modifying the logical interface to data stored at step 1510 by, inter alia, modifying the mapping metadata of step 1520. Step 1530 may comprise one or more of: a) a logical move operation to associate data stored at step 1510 with a different set of LIDs, b) a logical copy operation to associate data stored at step 1510 with two or more different sets of LIDs, c) a logical merge operation to merge data associated with two or more different sets of LIDs, and/or the like. Step 1530 may comprise writing an LME 173 to the metadata log 160, as disclosed herein. The modification(s) to the logical interface may be implemented without modifying the stored data and/or without storing additional data to the storage resource(s) 190A-Y comprising the stored data. The modifications to the logical interface of step 1530 may be persistent and crash-safe, such that the modifications are reflected in persistent data stored in a metadata storage. Accordingly, the modifications of step 1530 may be implemented regardless of loss and/or corruption of the volatile memory resources 103 of the computing system 100.

The LM operations disclosed herein may be made available to clients 106 through, inter alia, a generalized interface for implementing logical manipulation operations (GLM interface). Clients 106 may leverage the GLM interface of the storage layer to implement higher-level operations that traditionally required complex, inefficient custom solutions. The GLM interface may be presented by and/or in conjunction with a storage layer, such as a block device interface, block device driver, and/or the like. Alternatively, or in addition, the GLM interface may comprise a separate, independent interface of the storage system (e.g., a dedicated interface for exposing LM primitives of the storage layer). The GLM interface may further define data types, such as LID vectors, on which LM operations are performed. The GLM interface may be implemented by many different types of storage systems, including the data services module 110 disclosed herein. The disclosure is not limited in this regard however, any suitable storage system, storage layer, storage module, and/or storage service could be adapted to implement the generalized LM interface disclosed herein.

Figure 16A:
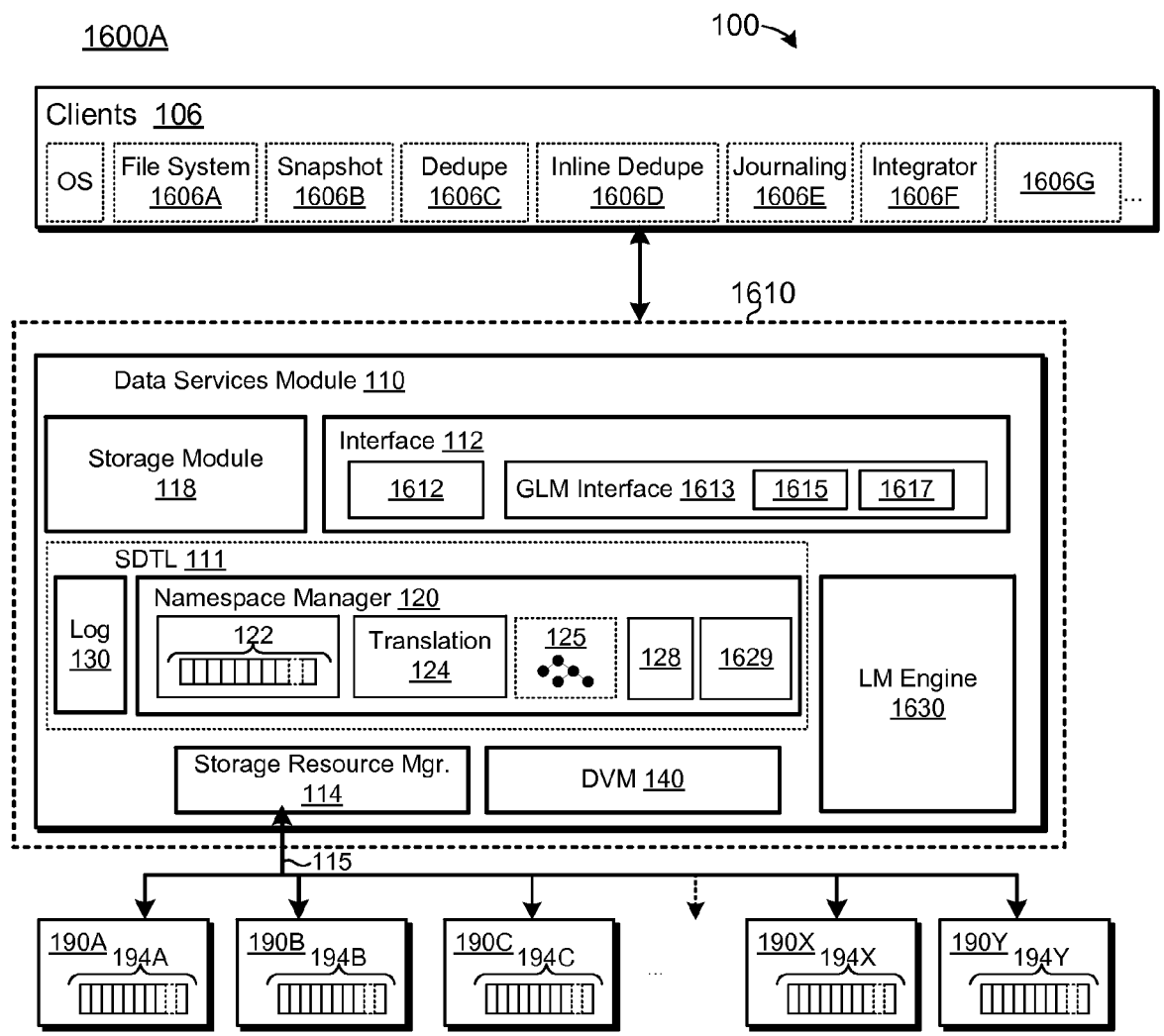
FIG. 16A is a schematic block diagram of another embodiment of a system for providing a generalized logical manipulation interface.

FIG. 16A is a schematic block diagram of one embodiment of a system for providing a generalized LM interface. The system 1600 includes a computing system 100 comprising a storage layer 1610. The storage layer 1610 may comprise a storage controller, storage manager, storage driver(s), storage service, and/or storage module capable of implementing the LM operations as disclosed herein, which may include, but are not limited to: range clone (logical copy, zero write copy, and/or the like), range move (logical move, zero write move, and/or the like), range merge (logical merge, zero write merge, and/or the like), range delete (logical delete, unmap, deallocate, write same, and/or the like), exists, and/or the like. The storage layer 1610 may implement LM operations in a sparse, durable logical address space 122. In the FIG. 16A embodiment, the storage layer 1610 comprises a data services module 110, as disclosed herein. The disclosure is not limited in this regard, however, and could be adapted for use with any suitable storage layer, module, controller, manager, service, and/or the like capable of implementing the LM operations disclosed herein.

The data services module 110 may comprise an interface module 112, a storage resource manager 114, a storage module 118, a DVM 140, and an SDTL 111 that comprises a namespace manager 120 and log module 130. The SDTL 111 may implement a sparse, durable translation layer between the logical address space 122 and storage resources 190A-Y. The logical address space 122 maintained by the namespace manager 120 may be sparse and/or thinly provisioned, having a logical capacity that is independent of the physical storage capacity and/or granularity of corresponding storage resources 190 (e.g., the logical capacity represented by the logical address space 122 may exceed the storage capacity of the storage resource(s) 190). Accordingly, physical storage capacity of the storage resources 190A-X is not reserved and/or consumed until data is stored thereon, regardless of allocations and/or reservations of LIDs within the logical address space 122. The SDTL 111 may implement any-to-any and/or many-to-one mappings between LIDs of the logical address space 122 and data stored on the storage resources 190A-Y. The mappings, assignments, and/or associations between LIDs and the storage resources, such as virtual blocks 145, log storage units 155, VDL 150A-N, and/or the like may be persistent and crash-safe. In some embodiments, the log module 130 maintains persistent virtualization metadata corresponding to the logical-to-physical mappings and/or modifications thereto.

As disclosed herein, the storage layer 1610 may be configured to service I/O requests 113 by, inter alia, storing data of the I/O requests within a VDL 150A-N (by use of the storage resource manager 114, storage module 118, and/or log module 130). Data written to a VDL 150A-N may be bound to one or more LIDs of the logical address space 122. Mappings between data written to a VDL 150A-N and LIDs may be made persistent and crash-safe by, inter alia, appending corresponding mapping entries 163 to a metadata log 160. The mapping entries 163 may bind LIDs to particular log storage unit(s) 155, virtual block(s) 145, and/or virtual address(es) 195, which correspond to physical storage locations and/or addresses, as disclosed herein. The metadata log 160 may be ordered, such that an order of the metadata stored in the metadata log 160 (e.g., mapping entries 163, aggregate mapping entries 167, checkpoint entries 168, LME 173, and so on) correspond with an order in which I/O requests 113 were received at the data services module 110. The log order of the metadata in the metadata log 160 may be determined by a) sequence metadata assigned to segments 162 of the metadata 160, and b) the relative address and/or offset of the metadata within the respective segments 162.

In the FIG. 16A embodiment, the data services module 110 further comprises an LM engine 1630 configured to implement LM operations pertaining to the logical address space 122 (e.g., logical to physical mappings). The LM operations may include, but are not limited to: range clone (logical copy, zero write copy, and/or the like), range move (logical move, zero write move, and/or the like), range merge (logical merge, zero write merge, and/or the like), range delete (persistent deallocation or TRIM, deallocate, unmap, write same, and/or the like), range exist, vectored operations, atomic LE operations, composite LE operations, and/or the like. The LM engine 1630 may use the SDTL 111 to implement durable LM operations in the sparse, thinly provisioned logical address space 122. As disclosed above, in some embodiments, the SDTL 111 may be configured to isolate LM operations with respect to other, concurrent operations implemented by the data services module 110. Isolating storage operations may comprise locking portions of the forward map 125 and/or other virtualization metadata while particular storage and/or LM operations are in progress. In some embodiments, the SDTL 111 comprises a concurrency manager 1629 that isolates LM operations by, inter alia, isolating portions of the virtualization metadata (forward map 125) that are being accessed and/or modified. Modifications within the logical-to-physical translation layer may occur in response to, inter alia, garbage collection, grooming, storage requests (e.g., write data requests), LM requests, and/or the like. In some embodiments, the LM engine 1630 is configured to request a lock within the logical address space 122 in accordance with a LID range(s) and/or extent(s) affected in a particular LM operation, such that other I/O operations can be implemented within other, unlocked portions of the logical address space 122. The concurrency manager 1629 may be configured to maintain concurrency control of the virtualization metadata to ensure correctness and serializability of updates to logical-to-physical translations (e.g., the forward map 125). In some embodiments, the concurrency manager 1629 is configured to lock portions of the forward map 125 while storage and/or LM operations are being performed in order to, inter alia, prevent concurrent access and/or modifications to the portions. The concurrency manager 1629 may be configured to lock the forward map 125 using any suitable locking and/or concurrency mechanism including, but not limited to: a single lock for accessing the forward map 125 (e.g., locking the entire logical address space 122), one or more locks within particular regions and/or ranges within the forward map 125 (locks covering particular LID ranges within the logical address space 122 and/or branches of a tree data structure), locks of varying granularity within the logical address space 122 (e.g., portions of the forward map 125), and/or the like. The concurrency manager 1629 may be configured to stall operations pertaining to locked portions of the forward map 125 until the operation(s) pertaining to the lock is complete (e.g., until the corresponding I/O request and/or LM operation is completed and the forward map 125 has been updated). In some embodiments, the concurrency manager 1629 is further configured to lock the forward map 125 until the corresponding storage and/or LM operation has been made durable by, inter alia, writing corresponding persistent, crash-safe metadata to a storage resource 190A-Y (e.g., metadata log 160). In some embodiments, the concurrency manager 1629 maintains locks within the logical address space 122 by use of one or more semaphore(s), such as atomic test and set (ATS) values, advisory locks, mandatory locks, spin locks, and/or the like. This disclosure is not limited in this regard, however, and could be adapted to use any suitable concurrency management mechanism(s) and/or technique(s), including, but not limited to: multiversion concurrency control (MVCC), index concurrency control, mutual exclusion, software transactional memory (STM), and/or the like.

The data service module 110 may comprise an interface module 112 that presents, inter alia, storage interface(s) to clients 106. The interface module 112 may include a block device interface 1612. The block device interface 1612 may correspond to the sparse, thinly provisioned logical address space 122 maintained by the namespace manager 120, as disclosed above. The block device interface 1612 may present one or more I/O interfaces and/or APIs for implementing block storage operations, such as reading and/or writing data to a block-based storage system in reference to LIDs of the logical address space 122. Although particular embodiments of a block device interface 1612 are described herein, the disclosure is not limited in this regard; the interface 112 may be adapted to include any suitable interface(s) including, but not limited to: an object storage interface, a direct file interface, a DBMS interface, a directory interface, and/or the like. The SDTL 111 is configured to maintain a sparse, thinly provisioned logical address space 122 that is independent of the underlying storage resources 190A-Y (and/or corresponding storage resource address space(es) 194A-Y). The translation module 124 may implement indirect, any-to-any and/or many-to-one mappings between LIDs and physical storage addresses, which may be used to, inter alia, efficiently implement LM operations without consuming physical storage resources. The SDTL 111 may be further configured to record persistent metadata pertaining to LM operations by use of the log module 130 (e.g., in respective LME 173, aggregate mapping entries 167, checkpoint entries 168, and/or the like), as disclosed herein. The LM engine 1630 may, therefore, leverage the SDTL 111 to ensure that the LM operations implemented thereby are durable, such that the effect of the LM operations are persistent and crash-safe.

The data services module 110 may be further configured to implement a generalized interface for leveraging the STDL 111 to implement LM operations. In the FIG. 16A embodiment, the storage layer 1610 comprises a generalized LM (GLM) interface 1613 configured to present an interface for performing LM operations pertaining to the sparse, durable logical address space 122 maintained by the data storage module 110 (by use of the STDL 111). The GLM interface 1613 may present primitives to perform, inter alia, LM operations, as disclosed herein. The GLM interface 1613 may provide functionality that does not exist in standard block read/write interface(s). Clients 106 may leverage the GLM interface 1613 to offload complex, inefficient operations to the storage layer 1610. In some embodiments, clients 106 leverage the GLM interface 1613 to implement higher-level functionality, such as zero-write copy, file-level snapshots, volume snapshots, deduplication, journaling, storage transactions, storage integration APIs, and/or the like. The GLM interface 1613 may present LM primitives pertaining to data stored through and/or by use of the block device interface 1612. The GLM interface 1613 may be used to create, modify, and/or remove LID mappings pertaining to block storage operations performed by use of the storage layer 1610. Accordingly, the GLM interface 1613 may extend the functionality of a block storage layer 1610 (and/or emulated block storage layer 1610). The GLM interface 1613 may be implemented and/or presented by use of various components, modules, circuits, and/or the like, including, but not limited to: a kernel-level module, a user-space module, a driver-level module, a driver, an I/O controller, an I/O manager, an I/O layer, an I/O service, a storage controller, a storage manager, a storage layer, a storage service, SCSI module, a library, a shared library, a loadable library, a DLL library, a DDI module, a LDD module, a PDD module, a WFD module, a UMDF module, a KMDF module, an I/O Kit module, a UDI module, a SDI module, an SDK, and/or the like.

As disclosed herein, an LM operation refers to a durable operation to create, modify, remove, and/or query the any-to-any and/or many-to-one mappings, assignments, bindings, and/or associations between the logical address space 122 and data stored on one or more storage resources 190A-Y. The GLM interface 1613 may present APIs and/or interfaces for implementing LM operations including, but not limited to: range clone operations (logical copy, such as the I/O request 113F disclosed above in conjunction with FIG. 3E), range move operations (logical move, such as the I/O request 113E disclosed above in conjunction with FIG. 3D), range merge (merge as the IO request 413C of FIG. 4C), range delete (deallocate, or write same), exists queries, composite LM operations, and/or the like. The functionality exposed through the GLM interface 1613 may pertain to particular LIDs, sets, ranges, and/or LID extents, LID vectors, and/or the like. Moreover, the LM operations of the GLM interface 1613 may be designated as atomic, such that the operations either entirely complete or are rolled back, as disclosed herein. Alternatively, or in addition, clients 106 may leverage the LM operations of the GLM interface 1613 to implement atomic operations, journaled operations, storage transactions, and/or the like.

The GLM interface 1613 may comprise a request receiver module and/or facility 1615 configured to receive requests to implement the LM operations disclosed herein. The GLM interface 1613 may further include a request response module 1617 and/or facility to acknowledge completion of requests issued to the GLM interface 1613 and/or to provide return values and/or return data in response to requests issued to the GLM interface 1613.

As depicted in FIG. 16A, in some embodiments, the GLM interface 1613 comprises an API and/or interface that is separate from and/or independent of other interface(s) of the data services module 110 (e.g., separate from and/or independent of the block interface 1612). The disclosure is not limited in this regard. Alternatively, or in addition, the GLM interface 1613 may be implemented as an extension and/or addition to one or more existing interfaces, such as the block interface 1612. The GLM interface 1613 may, for example, comprise implementing ioctl flags and/or parameters to implement certain LM operations, leveraging fadvise and/or other parameter passing mechanisms, and/or the like. As disclosed in further detail herein, clients 106 may leverage the GLM interface 1613 to efficiently implement LM operations, which may free the clients 106 from complex, inefficient implementations of similar and/or equivalent functionality. The GLM interface 1613 may, therefore, by used by clients 106 to implement higher-level storage virtualization services efficiently while reducing implementation complexity and/or client overhead.

As disclosed herein, the GLM interface 1613 may expose a suite of virtualization primitives and/or interfaces including: range clone, range move, range merge, range delete, range exists, composite LM operations, and so on. A range clone operation may be used to replicate data without incurring the time, space, and/or I/O bandwidth costs of an actual copy operation (e.g., without physically replicating the data). A range clone primitive may comprise a source LID range, length, and destination LID range (e.g., range_clone (source, length, destination)). Implementing a range clone LM operation may comprise the LM engine 1630 instantiating a set of LID mappings at the destination LID range that correspond to the data referenced by the source LID range (e.g., range_move (source, length, destination)), by use of the namespace manager 120 and/or DVM 140, as disclosed herein. A range move LM operation may comprise moving data from a source LID range to a destination LID range, without incurring the time and/or I/O costs associated with reading and rewriting the data. The LM engine 1630 may implement a range move operation by, inter alia, remapping data associated with the source LID range to the destination LID range (e.g., by use of the SDTL 111), as disclosed herein. A range merge operation may comprise merging one or more LID ranges, by use of the SDTL 111, as disclosed herein. A range delete operation may comprise deallocating and/or discarding mappings between a set of LIDs and data (e.g., range_delete (address, length) may discard mappings between the specified addresses and data stored within a VDL 150A-N, if any). The data services module 110 may be configured to return a pre-determined value in response to requests pertaining to unmapped LIDs (e.g., the data services module 110 may return a "0" in response to requests to read a LID that is not mapped to data in a VDL 150A-N). Accordingly, a range_delete operation may be referred to as "write same 0." In some embodiments, a range delete operation specifies a particular value to return in response to requests to read the deleted LID range (e.g., a particular bit value, pattern, and/or the like). The specified value and/or pattern may be recorded in an LM entry 173 corresponding to the range delete and/or specified in volatile metadata (e.g., forward map). Accordingly, a range delete may be referred to as write same and/or zero write fill operation.

An exists query may return indications of whether particular LIDs are associated with stored data. In one embodiment, a range_query operation may specify an address (LID range) and return data structure, such as a bitmap (e.g., address, length, *exist). The exists operation may comprise updating the data structure (*exist) to indicate whether the LIDs at the specified addresses are mapped to data stored on a storage resource 190A-Y (e.g., in a VDL 150A-N). The exists query may be determined by referencing the forward map 125 and/or other I/O metadata maintained by SDTL 111. In some embodiments, the exists query may be further configured to indicate a status of a LID as a) mapped to stored data, b) no longer in use to reference stored data (e.g., deleted or erased), c) unmapped or untranslated (e.g., not currently in use to reference data, regardless of whether was previously associated with stored data), and/or other status information, such as identified of the storage device(s) in use to store data associated with the LIDs, physical storage address, address within a VDL 150A-N, and/or the like.

In some embodiments, the generalized GLM interface 1613 may be configured to operate on logical vectors. As disclosed herein, a logical vector or "LID vector" refers to set, collection, range, and/or extent of LIDs within the logical address space 122. In some embodiments, a LID vector is defined by use of a data structure, such as:

```
struct lidvect {
    uint64 lidv_src;   // Base source LID
    uint32 lidv_len;   // length of the LID vector
}
```

The lidv_src parameter may specify the base or source LID of the LID vector (e.g., the starting point of the LID vector within the logical address space 122 and/or the source LID of a corresponding operation). The lidv_len parameter may specify the length and/or size of the LID vector and/or corresponding operation. The GLM interface 1613 may comprise a range_delete call pertaining to a set of one or more LID vectors, as below:

```
range_delete (
    const struct lidvect *lidv)
```

In response to a range_delete request, the LM engine 1630 may access the SDTL 111 to delete and/or invalidate mappings pertaining to the specified LID vectors (*lidv). In some embodiments, the range_delete may further include a fill parameter to specify a particular value and/or pattern in response requests to read data from the specified LIDs. Alternatively, or in addition, the GLM interface 1613 may comprise a separate primitive to implement a zero write fill operation:

```
range_writesame (
    const struct lidvect *lidv,
    uint32 data)
```

In response to a range_writesame request, the LM engine 1630 may access the SDTL 111 to delete and/or invalidate mappings pertaining to the specified LID vectors (*lidv) and/or configure the SDTL 111 to return the specified data value in response to requests to read the LID vectors. The data may be maintained in the forward map 125 and/or metadata log 160 (in an LM entry 163), as disclosed herien.

A range exists API for LID vectors may be defined as:

```
range_exists (
    const struct lidvect *lidv,
    struct *existmap)
```

In response to a range_exists request, the LM engine 1630 may access the SDTL 111 to update respective existmap data structures (e.g., bitmaps) to indicate whether the LIDs within the corresponding LID vectors (*lidv) are mapped to data stored on a storage resource 190A-N (in a VDL 150A-N), as disclosed herein.

In some embodiments, a LID vector may further comprise a destination LID parameter that defines a destination LID for a particular LM operation. In such embodiments, the LID vector data structure may be defined as:

```
struct lidvect {
    uint64 lidv_src;    // Base source LID of LID vector
    uint32 lidv_len;    // Length of the LID vector
    uint64 lidv_dest;   // Destination LID of LID vector
}
```

The lidv_dest parameter may specify the destination LID (starting LID within the logical address space 122) for a particular LM operation, such as a range_clone, range_merge, range_move, and/or the like. In one embodiment, for example, a range_clone operation interface may be defined as:

```
range_clone (
    const struct lidvect *lidv)
```

In response to the range_clone request, the LM engine 1630 may use the SDTL 111 to clone the specified LID vectors by, inter alia, cloning lidv_len LID mappings from lidv_src to lidv_dest. Other operations of the GLM interface 1613 may be defined in terms of LID vectors. In one embodiment, a LID vector range_move operation is defined as:

```
range_move (
    const struct lidvect *lidv)
```

In response to a range_move request, the LM engine 1630 may access the SDTL 111 to move the specified LID vectors by, inter alia, assigning lidv_len LID mappings from lidv_src to the LIDs at lidv_dest, as disclosed herein. The LID vectors of the range_move of a range move request may pertain to a plurality of different sets, groups, collections, regions, extents, and/or ranges of LIDs within the logical address space 122. The LID vectors may be disjoint (non-contiguous) within the logical address space 122. In some embodiments, the data services module 110 implements range_move operations atomically by, inter alia, writing, storing, persisting, recording, and/or appending a single metadata entry to a non-volatile storage medium (e.g., an LM entry 173). The entry may comprise mapping information corresponding to the modified logical-to-physical translations of the range_move operation. The single entry may include translation metadata pertaining to a plurality of different, disjoint LID vector(s), as disclosed herein in conjunction with FIGS. 3A-3D and/or 17D.

A range_merge operation may be defined in terms of LID vectors, as below:

```
range_merge (
    const struct lidvect *lidv,
    const uint32 *mode)
```

In response to a range_merge API call as defined above, the LM engine 160 may be configured to merge the specified LID vectors by, inter alia, merging lidv_len LIDs from lidv_src into the destination LID vector (lidv_dest) according to a merge mode designated by respective mode parameters, as disclosed herein.

In some embodiments, the LM interface includes composite LM primitives that define, inter alia, a plurality of different LM operations on respective LID vectors. A composite LM primitive may correspond to a plurality of LID vectors that include an "lm_flag" parameter in addition to the lidv_src, lidv_len, and/or lidv_dest parameters described above:

```
struct lidvect {
    uint64 lidv_src;    // Base source LID of LID vector
    uint32 lidv_len;    // Length of the LID vector
    uint64 lidv_dest;   // Destination LID of LID vector
    uint32 lm_flag;     // Operation(s) to perform on LID vectors
}
```

The lm_flag parameter may specify an operation to perform on the corresponding LID vector(s), such as a range_clone operation, range_move operation, range_merge operation, range_delete, range_exists, and/or the like. A plurality of lidvects may be issued to a range_composite (*lidvect) request, which may implement the operations specified in the respective lm_flag(s).

In some embodiments, the composite LM operations may be implemented atomically by: a) implementing the sub-operations of the respective LID vectors in a designated "scratch" region of the logical address space 122, and b) implementing an additional range_move operation to move data corresponding to the sub-operations from the designated region of the logical address space 122 to a destination region of the logical address space 122. The destination region may correspond to the source and/or destination LID vectors specified in the range_composite request (e.g., the LID dest and/or LID src parameter(s) of the respective lidvect(s)). The "scratch" region may correspond to a region of the logical address space 122 designated for use in storing data pertaining to atomic and/or journaled operations. As described above, implementing a range_composite operation may comprise moving data from the designated scratch region(s) to the actual destination LID vectors specified in the request. The range_move operation may be implemented atomically, as disclosed herein. Therefore, during crash recovery and/or metadata rebuild, any data associated with the designated scratch region(s) may be identified as part of an incomplete atomic and/or journalized transaction that can be invalidated and/or removed (e.g., rolled back).

Although particular examples of a GLM interface, an API, LID vectors and/or LM operations are described herein, the disclosure is not limited in this regard and could be adapted to define LID vectors and/or LM operations of the GLM interface 1613 using any suitable mechanism(s) and/or technique(s) including, but not limited to: object-oriented interfaces, remote interfaces, and/or the like.

Clients 106 may leverage the GLM interface 1613 to efficiently implement higher-level functionality. A file system 1606A may, for example, implement file system operations by use of the GLM interface 1613. In one embodiment, the file system 1606A is configured to implement a zero-write file copy by overloading a standard file "cp" command. The file system 1606A may designate an ioctl to specify a zero-copy implementation. In response to a cp request comprising the designated ioctl, the file system 1606A may implement the file copy request by: a) allocating a set of LIDs for the file copy (destination LIDs), and b) issuing a range_clone request to the GLM interface 1613 to clone the LIDs of the designated file (source LIDs) to the destination LIDs. In response to the range_clone request, the LM engine 1630 may use the SDTL 111 to implement a range clone operation, as disclosed herein, such that both the source LIDs and destination LIDs reference the same file data on the storage resources 190A-Y. The file system 1606A may be further configured to clone multiple files by use of a plurality of range_clone API calls and/or a range_clone API call comprising a plurality of LID vectors. As disclosed in further detail herein, other clients 106, such as a snapshot client 1606B, deduplication client 1606C, inline deduplication client 1606D, journaling client 1606E (e.g., journaling file system), storage integrator 1606F, storage application 1606G and/or the like, may leverage the GLM interface 1613 to offload functionality to the storage layer 1610.

Figure 16B:
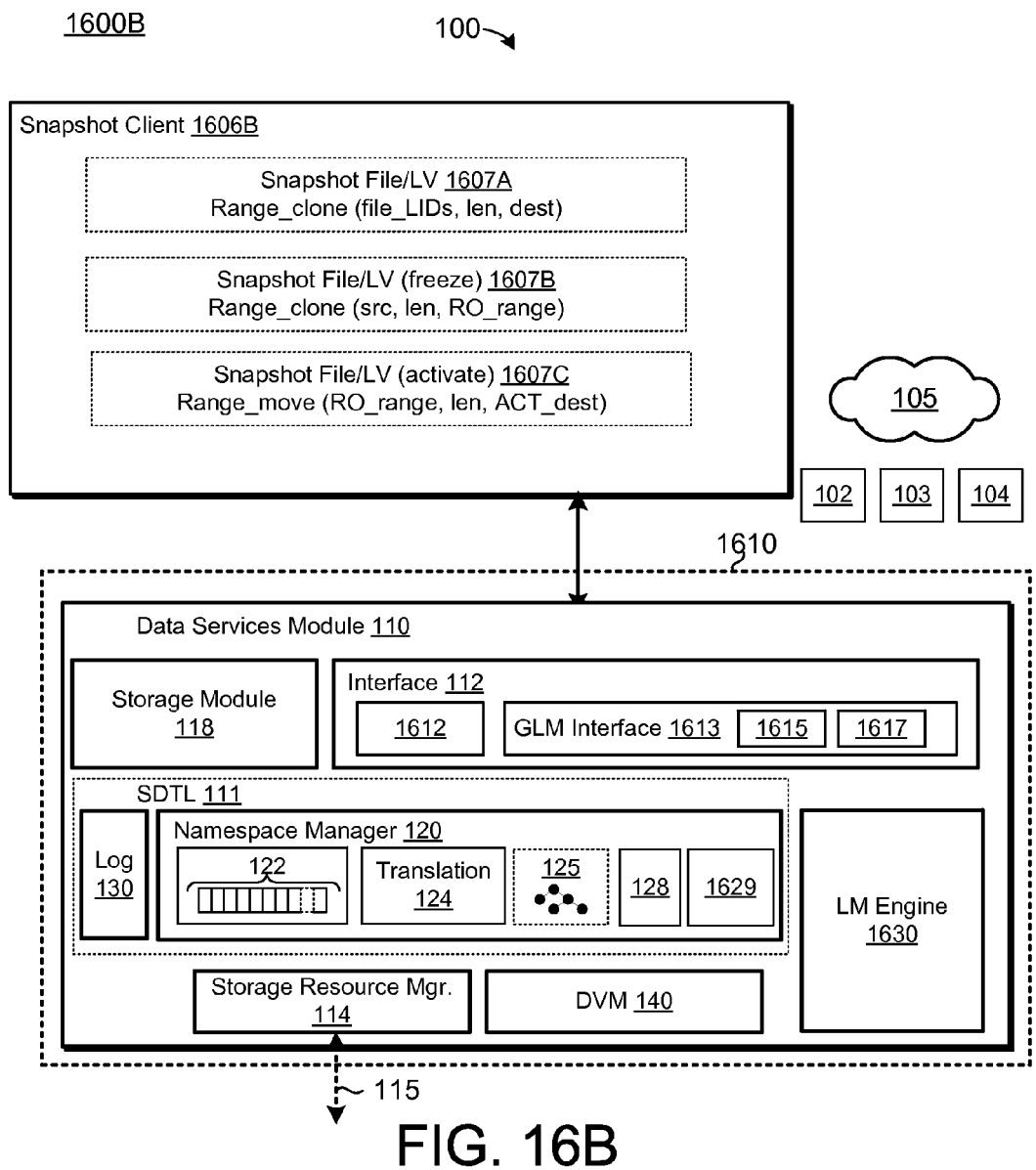
FIG. 16B is a schematic block diagram of one embodiment of a system for leveraging a generalized logical manipulation interface to implement snapshots.

FIG. 16B is a schematic block diagram of another embodiment of a system 1600B for providing LM functionality. In the FIG. 16B embodiment, the system 1600B comprises a client 106 configured to leverage the GLM interface 1613 to implement snapshot operations (snapshot client 1606B). The snapshot client 1606B may comprise a file system, volume manager (Linux Volume Manager (LVM)), and/or the like. The snapshot client 1606B may implement file-level snapshots of a file by issuing a range_ clone request 1607A through the GLM interface 1613. The range_clone request 1607 may specify: a) the source range for the logical copy operation (the LIDs associated with the file to be cloned, file_LIDs), b) the length of the file, and/or c) the destination LID range for the logical copy (dest). In response, the LM engine 1630 may a) allocate the destination LIDs (if not already allocated) and b) map the destination LIDs to the data associated with the source LIDs, as disclosed herein. The LM engine 1630 may be further configured to record persistent metadata to ensure that the operation is persistent and crash-safe (by use of the log module 130).

In another embodiment, the snapshot client 1606B may leverage the GLM interface 1613 to implement a snapshot of an arbitrary LID range, such as a logical volume. The snapshot client 1606B may "freeze" the snapshot, such that the snapshot is preserved as read-only. As illustrated in FIG. 16B, the snapshot client 1606B may create and "freeze" a snapshot by issuing a range_clone request to the GLM interface 1613 specifying a source LID range, a length, and a read-only destination range (RO_range). The RO_range may correspond to a designated read-only range managed by the namespace manager 120. Alternatively, the RO_range may comprise an arbitrary range of the sparse, thinly provisioned logical address space 122 managed by the namespace manager 120 and presented through the interface module 112. The snapshot client 1606B may designate portions of the logical address space 122 as read-only independently of the data services module 110 (may allocate read-only LID range(s) and enforce constraints therein). The snapshot client 1606B may activate a frozen snapshot by moving the snapshot from the RO_range into another portion of the logical address space 122 (to ACT_range). Write operations in the activated range (and/or destination of the file snapshot of request 1606B) may be implemented by redirecting writes to the destination range, while preserving data mapped to other, unaffected LID ranges, as disclosed herein.

Figure 16C:
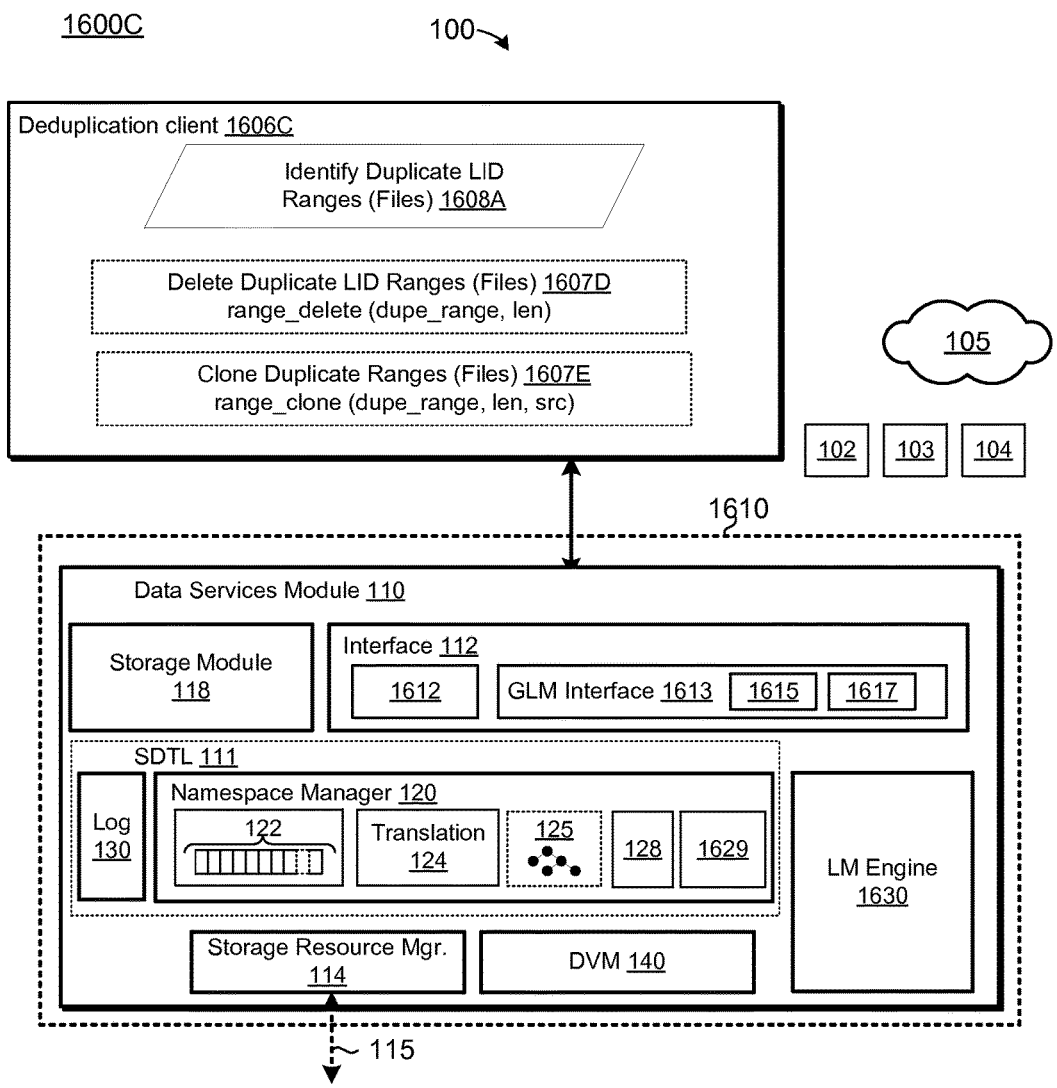
FIG. 16C is a schematic block diagram of one embodiment of a system for leveraging a generalized logical manipulation interface to implement deduplication.

FIG. 16C is schematic block diagram of one embodiment of a system 1600C for leveraging an LM interface to implement deduplication. In the FIG. 16C embodiment, the system 1600C comprises a client 106 configured to implement deduplication by use of the LM operations presented through, inter alia, the GLM interface 1613 (deduplication client 1606C). The deduplication client 1606C may comprise a file system, a file system utility, a volume manager, a backup application, and/or the like. The deduplication client 1606C may be configured to identify duplicate LID ranges 1608A, which may comprise a) scanning LID ranges (files), b) determining signature(s) of the LID ranges (files), and c) comparing signature(s) to identify duplicate data. The deduplication client 1606C may perform the identification steps of 1608A in preparation for backing up and/or snapshotting a particular logical volume in order to, inter alia, reduce the size of the volume. Although particular embodiments for identifying duplicate data are described herein, the disclosure is not limited in this regard and could be adapted to use any suitable mechanisms for identifying duplicate data.

In response to identifying duplicate data, the deduplication client 1606C may remove the duplicates by use of GLM interface 1613, which may comprise: a) deleting the identified duplicated LID ranges (dupe_range) by issuing one or more range_delete requests, and b) creating logical copies (clones) of a "source" version of the duplicate data (src_ range) at the identified duplicate LID ranges (dupe_range) by issuing one or more range_clone requests. In response to the range_delete request(s), the LM engine 1630 may invalidate (remove) mappings between the LIDs in the specified dute_range(s) and duplicated data stored on the storage resources 190A-X (within one or more VDLs 150A-N). In response to the range_clone request(s), the LM engine 1630 may create many-to-one associations between the LIDs in the specified dupe_range(s) and a single copy of the data on the storage resource(s) 190A-X, such that the data is referenced by the LIDs of the src LID range as well as the LIDs of the dupe_range(s). Modifications made within the dupe_ range(s) and/or source LID ranges may result in write-indirections, as disclosed herein.

Figure 16D:
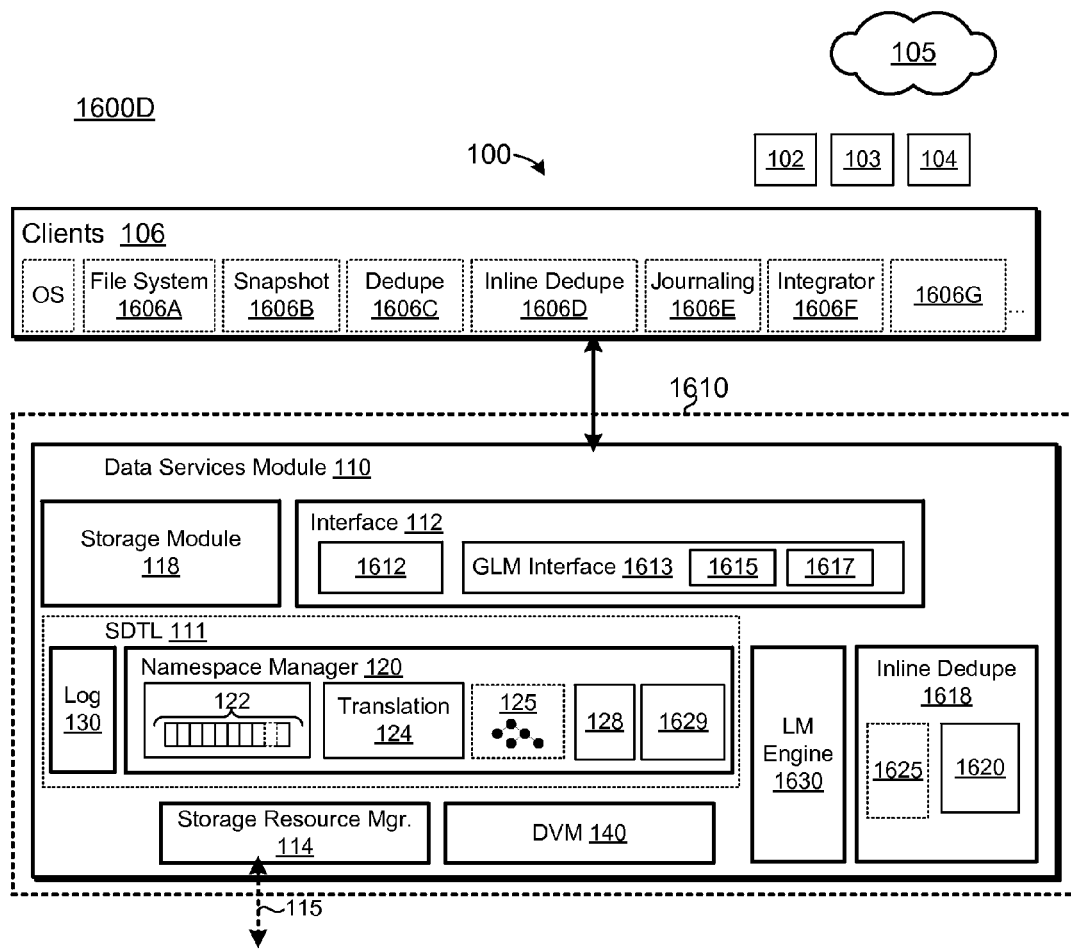
FIG. 16D is a schematic block diagram of another embodiment of a system for leveraging a generalized logical manipulation interface to implement deduplication.

FIG. 16D is a schematic block diagram of another embodiment of a system 1600D for implementing deduplication by use of the GLM interface 1613. In the FIG. 16D embodiment, the data services module 110 comprises an in-line deduplication module 1618 configured to identify and/or deduplicate data as (and/or before) duplicate data is written to the storage resources 190A-Y (inline deduplication client 1606D). The inline deduplication module 1618 may be configured to identify duplicate data by use of duplication metadata 1625, which may comprise, inter alia, signatures corresponding to data written to one or more VDLs 150A-N. The signatures of the deduplication metadata 1625 may correspond to sets of one or more blocks, segments, packets, virtual blocks, and/or the like. Alternatively, or in addition, the signatures may correspond to higher-level entities, such as objects, files, directories, database tables, and/or the like. The signatures of the deduplication metadata 1625 may be maintained in the forward map 125 and/or other metadata storage. Alternatively, the signatures may be generated as needed (may not be maintained in memory and/or persistent storage). The inline deduplication module 1618 may further comprise an identification engine 1620 that identifies data duplication in-line (e.g., in response to requests to write duplicate data). In response to a write request, the identification engine 1620 may determine a signature of the data to be written and access the deduplication metadata 1625 to determine whether the data has already been stored by the data services module 110 (e.g., by comparing the signature of the data to be written to signatures of data already stored on the storage resources 190A-Y). If the identification engine 1620 determines that the same data has already been stored, the inline deduplication module 1618 may replace the write request with a request to clone the identified data (e.g., replace the write with a range_clone). If the identification engine 1620 determines that the data is not a duplicate of existing data, the write may proceed as disclosed herein.

In some embodiments, the inline deduplication module 1618 designates the source and duplicate LID ranges for inline deduplication operations in accordance with a deduplication policy. The deduplication policy may be based on characteristics of the storage resource(s) 190A-Y used to store the data corresponding to the source and/or destination LID ranges, garbage collection considerations (e.g., age of data within the respective source and/or destination LID ranges), and/or the like. In one embodiment, the inline deduplication module 1618 may identify the LID range(s) comprising the data that was most recently written to the storage resources 190A-Y and may designate the identified LID range(s) as the destination LID range(s) of the inline deduplication operation. Alternatively, the inline deduplication engine 1618 may select the destination LID range according to QoS and/or storage performance considerations. In one embodiment, the inline deduplication engine 1618 identifies the LID range(s) corresponding to storage resources 190A-Y that satisfy the QoS requirements of particular clients 106 and selects the identified LID range(s) as the destination of the deduplication operation. Although particular examples of a deduplication policy and/or deduplication policy considerations are disclosed herein, the disclosure is not limited in this regard and could be adapted to select a destination LID range based on any suitable characteristics and/or criterion.

Figure 16E:
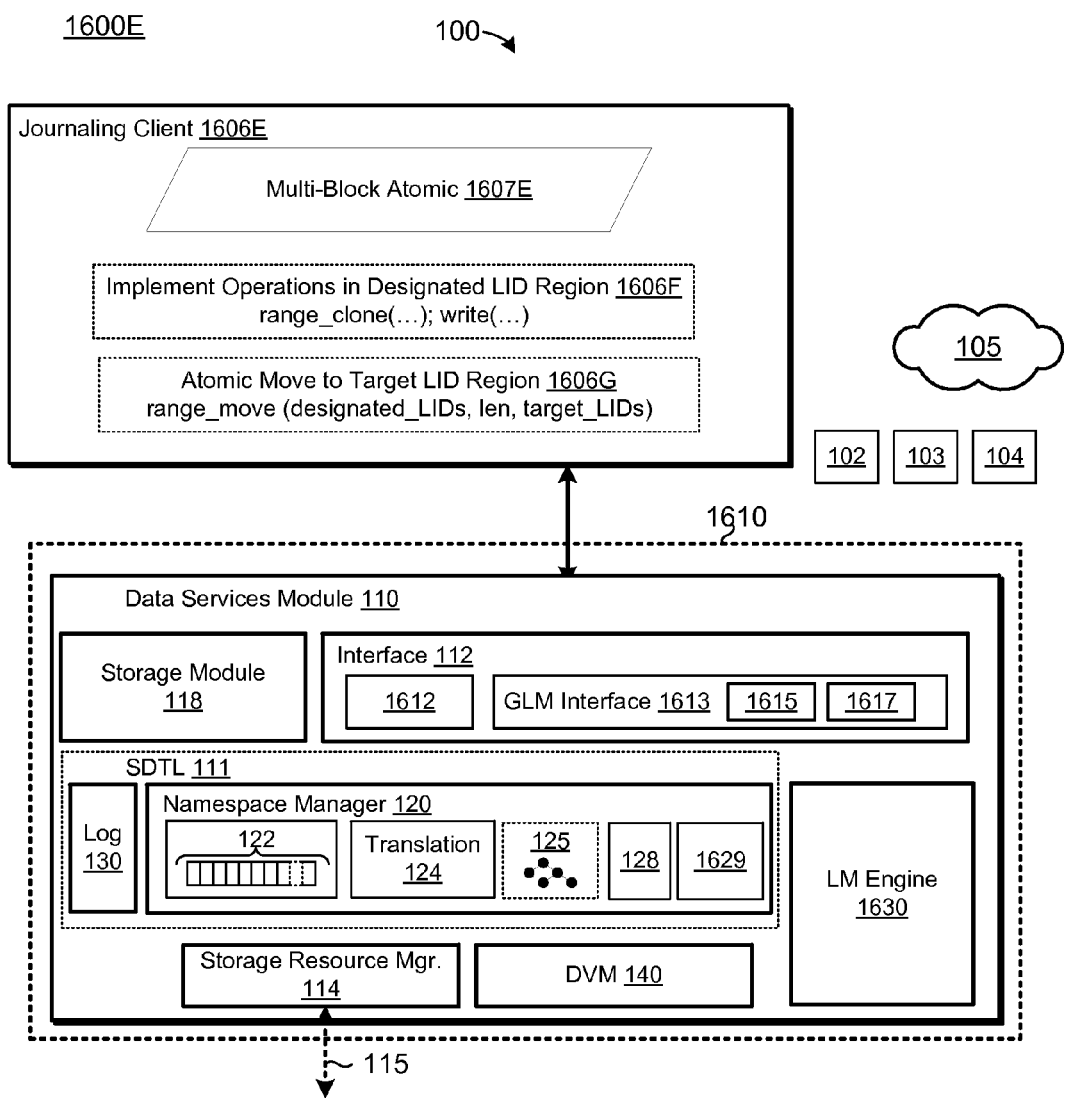
FIG. 16E is a schematic block diagram of one embodiment of a system for leveraging a generalized logical manipulation interface to implement optimized journaling.

FIG. 16E is a schematic block diagram of one embodiment of a system 1600E for providing an LM interface for optimized journaling. As used herein, journaling refers to providing atomicity of multi-block updates. Accordingly, a journaled storage operation may be referred to as an I/O transaction and/or atomic transaction. Most storage systems do not guarantee atomicity of storage operations beyond a single block write. Accordingly, many journaling storage clients 1606E implement a dual-write journaling scheme which requires multi-block updates to be written two (or more) times. Such storage clients may leverage the GLM interface 1613 to implement optimized journaling operations, including multi-block and/or vectored atomic storage operations.

As disclosed herein, a multi-block atomic storage operation 1607E refers to a transaction that spans more than one block. A multi-block atomic storage operation 1607E may comprise a plurality of operations pertaining to one or more I/O vectors (e.g., separate sets, ranges, extents, and/or collections of LIDs). The journaling client 1606E may delegate journaling operations to the data services module 110 by use of the API primitives exported by the GLM interface 1613, such as the range_clone and/or range_move APIs disclosed herein. In the FIG. 16E embodiment, the journaling client 1606E is a storage client that a) requires journalized storage operations (e.g., multi-block atomic storage operations 1607E) and b) is configured to leverage APIs of the GLM interface 1613 to implement such operations rather than a dual-write implementation. The journaling client 1606E may implement the multi-block atomic operation 1607E within a designated region of the logical address space 122, such as a transactional range and/or vectors disclosed above in conjunction with FIGS. 5A-D. Alternatively, or in addition, the journaling client 1606E may allocate and/or maintain its own transactional region of the logical address space 122 independent of region designations of the namespace manager 120 and/or an atomic storage module 546. Therefore, in the FIG. 16E embodiment, the journaling client 1606E is configured to directly manage allocation and/or deallocation of transactional LIDs. The journaling client 1606E may implement operations 1606F comprising the multi-block atomic operation within the transactional region of the logical address space 122. In some embodiments, the operations 1606F comprise one or more range_clone requests in order to, inter alia, efficiently implement multi-block read-modify-write operations. The range_clone operation may be used to clone data at one or more target_LIDs at one or more designated transactional LIDs (designated_LIDs). After completing the operations 1606F comprising the multi-block atomic operation 1607E in the transactional region of the logical address space 122, the journaling client requests an atomic range_move operation to move the data from the designated transactional region (designated_LIDs) to the target region (target_LIDs). As disclosed herein, the LM engine 1630 may be configured to move data corresponding to a plurality of separate, disjoint vectors in a single atomic operation (e.g., by writing a single LME 173). After an invalid shutdown, the journaling client 1606E may be configured to invalidate data that is still associated with LIDs in the transaction region by, inter alia, issuing range_delete requests to the data services module 110 through the GLM interface 1613.

Figure 16F:
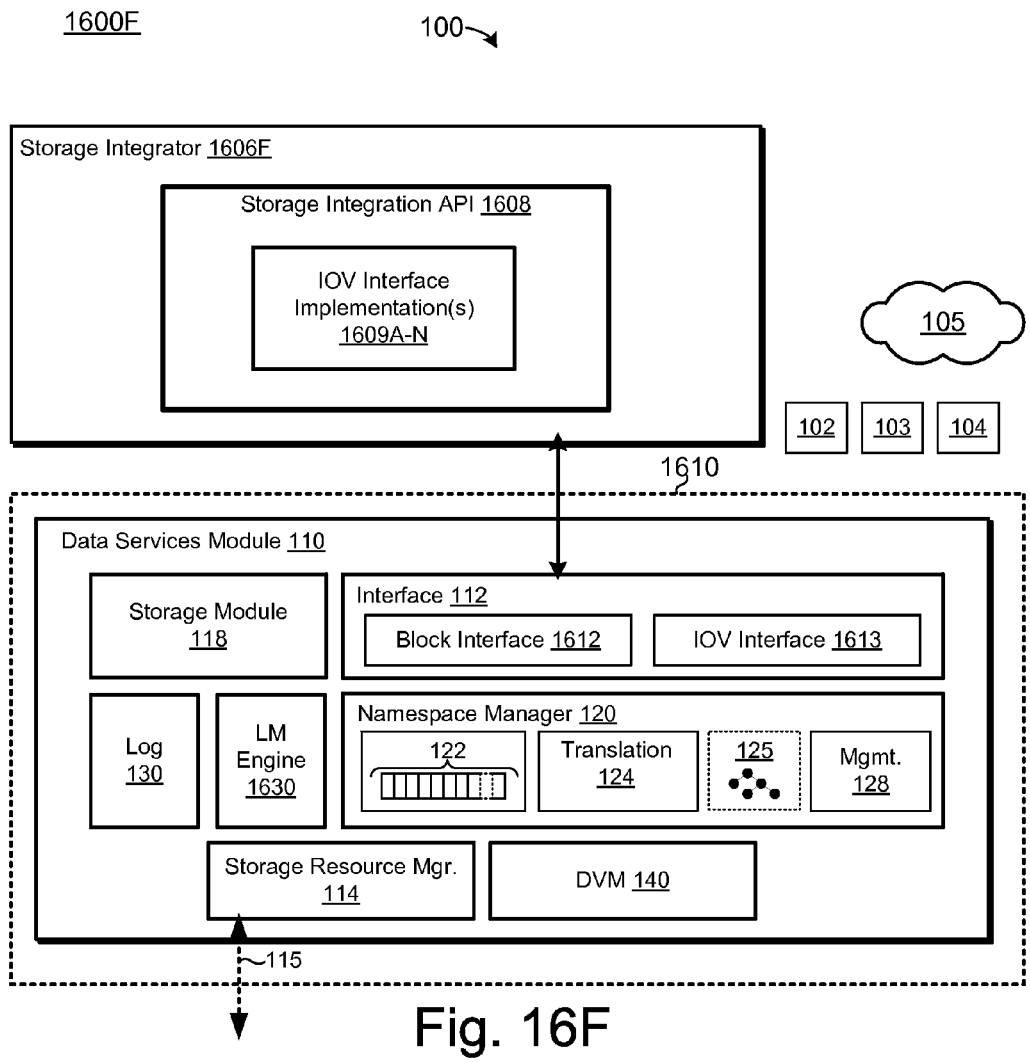
FIG. 16F is a schematic block diagram of one embodiment of a system for leveraging a generalized logical manipulation interface to implement a storage integration API.

FIG. 16F is a schematic block diagram of one embodiment of a system 1600F for leveraging an LM interface to implement a storage integration API. The system 1600F comprises a storage integrator 1606F configured to implement a third-party storage integration API, such as VMWare Applications Acceleration Interface (VAAI), T10-PI, and/or the like by use of the GLM interface 1613. The storage integration API may comprise a hardware acceleration and/or hardware offload API configured to enable communication between a storage client (e.g., virtualization system) and a storage system. The storage integration API may define a set of functions to be offloaded to the storage system (data storage module 110), which may include, but are not limited to: ATOMIC TEST AND SET (ATS), XCOPY (EXTENDED COPY), WRITE SAME (zero), full file clone, fast file clone, snapshot, unmap, and/or the like. The storage integrator 1606F may be configured to implement the storage integration API by use of, inter alia, the GLM interface 1613.

The storage integration API 1608 may comprise a hardware acceleration and/or hardware offload API configured to enable communication between a storage client (e.g., virtualization system) and the data services module 110. The storage integration API 1608 may define a set of functions to be offloaded to the storage system (data storage module 110), which may include, but are not limited to: atomic test and set (ATS), xcopy (extended copy), write same (zero), full file clone, fast file clone, snapshot, unmap, and/or the like. The storage integrator 1606F may be configured to implement the storage integration API 1608 by use of, inter alia, the APIs available through the GLM interface 1613. In alternative embodiments, the GLM interface 1613 may be configured to implement the storage integration API 1608 directly.

In the FIG. 16F embodiment, the storage integrator 1606F comprises one or more GLM interface implementations (IOVII) 1609A-N that implement particular APIs of the storage integration API 1608 using APIs accessible through the GLM interface 1613, such as the range_clone API, range_move API, range_delete API, and/or range_exists API disclosed herein. An IOVII 1609A may be configured to implement ATS. The IOVII 1609A may implement ATS using by issuing one or more range_clone and/or range_move requests to the GLM interface 1613 by a) issuing a read request to determine the value of LID corresponding to the ATS and b) if the value is "0," performing an atomic write to the LID, as disclosed herein. If the value of the ATS LID is not "0," the ATS returns without writing the "1." Alternatively, or in addition, the read may be replaced by an "exists" query to determine whether the ATS LID is mapped to data, and may release the ATS lock by issuing a range_delete to the ATS LID.

An IOVII 1609B may be configured to implement xcopy, which may comprise issuing range_clone requests to clone designated files and/or LID ranges, as disclosed herein. Another IOVII 1609C may be configured to implement write same (zero), which may comprise issuing range_delete requests pertaining to a designated set of LIDs. As disclosed herein, subsequent requests to read deleted data may return "0" or another designated value. Alternatively, or in addition, the range_delete request may specify a return value for subsequent read requests (e.g., return random data, a designated pattern, and/or the like). An IOVII 1609D may be configured to implement a full file clone by, inter alia, issuing one or more range_clone requests to the GLM interface 1613 to clone LID ranges corresponding to particular files. Similarly, an IOVII 1609E may be configured to implement fast file clone and/or snapshot support using range_clone calls. An IOVII 1609N may be configured to implement unmap functionality by issuing range_delete requests through the GLM interface 1613, as disclosed herein. Although particular examples of storage integrations API 1608 are described, the disclosure is not limited in this regard and could be adapted to implement any suitable storage integration API 1608 by use of the GLM interface 1613 disclosed herein.

Figure 16G:
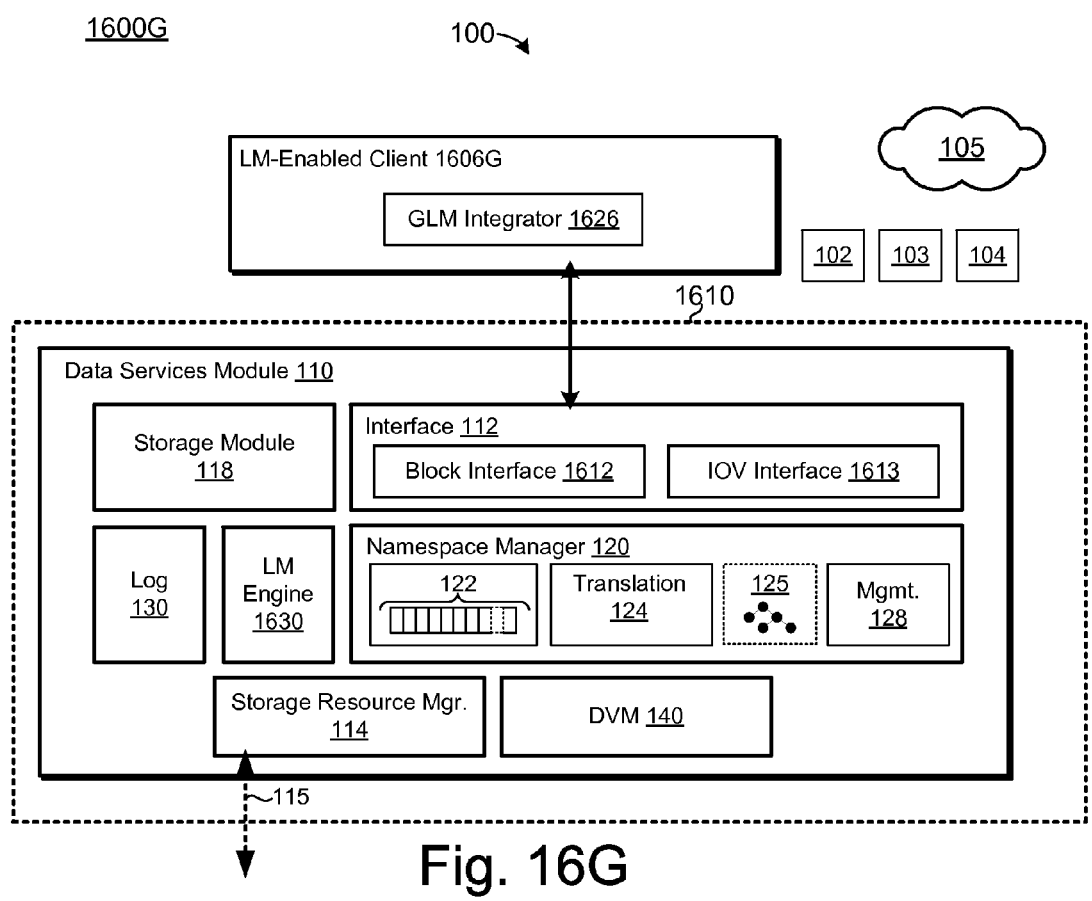
FIG. 16G is a schematic block diagram of one embodiment of a system comprising a storage application configured to leverage a generalized logical manipulation interface.

FIG. 16G is a schematic block diagram of another embodiment of a system 1600G for leveraging a GLM 1613 to implement by an LM-enabled storage application 1606G. As used herein, the LM-enabled storage application 1606G refers to a client 106 configured to leverage the GLM interface 1613 to implement higher-level operations. The LM-enabled storage application 1606G may include, but is not limited to: an operating system, a file system 1606A, a snapshot client 1606B, a deduplication client 1606C, an inline deduplication client 1606D (e.g., inline deduplication module 1618), a journaling client 1606E, a storage integrator 1606F, a storage application 1606G, and/or the like. In the FIG. 16G embodiment, the LM-enabled storage application 1606G may comprise a file system 1606A, key-value storage system, database, directory, and/or the like. The storage application 1606G may be configured to replace internal implementations of LM operations with calls to the GLM interface 1613. For example, the storage application 1606G may comprise a file system configured to replace copy operations and/or copy-on-write operations with range clone requests issued to the GLM interface 1613. In some embodiments, the storage application 1606G is configured to maintain file consistency (concurrent file access) by use of the LM operations presented through the GLM interface 1613. The storage application 1606G may implement a file consistency model that ensures that file modifications are not committed (e.g., are not visible to other clients of the file system) until the file is closed. Therefore, during the time a file is open, the storage application 1606G may maintain the original, unmodified version of the file data. The storage application 1606G may implement the file consistency model by a) cloning files as files are opened by file system client(s), and b) merging files as the files are closed by the file system client(s). Cloning a file may comprise a) allocating a "working set" of LIDs for the cloned file, and b) issuing a range clone request to clone the file data to the working set of LIDs. The file system client may perform storage operations on the file in reference to the working set of LIDs, such that modifications are performed in the working set while the original file data remains unchanged. Merging the file may comprise issuing a range merge request through the GLM interface 1613 (and/or a range move request) to associate the data mapped to the working set of LIDs to the LIDs assigned to the file.

In another embodiment, the storage application 1606G comprises a key-value storage system. The storage application 1606G may be configured to manage key collisions by, inter alia, performing range move operations within the logical address space 122. In response to a collision, the storage application 1606G may issue one or more range move requests to move conflicting data within the logical address space 122 without reading and/or rewriting the data.

Figure 17A:
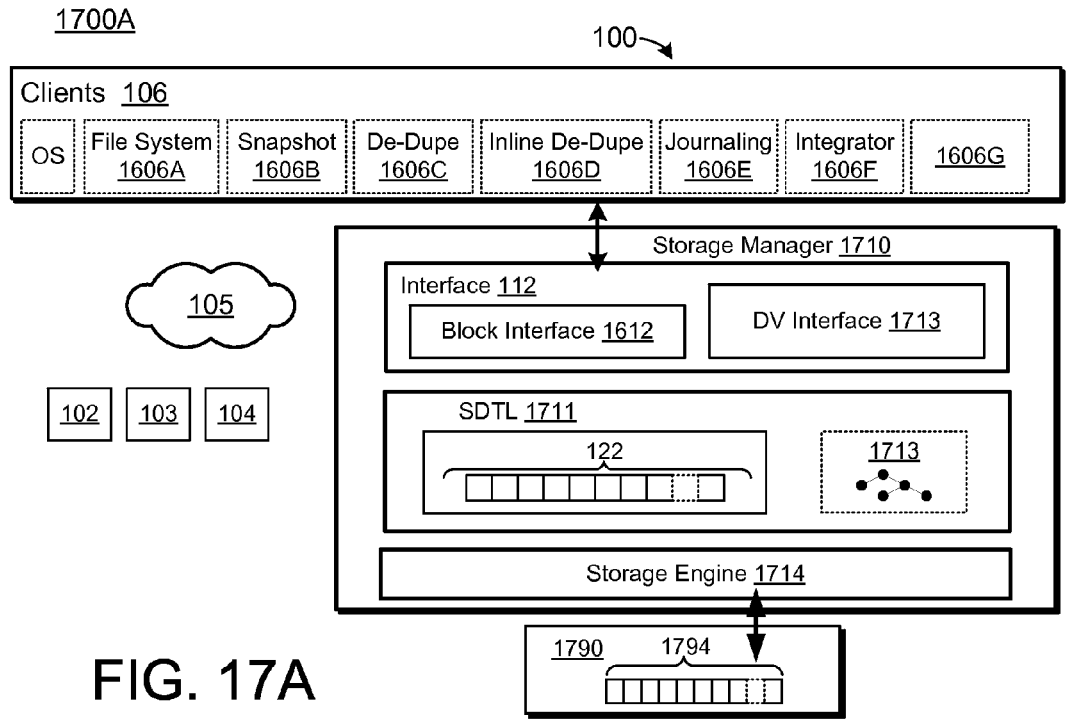
FIG. 17A is a schematic block diagram of another embodiment of a system for providing a generalized logical manipulation interface.

As disclosed above, the DV interface 1713 may be implemented by any suitable storage system including, but not limited to, the storage layer 1610 and/or data services module 110 disclosed herein. FIG. 17A is a schematic block diagram of another embodiment of a system for providing a DV interface 1713. The system 1700A may include a computing system 100 comprising a storage layer 1610. In some embodiments, the storage manager 1710 comprises a storage layer 1610 and/or data services module 110, as disclosed herein. The disclosure is not limited in this regard, however, and could be used with any suitable storage circuit, controller, manager, driver, service, and/or layer capable of implementing the LM primitives of the generalized LM interface 1613, as disclosed herein.

The storage manager 1710 may comprise a sparse, durable translation layer (SDTL) 1711. As disclosed herein, an SDTL 1711 refers to a logical-to-physical translation layer that is: a) independent of the underlying physical storage resource(s) 1790 of the system 1600 (e.g., is capable of efficiently implementing any-to-any and/or many-to-one mappings between LIDs of a logical address space 122 and physical storage location(s) and/or addresses within a storage resource address space 1794), and that b) maintains durable translation metadata 1713 (e.g., metadata that is persistent and crash-safe). In some embodiments, the SDTL 1711 comprises a flash translation layer (FTL) for a flash storage medium and/or device (storage resource 1790). The translation metadata 1713 of the SDTL 1711 may comprise any-to-any and/or many-to-one mappings between LIDs of the sparse logical address space 122 and data stored on a storage resource 1790. The translation metadata 1713 may include, but is not limited to: a forward map, a reverse map, an index, a tree, and/or the like. The storage manager 1710 may leverage the SDTL 1711 to implement efficient LM operations, such as range clone operations, range move operations, range merge operations, range delete operations, exist queries, and so on. The LM operations implemented by the storage manager 1710 (in response to requests received through the DV interface 1713) may be durable due to, inter alia, persistent metadata pertaining to logical-to-physical translations maintained by the STDL 1711. In some embodiments, the LM operations pertaining to multiple blocks (multiple LIDs) may be completed atomically in response to a single range move operation (e.g., by writing a single entry to a persistent metadata log, such as a LM entry 173 as disclosed herein). Moreover, the STDL 1711 may be configured to isolate LM operations, such that the operations are serializable and/or thread safe, as disclosed herein.

The storage manager 1710 may further include a storage engine 1714 configured to implement storage operations within the storage resource address space 1794 of the storage resource 1790. The storage engine 1714 may be configured to service storage requests by writing data to a log maintained within the storage resource address space 1794. The storage engine 1714 may be further configured to record metadata pertaining to the SDTL 1711 on the storage resource 1790, such as mappings between LIDs of the logical address space 122 and physical storage addresses (and/or modifications thereto). Further embodiments of log-based storage are disclosed in U.S. patent application Ser. No. 13/925,410 entitled, "Systems and Methods for Referencing Data on a Storage Medium," filed Jun. 24, 2013 for Evan Orme et al., which is hereby incorporated by reference.

The storage manager 1710 may comprise an interface module 112 that presents, inter alia, storage interface(s) to clients 106. The interface module 112 may include a block interface 1612. The block interface 1612 may correspond to the sparse, thinly provisioned logical address space 122 maintained by the SDTL 1711, as disclosed herein. The block interface 1612 may comprise one or more I/O interfaces and/or APIs for reading and/or writing data to particular LIDs and/or LID ranges within the logical address space 122 (e.g., reading and/or writing storage blocks). The interface 112 may further include a DV interface 1713 comprising an API for implementing LM operations within the logical address space 122, as disclosed herein. The DB interface 1713 may define operations for manipulating the logical interface of data stored on the storage resource 1790, which may comprise modifying mappings between LID(s) and physical storage address(es), such as range clone, range move, range merge, range delete, and/or exists, as disclosed herein. In some embodiments, the LM operations of the DV interface 1713 may be defined in terms of LID vectors. The LM operations presented through the DV interface 1713 may be atomic and/or serializable (e.g., isolated from other concurrent operations pertaining to the logical address space 122), as disclosed herein.

As depicted in FIG. 17A, in some embodiments, the DV interface 1713 comprises an API and/or interface that is separate from and/or independent of other interface(s) of the storage manager 1710 (e.g., separate from and/or independent of the block interface 1612). The disclosure is not limited in this regard. Alternatively, or in addition, the DV interface 1713 may be implemented as an extension and/or addition to one or more existing interfaces, such as the block interface 1612. The DV interface 1713 may be may be implemented and/or presented by use of various components, modules, circuits, and/or the like, including, but not limited to: a kernel-level module, a user-space module, a driver-level module, a driver, an I/O controller, an I/O manager, an I/O layer, an I/O service, a storage controller, a storage manager, a storage layer, a storage service, SCSI module, a library, a shared library, a loadable library, a DLL library, a DDI module, a LDD module, a PDD module, a WFD module, a UMDF module, a KMDF module, an I/O Kit module, a UDI module, a SDI module, an SDK, and/or the like.

The storage manager 1710 may be configured to implement LM operations in response to requests received through the DV interface 1713. In some embodiments, the storage manager 1710 may comprise an LM engine 1630, as disclosed herein. The storage manager 1710 may leverage the STDL 1711 to implement LM operations on groups, sets, collections, ranges, and/or extents of LIDs within the logical address space 122, including the LID vector(s) disclosed herein.

Clients 106 may leverage the DV interface 1713 to efficiently implement higher-level functionality, as disclosed herein. The clients 106 may include, but are not limited to: an operating system, a file system 1606A, a snapshot client 1606B, a deduplication client 1606C, an inline deduplication client 1606D (e.g., inline deduplication module 1618), a journaling client 1606E, a storage integrator 1606F, a storage application 1606G, and/or the like. The clients 106 may leverage the LM operations exposed through the DV interface 1713 regardless of the mechanism(s) and/or technique(s) used to implement the LM operations by the storage manager 1710 and/or the storage resource(s) 1790 on which the corresponding data is stored.

Figure 17B:
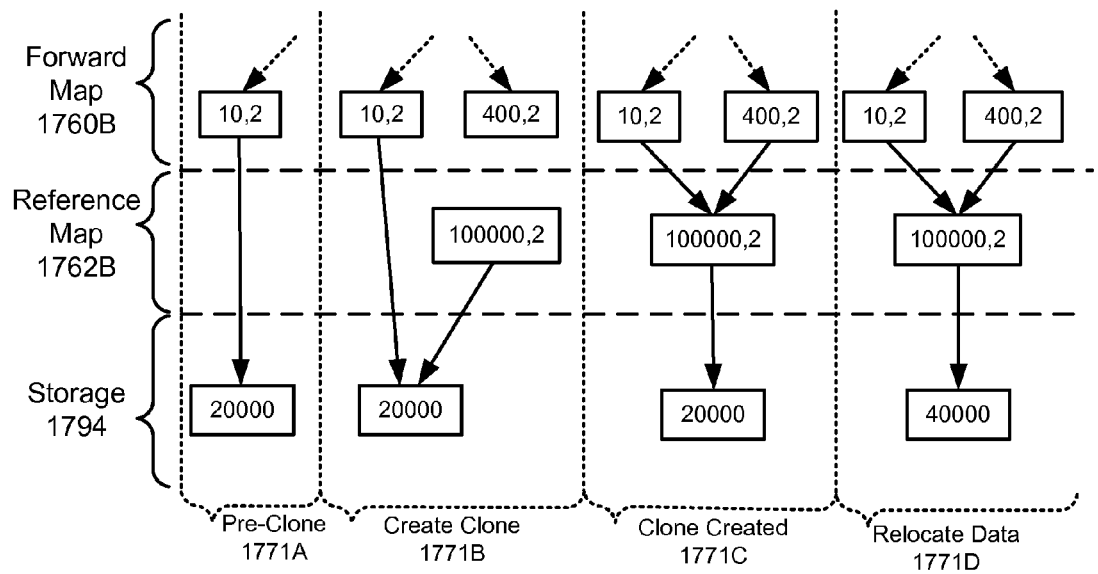
FIG. 17B is a schematic block diagram depicting one embodiment of virtualization metadata pertaining to logical manipulation operations.

As depicted in FIG. 17B, in some embodiments, the SDTL 1711 of the storage manager 1710 is configured to manage LM operations by use of a forward map 1760B and a reference map 1762B. The forward map 1760B may comprise assignments between LIDs of the logical address space 122 and storage addresses within the storage address space 1794. The storage manager 1710 may be configured to store data on the storage resource 1790 in a contextual format. As used herein, a contextual format refers to a data storage format in which data is stored with persistent metadata that, inter alia, maps the data to a LID of the logical address space 122 (and/or other identifier). A contextual format may comprise a packet format having a header that comprises the LID(s) associated with the data. The LM operations disclosed herein may modify mappings between LIDs and stored data. The storage manager 1710 may be configured to implement LM operations without modifying the contextual format of the stored data. In some embodiments, the storage manager 1710 implements LM operations by recording persistent notes (e.g., LM entries 173) to a log on the storage medium. Data may be rewritten in an updated contextual format in a background operation, such as grooming, garbage collection, and/or the like.

In the FIG. 17B embodiment, the STDL 1711 is configured to map LIDs to storage addresses by use of a forward map 1760B. The forward map 1760B may comprise entries that map LIDs and/or LID ranges to data stored on the storage resource 1790. The data may be stored in a contextual format that associates the data with the LIDs and/or LID ranges, which may enable the mappings to be reconstructed after an invalid shutdown resulting in loss of the forward map 1760B.

LM operations, such as range clone operations, may be implemented by use of an indirect, reference map 1762B. The reference map 1762B may comprise reference entries that correspond to data that is being referenced by multiple LIDs and/or LID ranges (e.g., many-to-one mappings). The reference map 1762B may comprise reference identifiers (RIDs), which may be maintained in a separate namespace than the logical address space 122. Accordingly, the reference map may be part of an intermediate, "virtual" or "reference" address space that is separate and distinct from the logical address space 122. Alternatively, in some embodiments, reference entries may be assigned LIDs selected from pre-determined ranges and/or portions of the logical address space 122 that are not directly accessible to clients 106.

The storage manager 1710 may implement clone operations by linking one or more entries of the forward map 1760B to reference entries in the reference map 1762B. The reference entries may be bound to the storage address(es) of the corresponding data on the storage resource 1790. Accordingly, LIDs that are associated with many-to-one mappings may reference data indirectly through the reference map 1762B (e.g., the LID(s) may map to reference entries which, in turn, map to the storage address space 1794).

The storage manager 1710 may be further configured to store persistent metadata on the storage resource 1790 that associates data with identifier(s) of the forward map 1760B and/or reference map 1762B. The persistent metadata stored with "cloned data" (data referenced by two or more LIDs) may correspond to a single reference entry, which in turn is mapped to two or more LIDs in the forward map 1670B. FIG. 17B depicts one embodiment of a range clone operation. In state 1771A, an entry corresponding to LID 10 extent 2 in the logical address space 122 (denoted 10,2 in FIG. 17B) may directly reference data at storage address 20000 on the storage resource 1790. Other entries are omitted from FIG. 17B to avoid obscuring the details of the disclosed embodiment. In state 1771B, the storage manager 1710 implements a range clone operation to clone the range 10,2. Cloning the range 10,2 may comprise: a) allocating a new range of LIDs (denoted 400,2 in FIG. 17B) and b) allocating reference entries in the reference map 1762B through which the entries 10,2 and 400,2 may reference the cloned data at storage address 20000 (denoted 100000,2 in FIG. 17B). The clone operation may further comprise associating the entries 10,2 and 400,2 with the reference entry 100000,2 as illustrated at state 1771C. As disclosed above, associating the entries 10,2 and 400,2 with the reference entry 100000,2 may comprise indicating that the entries 10,2 and 400,2 are indirect entries. State 1771C may further comprise storing a persistent metadata (e.g., a persistent note) on the storage resource 1790 to associate the data at storage address 20000 with the reference entry 100000,2 and/or to associate the entries 10,2 and 400,2 with the reference entry 100000,2 in the reference map 1762B. The data stored at storage address 20000 may be relocated within the storage resource 1790 in response to, inter alia, garbage collection operations. In response to relocating the data, the data may be rewritten in an updated contextual format in one or more background operations. The updated contextual format may include metadata that binds the data to the reference entry 100000,2, as opposed to the separate LID ranges 10,2 and 400,2. Therefore, relocating the data at storage address 20000 to storage address 40000 may only require updating a single entry in the reference map 1762B as opposed to multiple entries corresponding to each LID range that references the data (e.g., multiple entries 10,2 and 400,2). Moreover, any number of LID ranges in the forward map 1760B may reference the data segment, without increasing the size of the persistent metadata on the storage resource 1790.

The storage manager 1710 may leverage the reference map 1762B to implement other LM operations. A range move operation to move data from LID range A to LID range B may comprise a) updating the forward map 1760B to map the LID range B to the reference entries of LID range A (and/or storage addresses of LID range A), and recording persistent metadata (e.g., an LM entry 173) to bind LID range B to the particular reference entries and/or storage addresses. The persistent note may be further configured to indicate that LID range A is unmapped. A range delete operation may comprise a) removing entries from the forward map 1760B and b) recording persistent metadata, such as an LM entry 173, to indicate that the corresponding LIDs are unmapped. A range exists operation may comprise issuing a query to determine whether particular LIDs correspond to entries of the forward map 1760B (e.g., are bound to reference entries of the reference map 1762B and/or storage addresses within the storage address space 1794).

Figure 17C:
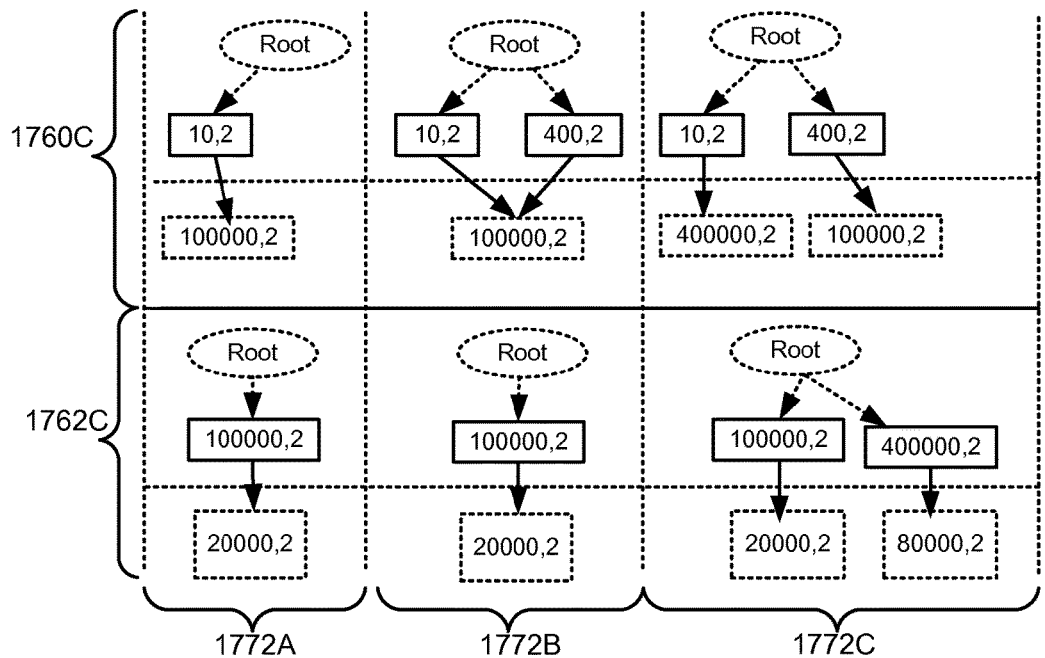
FIG. 17C is a schematic block diagram depicting another embodiment of virtualization metadata pertaining to logical manipulation operations.

FIG. 17C depicts another embodiment of translation layer of the STDL 1711 to implement LM operations, such as the range clone operations disclosed herein. In the FIG. 17C embodiment, the STDL 1711 maps LIDs of the logical address space 122 to stored data through an intermediate mapping layer (virtual map 1762C). The forward map 1760C may comprise any-to-any and/or many-to-one mappings between LIDs and virtual identifiers (VIDs) of the virtual map 1762C. The VIDs of the virtual map 1762C may map to respective storage addresses within the storage address space 1794. The storage manager 1710 may be configured to store data with contextual metadata on the storage resource 1790, which maps the stored data to a respective VID. The storage manager 1710 may be further configured to store persistent notes (e.g., LM entries 173) that define and/or modify mappings between LIDs of the forward map 1760C and VIDs of the virtual map 1762C. The persistent notes may be used to implement durable LM operations such as range clone, range move, range merge, range delete, and/or exists, as disclosed herein.

As illustrated in FIG. 17C, in state 1772A, the forward map 1760C comprises an entry 10,2 that represents two LIDs (10 and 11) in the logical address space 122. The forward map 1760C associates the entry 10,2 with VIDs of the intermediate mapping layer (virtual map 1762C). In state 1772A, the forward map 1760C binds the LID entry 10,2 to VIDs 1000000 and 1000001 (entry 100000,2). The VIDs 1000000 and 1000001 are mapped to data stored on the storage resource 1790 (mapped to address 20000 within the storage address space 1794).

In state 1772B, the storage manager 1710 implements a range clone operation to clone LIDs 10 and 11 to 400 and 401. The range clone operation may comprise a) allocating a new entry 400,2 in the forward map 1760C for the LIDs and b) associating the LIDs 400 and 401 with the corresponding entry 100000,2 in the forward map 1760C. The corresponding entry in the virtual map 1762C may remain unchanged. Alternatively, a reference count (or other indicator) of the entry 100000,2 in the virtual map 1762C may be updated to indicate that the entry is being referenced by multiple LID ranges. The data stored at storage address 20000 may be left unchanged (e.g., continue to associate the data with the VIDs 100000,2). The range clone operation may further comprise storing a persistent note on the storage resource 1790 to indicate the association between the LID entry 400,2 and the entry 100000,2 in the virtual map 1762C (an LM entry 173). Alternatively, or in addition, the range clone operation may be made persistent and/or crash-safe by persisting the forward map 1760C (and/or portions thereof) in a checkpoint entry 168 and/or the like).

Write operations subsequent to the range clone operation may be managed by, inter alia, write indirection. As disclosed above, write indirection refers to an efficient implementation of copy-on-write functionality that preserves a copy of stored data, while enabling modifications to the data through other logical interfaces (other LIDs). As disclosed above in conjunction with FIG. 4B, write indirection may provide zero-write/zero-copy copy-on-write functionality within cloned LID ranges that preserve existing data, without any requiring additional copy operations. In the FIG. 17C embodiment, write indirection may comprise writing data to LIDs 10-11 while preserving the "cloned" data associated with LIDs 400-401. In response to a request to write data to LIDs 10-11, the write request is "redirected" to a new set of VIDs (VIDs 400000-400001) in the forward map 1760C, which are mapped to new data in the virtual map 1762C (storage addresses 800000-800001). The mapping between LIDs 10,2 and VIDs 400000-400001 may be recorded in a persistent note (mapping entry 163) on the storage resource 1790. The mapping between LIDs 400-401 and VIDs 100000-100001 (and the corresponding data) may remain unchanged.

Other LM operations pertaining to the logical address space 122 may be implemented by use of entries recorded on the storage resource 1790 (e.g., persistent notes appended to a log within the storage address space 1794). A range move operation may, for example, comprise a) updating the forward map 1760C to modify LID to VID mappings, and b) recording persistent metadata to render the move persistent and crash-safe. In the FIG. 17C embodiment, moving the data of LIDs 10-11 to LIDs 500-501 may comprise a) updating the forward map 1760C to bind VIDs 400000-400001 to LIDs 500-501, and b) recording persistent metadata to indicate that LIDs 500-501 are bound to VIDs 400000-400001 (and/or indicate that LIDs 10-11 are unbound). A range delete operation may comprise a) removing entries from the forward map 1760C, and b) recording persistent metadata to indicate that the LIDs are unbound. An exists query may comprise indicating whether a particular set of LIDs is bound to VIDs in the forward map 1760C. The storage manager 1710 may be configured to groom the virtual map 1762C by, inter alia, removing VID entries that are not being referenced by LIDs of the logical address space 122 (are not mapped to LIDs in the forward map 1760C). Accordingly, in response to a range delete operation to delete LIDs 10-11 in state 1772, the storage manager 1710 may remove the corresponding entry 400000,2 from the virtual map 1762C (and/or remove the corresponding data at storage location 800000,2).

FIG. 17B illustrates one embodiment of a log storage implemented by, inter alia, the storage manager 1710. In some embodiments, the storage manager 1710 is configured to manage an asymmetric, write-once storage resource 1790, such as a solid-state storage medium, flash storage medium, or the like. As used herein, a "write once" storage medium refers to a storage medium that is reinitialized (e.g., erased) each time new data is written or programmed thereon. As used herein, an "asymmetric" storage medium refers to a storage medium that has different latencies for different types of storage operations. In some embodiments, for example, read operations may be faster than write/program operations, and write/program operations may be much faster than erase operations (e.g., reading the media may be hundreds of times faster than erasing, and tens of times faster than programming the storage medium). The storage resource 1790 may be partitioned into storage divisions 1770A-N that are erased as a group (e.g., erase blocks, logical erase blocks, and/or the like). As such, modifying a single data segment "in-place" may require erasing the entire erase block comprising the data and rewriting the modified data to the erase block, along with the original, unchanged data. This may result in inefficient "write amplification," which may excessively wear the media. In some embodiments, therefore, the storage manager 1710 may be configured to write data "out-of-place." As used herein, writing data "out-of-place" refers to updating and/or overwriting data at different storage location(s) rather than overwriting the data "in-place" (e.g., overwriting the original physical storage location of the data). Updating and/or overwriting data out-of-place may avoid write amplification, since existing, valid data on the erase block with the data to be modified need not be erased and recopied. Moreover, writing data out-of-place may remove erasure from the latency path of many storage operations, such that erasure latency is not part of the "critical path" of write operations.

Figure 17D:
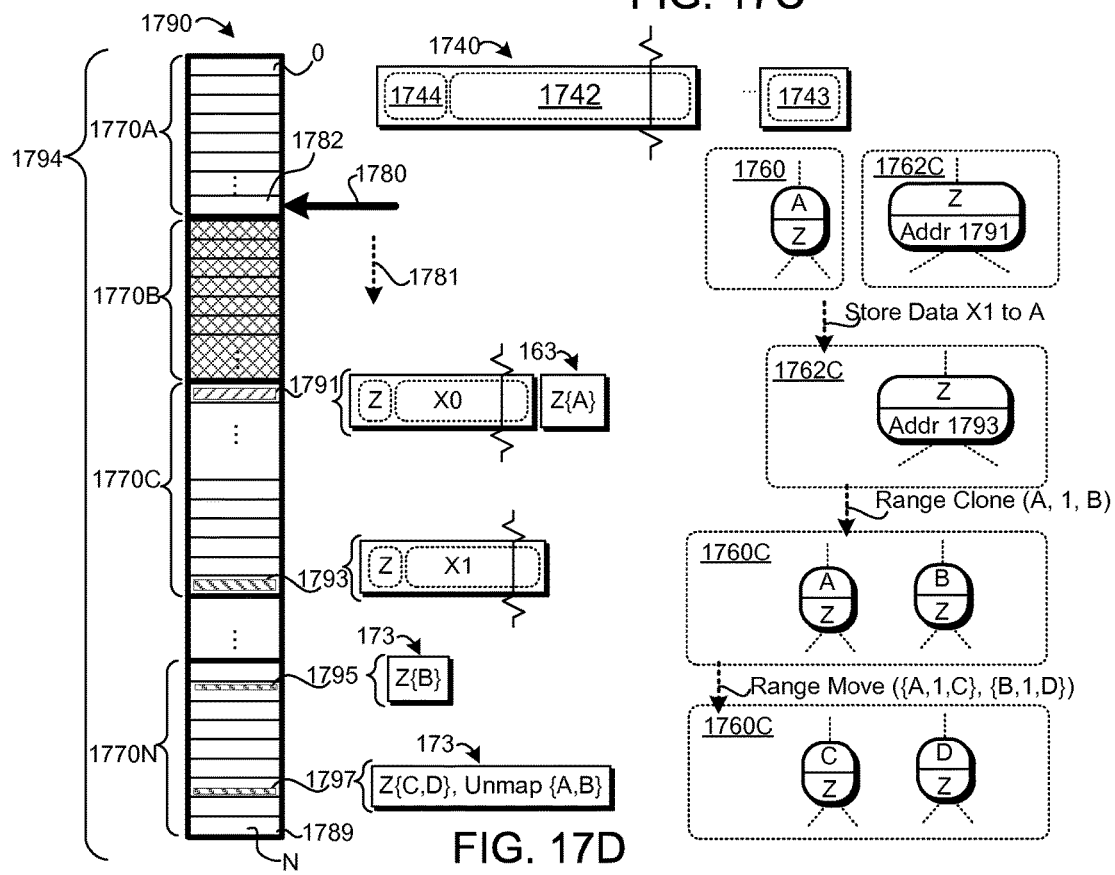
FIG. 17D is a schematic block diagram depicting embodiments of a storage log on a storage resource.

The storage manager 1710 may be configured to perform storage operations out-of-place by storing data in a log, such as a VDL 150A-N, as disclosed herein. The storage engine 1714 may be configured to append data at a current append point 1780 within the storage address space 1794 in a manner that maintains the relative order of storage operations performed by the storage engine 1714, forming a "storage log" within the storage address space 1794. In some embodiments, data is appended to the storage log in a contextual format (packet format). The data packets 1740 depicted in FIG. 17D may comprise a data segment 1742 (data block) and persistent metadata 1744. The data segment 1742 may be of any arbitrary length and/or size. The persistent metadata 1744 may be embodied as one or more header fields of the data packet 1740. The persistent metadata 1744 may comprise the logical interface of the data segment 1742, and as such, may include the LID(s) associated with the data segment 1742. Alternatively, the persistent metadata 1744 may map data to the logical address space 122 indirectly through reference identifiers of a reference map 1762B and/or VIDs of a virtual map 1762C, as disclosed above in conjnction with FIG. 17C. In such embodiments, storing data in the packet format 1740 may further comprise writing a mapping entry 163 to the storage log that associates a reference identifier and/or VID with one or more LIDs, as disclosed herein. Although FIG. 17D depicts a particular embodiment of a data packet 1740, the disclosure is not limited in this regard and could associate data (e.g., data segment 1742) with persistent metadata 1744 in other ways including, but not limited to, an index on the storage device 1790, a storage division index, and/or the like.

Data packets 1740 and/or persistent metadata 1744, such as mapping entries 163 may be associated with sequence information 1743. The sequence information 1743 may be used to determine the relative order of data within the log. In some embodiments, data packets 1740 are appended sequentially within the storage address space 1794 (storage divisions 1770A-N), such that the offset of data within a storage division 1770A-N determines a relative log order of the data within the respective storage division 1770A-N. The log order of the storage divisions 1770A-N may be determined, inter alia, by storage division sequence information 1743. Storage divisions 1770A-N may be assigned respective sequence information 1743 at the time the storage divisions 1770A-N are initialized for use (e.g., erased), programmed, closed, or the like. Accordingly, the log order of a data packet 1740 (and/or other data) within the storage log may be determined by: a) the relative position (offset) of the data within a storage division 1770A-N, and b) the log order of the storage division 1770A-N as determined by the sequence information 1743.

The storage divisions 1770A-N may comprise respective storage locations, which may correspond to pages, logical pages, and/or the like, as disclosed herein. The storage locations may be assigned respective storage addresses (e.g., storage address 0 to storage address N). The storage engine 1714 may be configured to store data sequentially from an append point 1780 within the storage address space 1794. In the FIG. 17D embodiment, data is appended at the append point 1780 within storage location 1782 of storage division 1770A and, when the storage location 1782 is filled, the append point 1780 advances 1781 to a next available storage location. As used herein, an "available" storage location refers to a storage location that has been initialized and has not yet been programmed (e.g., has been erased). As illustrated in FIG. 17D, the storage division 1770B may be unavailable for storage due to, inter alia, not being in an erased state (e.g., comprising valid data), being out-of service due to high error rates, or the like. Therefore, after filling the storage location 1782, the storage engine 1714 may skip the unavailable storage division 1770B, to advance the append point 1780 to the next available storage division 1770C. The storage engine 1714 may be configured to continue appending data sequentially within storage division 1770C, after which the append point 1780 continues at a next available storage division 1770A-N, as disclosed above. After storing data on the "last" storage location within the storage address space 1794 (e.g., storage location N 1789 of storage division 1770N), the storage engine 1714 may advance the append point 1780 by wrapping back to the first storage division 1770A (or the next available storage division, if storage division 1770A is unavailable). Accordingly, the storage engine 1714 may treat the storage address space 1794 as a loop or cycle.

As disclosed above, sequentially appending data and/or persistent metadata 1744 within the storage address space 1794 may generate a storage log on the storage resource 1790. In the FIG. 17D embodiment, the storage log comprises an ordered sequence of storage operations performed by sequentially storing data packets 1740 (and/or other data structures, such as mapping entries 163, LME 173, and the like) from the append point 1780 within the storage address space 1794. As illustrated in FIG. 17D, a data segment X0 corresponding to LID A may be stored at storage location 1791. The STDL 1711 may maintain logical-to-physical mappings using a virtual mapping layer 1762C, as disclosed above in conjunction with FIG. 17C. The data segment X0 may be stored in a self-describing data packet 1740; the data segment 1742 of the packet 1740 may comprise the data segment X0, and the persistent metadata 1744 may comprise the VID(s) associated with the data segment (e.g., the VID Z). The LID A may be mapped to VID Z by use of a mapping entry 163 stored at storage location 1791 and/or another storage location. In other embodiments, the persistent metadata 1744 may map the data X0 directly to LID A and/or to an identifier of a reference index 1762B, as disclosed herein.

A storage client 106 may request an operation to modify and/or overwrite the data associated with the LID A, which may comprise writing data segment X1 to the storage resource 1790. The storage manager 1710 may perform the overwrite operation out-of-place by appending a new data packet 1740 comprising the data segment X1 at a different storage location 1793 on the storage resource 1794, rather than modifying the existing data packet 1740, in place, at storage location 1791. The storage operation may further comprise updating the virtual map 1762C to associate VID Z with storage location 1793 and/or to invalidate the obsolete data X0 at storage location 1791. The forward map 1760 may remain unchanged.

Performing storage operations out-of-place (e.g., appending data to the storage log) may result in obsolete or invalid data remaining on the storage resource 1790 (e.g., data that has been erased, modified, and/or overwritten out-of-place). The storage engine 1714 may comprise a groomer to reclaim storage divisions 1770A-N by identifying and/or removing invalid data. The storage engine 1714 may determine that storage locations that are not associated with valid identifiers (LIDs) in the forward map 1713 comprise data that does not need to be retained on the storage resource 1790. Alternatively, or in addition, the storage manager 1710 may maintain other metadata, such as validity bitmaps, reverse maps, and/or the like to identify data that has been deleted, has been unmapped, is obsolete, and/or is otherwise invalid. After storing data X1, the storage engine 1714 may determine that the data X0 at storage location 1791 does not need to be retained since the data is no longer being referenced in the virtual map 1762C.

The storage manager 1710 may be configured to reconstruct the storage metadata, including the forward map 1760 and/or virtual map 1762C, by use of contents storage resource 1790. In the FIG. 17D embodiment, the current version of the data associated with LID A (and VID Z) may be determined based on the relative log order of the data packets 1740 at storage locations 1791 and 1793. Since the data packet at storage location 1793 is ordered after the data packet at storage location 1791 in the storage log, the storage manager 1710 may determine that storage location 1793 comprises the most recent, up-to-date version of the data corresponding to LID A and that the data at storage location 1791 is obsolete. The storage manager 1710 may reconstruct the forward map 1760 and/or virtual map 1762C to associate the VID Z with the data packet at storage location 1793 (rather than the obsolete data at storage location 1791), and to associate LID A with VID Z based on the mapping entry 163.

Referring to FIG. 17A, the storage manager 1710 comprises an STDL 1711 that maintains a sparse, durable logical-to-physical translation layer by, inter alia, storing persistent metadata 1744 and/or mapping entries 163 on the storage resource 1790 pertaining to mappings between the LIDs and stored data within a log on the storage resource 1790 (as illustrated in FIG. 17D). The storage manager 1710 may leverage the sparse, durable logical-to-physical STDL 1711 to implement LM operations pertaining to the logical address space, as disclosed herein. The LM operations may include, but are not limited to: range clone, range move, range merge, range delete, exists, and so on. The storage module 1711 may present the LM operations through the DV interface 1713. The DV interface 1713 may be implemented and/or presented by use of various components, modules, circuits, and/or the like, including, but not limited to: a kernel-level module, a user-space module, a driver-level module, a driver, an I/O controller, an I/O manager, an I/O layer, an I/O service, a storage controller, a storage manager, a storage layer, a storage service, SCSI module, a library, a shared library, a loadable library, a DLL library, a DDI module, a LDD module, a PDD module, a WFD module, a UMDF module, a KMDF module, an I/O Kit module, a UDI module, a SDI module, an SDK, and/or the like.

As disclosed above, the storage manager 1710 may implement storage operations in response to requests received through, inter alia, a block storage device interface, such as the block interface 1612. The storage manager 1710 may expose LM primitives to manipulation the logical-to-physical translation layer pertaining to the stored data blocks through the DV interface 1713. The LM primitives may modify logical-to-physical mappings pertaining to data stored on the storage resource 1790. The LM primitives may modify associations between LIDs of the logical address space and physical storage locations comprising the stored data. The modifications may be durable and may pertain to a sparse logical address space 122 of the SDTL 1711. The LM operations of the DV interface 1711 may comprise operations that manipulate the logical interface to stored data without modifying and/or rewriting the stored data on the storage resource 1790. Implementing a range clone operation (logical copy) may comprise associating a first set of LIDs that are mapped to data stored on the storage resource 1790 with a second set of LIDs, such that the first and second sets of LIDs are mapped to the same stored data. Implementing a range move operation (logical move) may comprise associating stored data mapped to a first set of LIDs with a second set of LIDs and/or unmapping the first set of LIDs, such that the stored data is associated with the second set of LIDs and is not associated with the first set of LIDs. Implementing a range merge operation may comprise combining data referenced with a first set of LIDs with data referenced by a second set of LIDs according to a merge policy, such that one or more of the first and second set of LIDs reference a single set of stored data. Implementing a range delete operation may comprise unmapping and/or unassociating a set of LIDs with data stored on the storage resource 1790, such that the LIDs are unbound (e.g., are not associated with data stored on the storage resource 1790). Implementing an exists query may comprise determining whether one or more LIDs specified in the query are mapped to data stored on the storage resource 1790 (e.g., determining whether the LIDs exist in the forward map 1760). The LM operations disclosed herein may be atomic. In some embodiments, the range move LM operation implemented by the storage layer 1710 is completed by writing a single entry to the storage resource 1790 (e.g., a single LM entry 1793). The entry may pertain to a plurality of different LID vectors that may be of arbitrary length and/or may be disjoint within the logical address space 122.

Referring back to FIG. 17D, the storage manager 1710 may implement a range clone to clone data X1 written to the storage resource in response to a block device write request. The range clone operation may clone the data X1 of LID A to LID B. The storage manager 1710 may implement the range clone operation by a) writing persistent metadata to the storage resource 1790 (a LM entry 173 at logical 1795) that associates LID B with VID Z, and b) updating the forward map 1760C to associate LID B with VID Z. The virtual map 1762C comprising the association between VID Z and data X1 may remain unchanged.

The storage manager 1710 may implement other LM operations presented through the DV interface 1713. FIG. 17D further illustrates a range move operation pertaining to LID vectors. The range move operation specifies moving the data associated with LID A to LID C and the data associated with LID B to LID D. The storage manager 1710 may implement the multi-block range move atomically by writing an LM entry 173 to the storage resource 1790 (at storage location 1797), comprising persistent metadata that specifies that LIDs C and D are mapped to VID Z, and that LIDs A and B are unmapped. The range move operation may further comprise updating the forward map 1760C to associate LIDs C and D with VID Z (and/or remove entries corresponding to LIDs A and B). The data X1 stored at storage location 1793, and the virtual map 1762C comprising the association between VID Z and data X1 at storage location 1793 may remain unchanged.

Although not depicted in FIG. 17D to avoid obscuring the details of the illustrated embodiments, the storage manager 1710 may be further configured to implement other LM operations, such as range merge, range delete, and/or exists as disclosed herein. A range merge operation may be implemented by one or more range move operations, as disclosed herein. A range delete operation may comprise storing one or more LM entries 173 on the storage resource 1790 that remove mappings between particular LIDs and/or LID vectors and VIDs of the virtual map 1762C. An exists operation pertaining to a particular LID(s) and/or LID vector(s) may be implemented by determining whether the particular LID(s) and/or LID vector(s) exist in the forward map 1760 (e.g., are mapped to VIDs in the virtual map 1762C).

Figure 18:
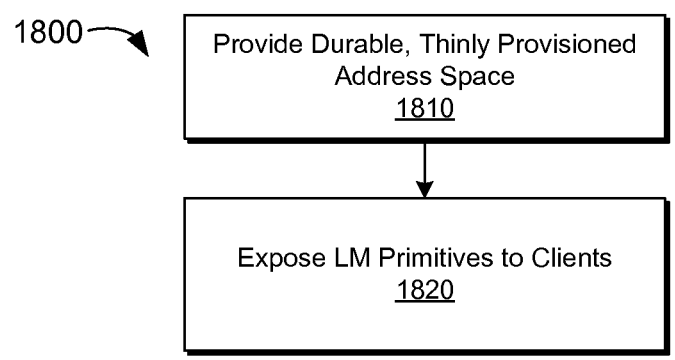
FIG. 18 is a flow diagram of one embodiment of a method for providing a generalized logical manipulation interface.

FIG. 18 is a flow diagram of one embodiment of a method 1800 for providing a generalized LM interface 1613. Step 1810 may comprise providing a durable, thinly provisioned logical address space 122 for a storage system. As used herein a "storage system" refers to any of a data services module 110, a storage layer 1610, a storage manager 1710, and/or other system, module, layer, facility, circuit, device, code, and/or driver adapted to implement storage and/or LM operations, as disclosed herein. The storage system of step 1810 may comprise a storage system configured to implement a sparse, durable translation layer between a logical address space 122 and a non-volatile storage (e.g., storage resources 190A-Y). Accordingly, the storage system of step 1810 may comprise a namespace manager 120, SDTL 1711, and/or the like that maintains persistent any-to-any and/or many-to-one logical-to-physical mappings, as disclosed herein. Although particular embodiments of storage systems are described herein, the disclosure is not limited in this regard and could be adapted for use with any suitable storage system having any suitable logical-to-physical transaction functionality.

Step 1810 may comprise maintaining virtualization metadata to assign and/or associate LIDs of a sparse, thinly provisioned logical address space 122 with data storage locations on one or more storage resources 190A-X and/or 1790. Step 1810 may further comprise implementing durable mappings that are persistent and crash-safe by, inter alia, recording persistent metadata pertaining to any-to-any and/or many-to-one mappings between LIDs of the logical address space 122 and stored data. The persistent metadata may include, but is not limited to: mapping entries 163, aggregate mapping entries 167, checkpoint entries 168, LME 173, contextual data (e.g., data stored with and/or comprising persistent metadata), and/or the like, as disclosed herein.

Step 1820 comprises exposing LM primitives pertaining to the sparse, durable logical address space 122. Step 1820 may comprise presenting a generalized interface for, inter alia, manipulating sparse, durable logical-to-physical mappings. Step 1820 may comprise implementing and/or presenting a GLM interface 1613 and/or DV interface 1713 to clients 106 as disclosed herein. The interface of 1820 may define LM primitives to allow clients 106 to access the LM operations enabled by the sparse, durable logical address space 122 of step 1810. Step 1820 may comprise presenting an API through, inter alia, an IO virtualization interface, a DV interface 1713, a storage virtualization interface, a GLM interface 1613, and/or the like. Step 1820 may comprise implementing and/or presenting the LM primitives by use of various components, modules, circuits, and/or the like, including, but not limited to: a kernel-level module, a user-space module, a driver-level module, a driver, an I/O controller, an I/O manager, an I/O layer, an I/O service, a storage controller, a storage manager, a storage layer, a storage service, SCSI module, a library, a shared library, a loadable library, a DLL library, a DDI module, a LDD module, a PDD module, a WFD module, a UMDF module, a KMDF module, an I/O Kit module, a UDI module, a SDI module, an SDK, and/or the like. The LM primitives may include, but are not limited to: range clone (logical copy), range move (logical move), range merge, range delete, range exists, and/or the like. Step 1820 may comprise providing access to the LM primitives through a dedicated interface that is separate from other interface(s) and/or APIs of the storage system. Alternatively, or in addition, step 1820 may comprise providing access to the LM primitives through extensions to one or more existing interfaces, such as a block device interface and/or the like. In some embodiments, the LM primitives of step 1820 may be defined in terms of LID vectors comprising groups, collections, sets, and/or ranges of LIDs within the logical address space 122. The LM primitives of step 1820 may be configured to operate on multiple LID vectors, as disclosed herein.

Figure 19:
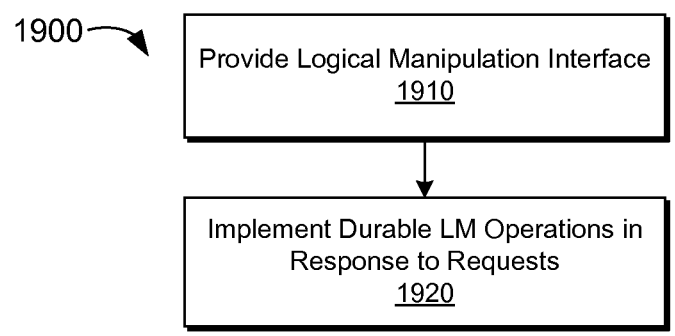
FIG. 19 is a flow diagram of another embodiment of a method for providing a generalized logical manipulation interface.

FIG. 19 is a flow diagram of another embodiment of a method for providing a generalized LM interface 1613. Step 1910 may comprise providing a logical manipulation interface for a storage system. As disclosed herein, the storage system of step 1910 may comprise one or more of a data services module 110, storage layer 1610, storage manager 1710, and/or other suitable storage system. Step 1910 may comprise implementing and/or exposing interface(s) for manipulating a sparse, durable logical-to-physical transaction layer, as disclosed herein. Step 1910 may comprise presenting a GLM interface 1613 and/or DV interface 1713. The logical manipulation interface of step 1910 provided by use of one or more existing interfaces, APIs, and/or libraries, such as a block device interface. Alternatively, or in addition, step 1910 may comprise presenting the LM interface as a separate, independent interface, API, library, and/or driver, as disclosed herein. Step 1910 may comprise defining an API corresponding to a set of LM operations, which may include, but are not limited to: range clone, range move, range merge, range delete, range exists, and so on. The API may further define data types, such as LID vectors, on which the LM operations are performed. The API may comprise a generalized interface to exploit log-based storage and, in particular, flash-based storage systems.

Step 1920 may comprise implementing LM operations in response to requests received through the LM interface of step 1910. Step 1920 may comprise implementing LM operations that are sparse and durable, such that the operations do not increase the I/O load on the storage system and/or are persistent and crash-safe. Step 1920 may comprise implementing a range clone operation by recording a persistent LM entry 173 comprising mapping metadata to associate stored data referenced by the source LID vector with a destination LID vector. Step 1920 may comprise implementing a range move operation by recording a persistent LM entry 173 comprising mapping metadata that removes association(s) between stored data and a source LID vector and associates the stored data with a destination LID vector. Step 1920 may comprise implementing a range merge operation by recording a persistent LM entry 173 comprising mapping metadata to remove association(s) between stored data and a first LID vector and associate the stored data with a second LID vector. The range merge operation may further comprise resolving conflicts between data referenced by the first and second LID vectors in accordance with a merge policy. Step 1920 may comprise implementing a range exists operation by updating a bitmap (and/or other data structure) based on mappings between LIDs of the exists requests and entries in forward maps 125, 1760B and/or 1760C.

Figure 20:
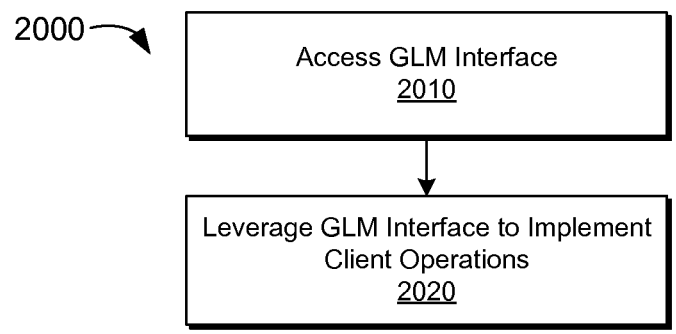
FIG. 20 is a flow diagram of one embodiment of a method for leveraging a generalized logical manipulation interface.

FIG. 20 is a flow diagram of one embodiment of a method 2000 for leveraging a GLM interface 1613. Step 2010 may comprise accessing a GLM interface 1613 provided by, inter alia, the data services module 110, storage layer 1610, storage manager 1710, and/or other entity, as disclosed herein. Step 2010 may comprise accessing a dedicated GLM interface 1613 and/or accessing the GLM interface 1613 through extensions and/or additions to one or more existing interfaces. Step 2010 may comprise accessing the GLM interface 1613 by a client 106, such as an operating system, a file system 1606A, a snapshot client 1606B, a deduplication client 1606C, an inline deduplication client 1606D (e.g., inline deduplication module 1618), a journaling client 1606E, a storage integrator 1606F, storage application 1606G, and/or the like.

Step 2020 may comprise leveraging the GLM interface 1613 to implement client operations, which may comprise delegating functionality implemented by the client 106 to the GLM interface 1613. Step 2020 may comprise a file system 1606A implementing a zero-copy write and/or file consistency model by use of the GLM interface 1613. Alternatively, or in addition, step 2020 may comprise a snapshot client 1606B leveraging range clone and/or range move LM operations of the GLM interface 1613 to create and/or manage zero-copy file and/or volume snapshots. Step 2020 may comprise a deduplication client 1606C, inline deduplication client 1606D, and/or deduplication module 1618 implementing deduplication operations by use of, inter alia, range clone operations of the GLM interface 1613. Step 2020 may comprise a journaling client 1606E leveraging the GLM interface 1613 to implement multi-block atomic operations by, inter alia, a) issuing one or more range clone operations to a "working" LID range, b) performing storage operations in the working LID range, and c) issuing an atomic range move operation to move the LIDs from the working LID range into target LID range(s). In some embodiments, step 2020 comprises a storage integrator 1606F leveraging the GLM interface 1613 to implement a storage integration API 1608, such as VAAI, as disclosed herein.

Figure 21:
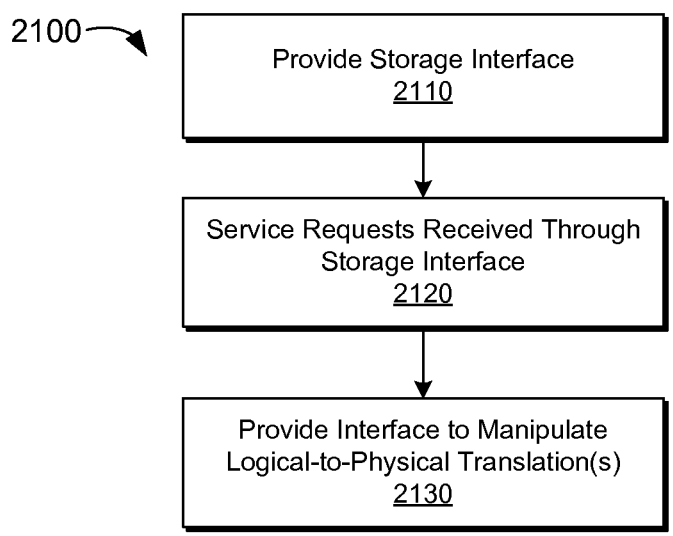
FIG. 21 is a flow diagram of another embodiment of a method for providing an interface to manipulate a logical-to-physical translation layer.

FIG. 21 is a flow diagram of another embodiment of a method 2100 for a generalized interface to manipulate a sparse, during logical-to-physical translation layer. Step 2110 may comprise providing a storage interface 2110 for a storage system. As disclosed above, a storage system may refer to one or more of a data services module 110, a storage layer 1610, a storage manager 1710, and/or other system, module, layer, facility, circuit, device, code, and/or driver adapted to implement storage and/or LM operations, as disclosed herein. The storage system of step 2110 may comprise a storage system configured to implement a sparse, durable translation layer between a logical address space 122 and a non-volatile storage (e.g., storage resources 190A-Y). Accordingly, the storage system of step 2110 may comprise a namespace manager 120, SDTL 1711, and/or the like that maintains persistent any-to-any and/or many-to-one logical-to-physical mappings, as disclosed herein. Although particular embodiments of storage systems are described herein, the disclosure is not limited in this regard and could be adapted for use with any suitable storage system having any suitable logical-to-physical transaction functionality.

In some embodiments, step 2110 comprises providing a block device interface having, libraries, and/or APIs for performing block storage operations pertaining the logical address space 122, as disclosed herein. In some embodiments, step 2110 comprises presenting a logical address space 122 to clients. The logical address space 122 may comprise a plurality of LIDs that correspond to respective units of storage (e.g., blocks, sectors, segments, and/or the like). The storage interface of step 2110 may comprise primitives for performing storage operations pertaining to the logical address space 122, which may include, but are not limited to: writing data blocks (writing particular LIDs and/or LID ranges), reading blocks (e.g., reading particular LIDs and/or LID ranges), and so on. Although particular storage interface(s) are described herein, the disclosure is not limited in this regard and could be adapted to provide and/or implement any suitable storage interface including, but not limited to: a block storage interface, an object storage interface, a direct file interface, a database interface (DBMS interface), a directory interface, and/or the like.

Step 2120 comprises servicing block storage requests received through the storage interface of step 2110. Step 2120 may comprise writing data to on or more storage resources 190A-Y and/or 1790 and/or maintaining virtualization metadata, such as a forward map 125, 1760B, 1760C to associate LIDs of the logical address space 122 with the stored data. Step 2120 may comprise maintaining a sparse, durable translation layer between the logical address space 122 and the stored data (e.g., an SDTL 111 and/or 1711). In some embodiments, step 2120 comprises writing data blocks to a non-volatile storage medium (e.g., on one or more storage resources 190A-Y in one or more VDL 150A-N) and mapping the stored data to respective logical identifiers of the logical address space 122 by use of, inter alia, virtualization metadata, as disclosed herein. In some embodiments, translations between the logical address space 122 and data stored on the storage resources 190A-Y are persisted in a metadata log 160 maintained on a particular storage resource 190Y. Alternatively, or in addition, translation metadata may be stored on the storage resource(s) 190A-Y with other data (e.g., data written to the storage resource(s) 190A-Y in response to block storage requests). In some embodiments, step 2120 comprises writing data to the storage resource(s) 190A-Y in a contextual format, such as the data packets 1740 disclosed above.

Step 2130 comprises providing an interface to manipulate logical-to-physical translation(s) pertaining to the stored data. Step 2130 may comprise implementing and/or providing an LM interface, GLM interface 1613, LIM interface, DV interface 1711, storage SV interface, and/or the like. The interface of step 2130 may be configured to expose primitives to change mappings between LIDs of the logical address space and data stored on the storage resource(s) 190A-Y in steps 2110 and/or 2120. The interface of step 2130 may be made available to clients 106 that may leverage LM primitives exposed thereby to implement higher-level operations, which may include, but are not limited to: file management operations (e.g., zero write file copy, file clones, file consistency, file snapshots, and so on), snapshot operations (e.g., file-level snapshots, volume snapshots, range snapshots, and so on), deduplication operations, inline deduplication operations, journaled storage operations, storage transactions, multi-block atomic operations, storage integration module(s), and/or the like. Although particular uses LM primitives are described herein, the disclosure is not limited in this regard and could be adapted for use by any suitable client to implement any suitable operation(s).

Step 2130 may comprise implementing and/or presenting the LM interface by use of various components, modules, circuits, and/or the like, including, but not limited to: a kernel-level module, a user-space module, a driver-level module, a driver, an I/O controller, an I/O manager, an I/O layer, an I/O service, a storage controller, a storage manager, a storage layer, a storage service, SCSI module, a library, a shared library, a loadable library, a DLL library, a DDI module, a LDD module, a PDD module, a WFD module, a UMDF module, a KMDF module, an I/O Kit module, a UDI module, a SDI module, an SDK, and/or the like. Step 2130 may, therefore, comprise making the LM interface available to clients 106 through one or more of the mechanisms and/or techniques disclosed herein. Step 2130 may comprise making the LM primitives of the LM interface disclosed herein available through and/or by use of one or more existing interface(s). In some embodiments, step 2130 comprises exposing the LM primitives as additions and/or extension to an existing storage interface, such as a block storage interface. Alternatively, or in addition, step 2130 may comprise making the LM primitives of the LM interface disclosed herein available through a separate interface, which may be distinct and/or independent from other interfaces pertaining to the storage system.

The LM primitives of the LM interface presented in step 2130 may include, but are not limited to: range clone (logical copy), range move (logical move), range merge, range delete, range exists, and/or the like. Step 2130 may comprise providing access to the LM primitives through a dedicated interface that is separate from other interface(s) and/or APIs of the storage system (e.g., separate from and/or independent of the storage interface of step 2110). Alternatively, or in addition, step 2130 may comprise providing access to the LM primitives through extensions to one or more existing interfaces, such as a block device interface and/or the like. In some embodiments, the LM primitives of step 2130 may be defined in terms of LID vectors comprising groups, collections, sets, and/or ranges of LIDs within the logical address space 122, as disclosed herein. The LM primitives of step 2130 may be further configured to operate on a plurality of different LID vectors pertaining to disjoint regions, ranges, and/or extents within the logical address space 122.

Step 2130 may further comprise implementing LM operations in response to requests received through the LM interface. Step 2130 may comprise implementing LM operations that change logical-to-physical mappings to data stored on the non-volatile storage without modifying and/or rewriting the stored data. The LM operations of step 2130 may, therefore, comprise maintaining translation metadata pertaining to the changed logical-to-physical translations. The translation metadata may be durable (persistent and crash safe), such that the changed logical-to-physical associations can be reconstructed regardless of loss to volatile memory. In some embodiments, the translation metadata is maintained in a metadata log 160 on a storage resource 160. As disclosed herein, translation metadata, such as the forward map 125, 1760B, and/or 1760C (and corresponding intermediate mapping information) may be reconstructed from the contents of the metadata log 160 (e.g., by traversing the metadata log 160). Alternatively, or in addition, the translation metadata may be persisted with the stored data and/or appended to a storage log (e.g., a VDL 150A-N). Therefore, step 2130 may comprise writing one or more LM entries 173 to a persistent storage medium, as disclosed herein (e.g., appending the LM entries 173 to a metadata log 160 and/or VDL 150A-N). Although particular embodiments for maintaining durable translation metadata are disclosed herein, the disclosure is not limited in this regard and could be adapted to incorporate any suitable implementation of a sparse, durable translation layer.

Implementing LM operations in response to requests received through the interface of step 2130 may comprise: a) updating volatile metadata pertaining to the LM operations, and/or b) writing persistent metadata corresponding to the LM operations. Writing the persistent metadata may comprise recording metadata indicating the modified logical-to-physical translations of the LM operation(s) on a persistent storage medium. In some embodiments, the LM operations of step 2130 are implemented without modifying and/or rewriting the data pertaining to the LM operation(s), as disclosed herein.

Implementing a clone operation (e.g., range clone, logical copy, zero write copy, or the like) may comprise: a) recording an LM entry 173 that associates a destination LID with data referenced by a source LID, and/or b) updating volatile translation metadata accordingly. Implementing a move operation (e.g., range move, logical move, zero write move, or the like) may comprise: a) recording an LM entry 173 that associates data mapped to a source LID vector with a destination LID vector (and/or unmap the source LID vector) and/or b) updating volatile translation metadata accordingly. Implementing a merge operation (e.g., range merge, logical merge, zero write merge, or the like) may comprise: a) recording an LM entry 173 that associates data mapped to a source LID vector with a destination LID vector in accordance with a merge policy (and/or unmap the source LID vector) and/or b) updating volatile translation metadata accordingly. Implementing a delete operation (e.g., range delete, zero write dete, unmap, deallocate, or the like) may comprise: a) recording an LM entry 173 to delete, erase, unmap, and/or deallocate a LID vector from stored data and/or b) updating volatile translation metadata accordingly. Responding to an exists query (e.g., range exists) may comprise determining whether LIDs associated with the query are mapped to stored data. As disclosed herein, the LM operations of step 2130 may be implemented without modifying and/or rewriting the stored data associated with the corresponding LIDs of the logical address space 122 on the non-volatile storage medium (e.g., storage resources 190A-Y).

In some embodiments, one or more of the LM operations of step 2130 are completed atomically. Multi-block range clone, range merge, and/or range delete operations may be completed by writing a single LM entry 173 (single block) to persistent storage (e.g., storage resource 190A-Y and/or 1790). As disclosed herein, a plurality of operations pertaining to a journaled storage transactions may be committed by, inter alia, a single, atomic range move operation. The range move operation may pertain to a plurality of different LID vectors, which may correspond to disjoint LID ranges, extents, collections, and/or groups within the logical address space 122. As disclosed herein, the range move operation may be completed atomically by recording, writing, and/or appending a single entry corresponding to the modified logical-to-physical translations (e.g., a LM entry 173 appended to the metadata log 160). The LM operations of step 2130 may be serializable and/or thread safe by isolating volatile metadata (e.g., locking portions of the forward map 125, 1760B and/or 1760C), as disclosed herein.

Figure 22:
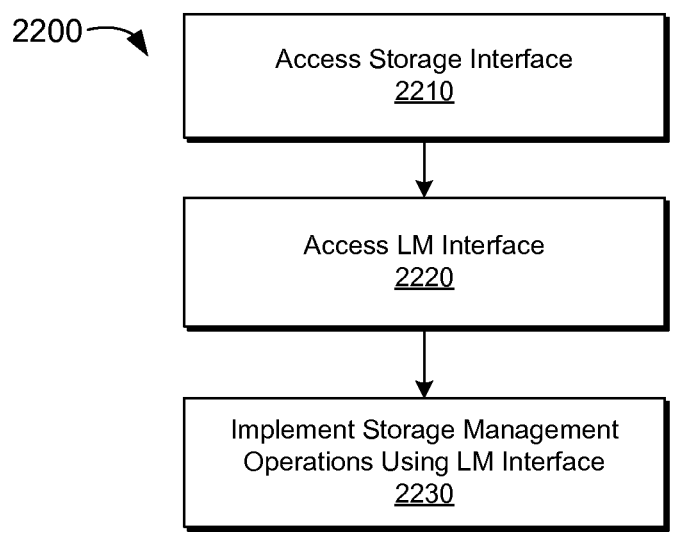
FIG. 22 is a flow diagram of one embodiment of a method for leveraging a generalized logical manipulation interface.

FIG. 22 is a flow diagram of another embodiment of a method 2200 for leveraging a generalized LM interface. Step 2210 may comprise accessing a storage interface of a storage system. As disclosed herein, the storage system of step 2210 may comprise one or more of a data services module 110, storage layer 1610, storage manager 1710, and/or other suitable storage system. Step 2210 may comprise accessing the storage interface to store data on a non-volatile storage medium (e.g., a persistent storage device, such as a storage resource 190A-Y). Step 2210 may comprise accessing a block storage interface to store blocks, sectors, packets, and/or segments to respective LIDs of a logical address space 122. In some embodiments, step 2210 further comprises associating objects with the LIDs, such as files, directory entries, database entries, and/or the like.

Step 2220 may comprise accessing an LM interface of the storage syst-em in order to, inter alia, change logical-to-physical mappings pertaining to the data stored at step 2210. Step 2220 may comprise accessing the LM interface through an existing storage interface (the storage interface of step 2210). Alternatively, or in addition, step 2220 may comprise accessing a separate, dedicated LM interface (e.g., an interface that is separate, distinct, and/or independent from the storage interface of step 2210).

Step 2230 may comprise implementing storage management operations using the LM interface. Step 2230 may comprise issuing requests to implement LM operations through the LM interface, which may include, but are not limited to: clone (range copy, logical copy, zero write copy, and/or the like), move (range move, logical move, zero write move, and/or the like), merge (range merge, logical merge, zero write merge, and/or the like), delete, exists, composite operations, atomic composite LM operations, and/or the like. Step 2230 may comprise implementing one or more of: file management operations (file clone, file consistency, zero write file copy, file clone and/or the like), snapshot management operations (e.g., file snapshot, volume snapshot, and/or the like), deduplication operations (e.g., inline deduplication, and/or the like), journaling operations, multi-block atomic operations, storage integration operations, and/or the like. The LM operations of step 2230 may comprise one or more of: clone LM operation to associate two or more LID(s) with the same stored data block; a move LM operation to associate stored data with different LID(s) (e.g., associate a LID mapped to a first LID with a second LID and/or unmapping the first LID); a range merge operation to merge stored data pertaining to two or more different LID ranges, extents, and/or regions according to a merge policy; composite LM operations; and/or the like, as disclosed herein. Step 2230 may comprise issuing a plurality of requests to the LM interface to implement one or more of the upper-level storage management operations disclosed herein. Alternatively, step 2230 may comprise issuing a single composite LM operation to implement a plurality of LM operations corresponding to an upper-level storage management operation.

The LM operations of step 2230 may change logical-to-physical mappings pertaining to data stored in step 2210 without modifying the stored data. As disclosed above, the LM operations of step 2230 may be implemented by recording translation metadata to persistent storage (e.g., appending LM entries 173 to a metadata log 160). The LM operations of step 2230 may be implemented atomically and/or may be isolated with respect to the logical address space 122, as disclosed herein. Accordingly, the LM operation(s) of step 2230 may change the LID(s) associated with a particular data block stored on a non-volatile storage medium (storage resource 190A-Y and/or VDL 150A-N) without modifying stored data block and/or rewriting the data block.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

We claim:

1. An apparatus, comprising:

a non-transitory storage medium;

a storage manager that stores data on the non-transitory storage medium in response to storage requests of a client;

a translation layer that maintains translation metadata that associates data segments stored on the non-transitory storage medium with logical addresses of a logical address space; and a data virtualization interface available to the client, the data virtualization interface defining requests to implement specified modifications to the translation metadata, comprising requests to merge designated sets of logical addresses, wherein:

implementing a merge designating a first set of logical addresses and a second set of logical addresses comprises:

modifying the translation metadata to combine the first set of logical addresses with the second set of logical addresses in a destination set of logical addresses in accordance with a merge policy that specifies a set of rules to resolve merge conflicts based on differences in logical address vectors for the first set of logical addresses and the second set of logical addresses, the merge policy specified by the client in an input/output request, and the translation metadata is modified to associate each logical address of the destination set of logical addresses with a stored data segment associated with a logical address selected from one of the first set of logical addresses and the second set of logical addresses.

2. The apparatus of claim 1, wherein:

the translation metadata is modified to associate the logical addresses of the destination set of logical addresses with respective stored data segments without modifying the stored data segments; and the destination set of logical addresses comprises one of the first set of logical addresses, the second set of logical addresses, and a third set of logical addresses.

3. The apparatus of claim 1, wherein the storage manager is configured to store the data on the non-transitory storage medium in response to one or more requests issued to a block storage interface.

4. The apparatus of claim 1, wherein the data virtualization interface comprises one of a library, an application programming interface, a user-level module, a software development kit, and a kernel-level module.

5. The apparatus of claim 1, wherein:

the data virtualization interface defines requests for specifying move operations pertaining to designated logical addresses; and implementing a move operation designating a source logical address and a destination logical address comprises:

identifying an association between the source logical address and a particular stored data segment in the translation metadata; and modifying the translation metadata to remove the identified association between the source logical address and the particular stored data segment and to create an association between the designation logical address and the particular stored data segment.

6. The apparatus of claim 1, wherein:
the data virtualization interface defines requests for specifying clone operations pertaining to designated logical addresses; and
implementing a clone operation designating a source logical address and a destination logical address comprises:
  determining that the translation metadata comprises an association between the source logical address and a particular stored data segment;
  modifying the translation metadata to associate the designation logical address with the particular stored data segment; and
  retaining the association between the source logical address and the particular stored data segment in the translation metadata such that the translation metadata is modified to associate the particular stored data segment with both of the source logical address and the destination logical address.

7. The apparatus of claim 6, wherein:
the client is configured to implement a zero-write file copy operation by issuing a logical copy request to the data virtualization interface, the logical copy request specifying a clone operation and designating first logical addresses associated with data of a first file stored on the non-transitory storage medium by the translation metadata as source logical addresses for the clone operation and designating second logical addresses as destination logical addresses for the clone operation; and
implementing the specified clone operation in response to the logical copy request comprises modifying the translation metadata to associate both of the first logical addresses and the second logical addresses with the data of the first file stored on the non-transitory storage medium.

8. The apparatus of claim 7, wherein the client is configured to:
identify files corresponding to duplicate data stored on the non-transitory storage medium; and
issue the logical copy request to the data virtualization interface in response to determining that the first file corresponds to the duplicate data.

9. The apparatus of claim 1, wherein:
the data virtualization interface defines requests for specifying range move operations pertaining to designated source and destination logical addresses; and
the client is configured to leverage the data virtualization interface to implement a journaled storage transaction pertaining to logical addresses of a target set of logical addresses, by:
storing data segments pertaining to the journaled storage transaction, such that the translation metadata associates the stored data segments pertaining to the journaled storage transaction with logical addresses of a working set of logical addresses, different from the target set of logical addresses; and
issuing a request specifying a range move operation to the data virtualization interface in response to the storing, the issued request designating the working set of logical addresses as source logical addresses for the specified range move operation and the target set of logical addresses as destination logical addresses for the specified range move operation,
wherein implementing the specified range move operation comprises modifying the translation metadata to associate the stored data segments pertaining to the journaled storage transaction with the target set of logical addresses.

10. The apparatus of claim 9, wherein the client is configured to roll back a failed journaled storage transaction by invalidating stored data segments associated with logical addresses of the working set of logical addresses by the translation metadata.

11. The apparatus of claim 9, wherein implementing the specified range move operation further comprises writing persistent metadata on the non-transitory storage medium in a single atomic write operation, the persistent metadata configured to associate the stored data segments pertaining to the journaled storage with the target set of logical addresses.

12. A computer-implemented storage system, comprising:
means for storing data blocks on a physical storage resource, wherein storing the data blocks comprises maintaining logical-to-physical mappings to associate the stored data blocks with identifiers of a logical address space;
means for requesting designated modifications to logical-to-physical mappings, comprising an API function for requesting a merge modification to the logical-to-physical mappings pertaining to specified identifiers; and
means for implementing a merge modification to the logical-to-physical mappings in response to a request specifying a first set of identifiers and a second set of identifiers by modifying the logical-to-physical mappings to combine the first set of identifiers and the second set of identifiers into a third set of identifiers,
wherein:
  the logical-to-physical mappings are modified to associate each identifier of the third set of identifiers with a stored data block associated with an identifier selected from one of the first set of identifiers and the second set of identifiers in accordance with a merge policy specified by the client,
  the merge policy specifies rules to resolve merge conflicts based on differences in logical address vectors for the first set identifiers and the second set of identifiers, and
  the means for storing the data blocks, the means for requesting the designated modifications, and the means for implementing the merge modification comprise one or more of a set of hardware circuits, a set of programmable hardware devices, and executable code stored on a set of non-transitory computer-readable storage media.

13. The computer-implemented storage system of claim 12, further comprising:
means for requesting logical copy modifications to the logical-to-physical mappings; and
means for implementing a requested logical copy modification to the logical-to-physical mappings specifying a source identifier and a destination identifier by:
  identifying a stored data block associated with the source identifier; and
  modifying the logical-to-physical mappings to associate the identified stored data block with both of the source identifier and the destination identifier.

14. The computer-implemented storage system of claim 12, further comprising:
means for requesting logical move modifications to the logical-to-physical mappings; and means for implementing a requested logical move modification to the logical-to-physical mappings specifying a source identifier and a target identifier by:
  determining an address for a stored data block associated with the source identifier by use of the logical-to-logical mappings; and
  modifying the logical-to-physical mappings to associate the target identifier with the determined address and disassociate the source identifier from the determined address.

15. The computer-implemented storage system of claim 12, further comprising:
  means for requesting modifications to the logical-to-physical mappings pertaining to specified identifier ranges; and
  means for implementing a modification to the logical-to-physical mappings pertaining to a specified source identifier range and a specified destination identifier range by:
    identifying stored data blocks corresponding to the source identifier range; and
    modifying the logical-to-physical mappings to associate each of the identified stored data blocks with a respective identifier of the destination identifier range.

16. The computer-implemented storage system of claim 15, further comprising:
  means for storing persistent metadata corresponding to the logical-to-physical mappings; and
  means for implementing a requested modification to the logical-to-physical mappings by writing persistent metadata corresponding to the requested modification in a single, atomic write operation.

17. The computer-implemented storage system of claim 12, wherein the means for requesting designated modifications to logical-to-physical mappings further comprises a library that is accessible to a user-level application operating on a computing device.

18. A method, comprising:
  maintaining persistent metadata comprising mappings between data segments stored on a storage resource and identifiers of a front-end address space, the front-end address space used by clients to access the stored data segments through a data storage interface; and
  providing a logical manipulation interface operating on a computing device to receive requests to manipulate specified mappings of the persistent metadata, wherein receiving a request comprises:
    receiving a designation of a manipulation operation for the request, the manipulation operation being designated from a plurality of manipulation operations available to the clients through the logical manipulation interface, including a merge operation; and
    specifying identifiers of the front-end address space for the designated manipulation operation;
  receiving a first request that designates a merge operation, designates a merge policy among a plurality of merge policies specified by the client in the request, and specifies a first plurality of front-end identifiers and a second plurality of identifiers,
  wherein:
    implementing the first request comprises:
      combining the first plurality of front-end identifiers with the second plurality of front-end identifiers, the combining comprising modifying the persistent metadata to associate each identifier of a third set of front-end identifiers with a stored data segment associated with an identifier of one of the first set of front-end identifiers and the second set of front-end identifiers in accordance with the designated merge policy, and
    the merge policy specifies rules to resolve merge conflicts based on differences in logical address vectors for the first set of front-end identifiers and the second set of front-end identifiers.

19. The method of claim 18, wherein maintaining the persistent metadata comprises appending entries to a log embodied on a persistent storage medium, the method further comprising:
  receiving a second request, the second request specifying a source identifier and a destination identifier and designating one or more of a logical move operation and a logical copy operation,
  wherein implementing the second request comprises:
    identifying a stored data block mapped to the source identifier by the persistent metadata; and
    appending an entry to the log, the entry configured to modify the persistent metadata to map the identified stored data segment to the destination identifier.

20. The method of claim 18, further comprising:
  implementing a clone operation in response to receiving a request specifying a source identifier and a destination identifier comprising:
    determining that the persistent metadata maps the source identifier to a particular stored data segment;
    modifying the persistent metadata to map the particular stored data segment to the destination identifier; and
    retaining a mapping between the source identifier and the particular stored data segment in the modified persistent metadata, such that the modified persistent metadata maps the particular data segment to both of the source identifier and the destination identifier.

21. An apparatus, comprising:
  a non-transitory, non-volatile storage medium;
  a client configured to issue storage requests to a storage layer through a storage interface, the storage interface corresponding to a logical address space, wherein the storage requests comprise requests to store data associated with respective addresses of the logical address space on the non-volatile storage medium,
  wherein:
    the storage layer is configured to:
      maintain translation data comprising logical-to-physical associations between data stored on the non-volatile storage medium and addresses of the logical address space, and
      make logical manipulation primitives available to the client, each logical manipulation primitive configured for requesting implementation of designated manipulation operations pertaining to specified logical-to-physical associations of the translation data,
    the client is configured to implement storage management operations by use of the logical manipulation primitives made available by the storage layer,
    the storage layer is further configured to, in response to a client request to implement a merge operation specifying a first set of addresses and a second set of addresses, modify the translation data to merge logical-to-physical associations of the first set of addresses with logical-to-physical associations of the second set of addresses, each of the merged logical-to-physical associations being associated with stored data corresponding to a logical-to-physical association of one of the first set of addresses and the second set of addresses in accordance with a merge policy specified in the client request, and the merge policy specifies rules to resolve merge conflicts based on differences in logical address vectors for the first set of addresses and the second set of addresses.

22. The apparatus of claim 21, wherein the storage layer is further configured to implement the respective manipulation operations of the logical manipulation primitives without changing the data stored on the non-volatile storage medium.

23. The apparatus of claim 21, wherein:

the logical manipulation primitives include a logical copy primitive for requesting implementation of logical copy operations;

the storage layer is further configured to implement a logical copy operation specifying a source address and a destination address by modifying the translation data to associate the destination address with stored data associated with the source address, such that the translation data associates the stored data with both the source address and the destination address; and the client is further configured to manage snapshots pertaining to the logical address space by use of the logical copy primitive.

24. The apparatus of claim 21, wherein:

the storage interface comprises a block storage interface; and the storage layer exposes the logical manipulation primitives through a logical manipulation interface that is separate from the block storage interface.

* * * * *